US005968132A

United States Patent [19]
Tokunaga et al.

[11] Patent Number: 5,968,132
[45] Date of Patent: Oct. 19, 1999

[54] IMAGE DATA COMMUNICATING APPARATUS AND A COMMUNICATION DATA QUANTITY ADJUSTING METHOD USED IN AN IMAGE DATA COMMUNICATION SYSTEM

[75] Inventors: Akira Tokunaga, Fukuoka; Minoru Takimoto; Mayumi Ishikawa, both of Kawasaki; Tomoko Matsuya, Sapporo, all of Japan

[73] Assignee: Fujitsu Limited, Kanagawa, Japan

[21] Appl. No.: 08/789,714

[22] Filed: Jan. 27, 1997

[30]     Foreign Application Priority Data

Feb. 21, 1996   [JP]   Japan ................................. 8-033201

[51] Int. Cl.$^6$ ................................................... G06F 13/00
[52] U.S. Cl. ........................................... 709/247; 709/224
[58] Field of Search ..................... 395/200.54, 200.56, 395/200.77, 200.62, 200.51; 345/131, 132, 346; 709/224, 226, 232, 231, 247

[56]                 References Cited

U.S. PATENT DOCUMENTS

| 4,610,026 | 9/1986 | Tabata et al. ......................... 345/131 |
| 5,555,377 | 9/1996 | Christensen et al. .............. 395/200.77 |
| 5,611,038 | 3/1997 | Shaw et al. ......................... 395/200.51 |
| 5,675,755 | 10/1997 | Trueblood .............................. 345/346 |
| 5,761,438 | 6/1998 | Sasaki ................................ 395/200.77 |

OTHER PUBLICATIONS

Sherry L. Chang et al., Bandwidth Characteristics of Multimedia Data Traffic on a Local Area Network, IEEE, pp. 836–840, Dec. 1993.

Primary Examiner—Zarni Maung
Assistant Examiner—Patrice L. Winder
Attorney, Agent, or Firm—Helfgott & Karas, P.C.

[57]                    ABSTRACT

Image data communicating apparatus and communication data quantity adjusting method in an image data communication system suitable for use when image data is transferred in a network environment. Image data is transferred in a most suitable quantity based on traffic of a network to avoid an effect on other services provided by the network. The apparatus has a data transmitting unit for transmitting image data to another image data communicating apparatus, a traffic detecting unit for detecting traffic of the network, and a communication data quantity adjusting unit for initially setting a transmittable number of image transferring frames on the basis of the detected traffic, and for automatically adjusting the quantity of data communication in the data transmitting unit on the basis of changing traffic on the network by altering the set number of frames.

41 Claims, 45 Drawing Sheets

FIG. 14

| RATE OF CHANGE(%) | -50 | -25 | +25 | --- |
|---|---|---|---|---|
| COMPRESSION PARAMETER | -10 | -5 | 3 | --- |

| RATE OF CHANGE (%) | -50 | -25 | --- |
|---|---|---|---|
| IMAGE SIZE (%) | -30 | -10 | --- |

40-3

DIAGRAM SHOWING A FORM OF A COMPRESSING SYSTEM TABLE ACCORDING TO THE SIXTH EMBODIMENT OF THIS INVENTION

| RATE OF CHANGE (%) | -50 | -25 | --- |
|---|---|---|---|
| COMPRESSING SYSTEM | JPEG | MPEG | --- |

FIG.43

PRIORITY TABLE

| SYSTEM (CODE) | 40-9 | 40-8 | 40-7 | 40-6 |
|---|---|---|---|---|
| RATE (Kbps) | 0~50 | 51~70 | 71~90 | 91~100 |

40-5

(IN THE CASE OF AN INITIAL VALUE 100 Kbps)

FIG.44

IMAGE SIZE TABLE

| RATE (Kbps) | 91~95 | 96~98 | --- |
|---|---|---|---|
| IMAGE SIZE (%) | -30 | -10 | --- |

40-6

COMPRESSION PARAMETER TABLE

| RATE (Kbps) | 71~80 | 81~85 | --- |
|---|---|---|---|
| COMPRESSION PARAMETER | -10 | -5 | --- |

COMPRESSING SYSTEM TABLE

| RATE (Kbps) | 51~60 | 61~65 | --- |
|---|---|---|---|
| COMPRESSING SYSTEM | JPEG | MPEG | --- |

TRAFFIC CONTROL TABLE

| RATE (Kbps) | 0~25 | 26~40 | 41~50 | --- |
|---|---|---|---|---|
| THE NUMBER OF FRAME | 0.25 | 0.4 | 0.5 | --- |

IMAGE DATA COMMUNICATING APPARATUS AND A COMMUNICATION DATA QUANTITY ADJUSTING METHOD USED IN AN IMAGE DATA COMMUNICATION SYSTEM

BACKGROUND OF THE INVENTION

The present invention relates to an image data communicating apparatus and a communication data quantity adjusting method used in an image data communication system suitable for used when image data such as video images or the like is transferred in a network environment.

In an office network such as LAN, a Local Area Network, which is a computer network located mainly in one office, WAN, a Wide Area Network which is a computer network in which LANs located in a wider area are connected to each other, or the like, data can be exchanged between computers as terminals accommodated by the network.

Using the above LAN or WAN, there appeared in recent years an image data communication system in which a video camera, for example, is connected to a computer accommodated by the network, whereby image data such as video images may be exchanged among several computers.

FIG. 54 is block diagram showing a general image data communication system. In FIG. 54, reference numerals 101 and 102 denote computers. These computers 101 and 102 are accommodated by a network 103 such as LAN, WAN, or the like.

A video camera 104 generating video image data is connected to the computer 101, whereas a display 105 displaying image data thereon is connected to the computer 102. Reference numeral 106 denotes another computer transmitting/receiving data excepting image data.

The image data generated by the video camera 104 is transmitted from the computer 101 to the computer 102 over the network 103. When receiving the image data from the computer 101, the computer 102 controls and displays the received imaged data on the display 105.

A video image inputted from the above video camera 104 is constituted of a pluality of pictures which slightly differ from each other, each of which is called a frame. In the computer 101, the number of frames transmitted for a predetermined time period can be arbitrarily set. In particular, if the number of frames transmitted for a predetermined period increases, it is possible to smoothly display video image data.

However, the user on the transmitting side arbitrarily sets the number of frames without giving regard to the traffic of the network 103. Thus, the computer 101 on the transmitting side sends out data, as much as possible, to the network 103 even in a state where the network 103 is congested.

If the computers 101 and 102 process frames from the video camera 104 in the above general image data communication system shown in FIG. 54, data size of one frame constituting image data reaches an enormous size.

Particularly, if the user sets the number of transmitting frames for a predetermined period to a large number when image data is transmitted over the network 103 on a slow line in a degree of, for example, 64/56 kbps, a large part of the traffic of the network 103 is used for transfer of the image data, which disturbs smooth implementation of other service provided by the network 103.

Japanese Patent Laid-Open Publication No. 06-233139 discloses a technique in terms of an image transferring apparatus which calculates a transmission period from the data quantity accumulated when image data is transferred, and alters a compression rate of image data if the transmission period is judged to be longer than a desired transmission time so as to realize the desired transmission period as a result.

The above technique disclosed in Japanese Patent Laid-Open Publication No. 06-2333139, however, cannot transfer image data based on the traffic of a network. If the network is congested, it is impossible to smoothly carry out services other than the image transfer, similarly to the above case.

Japanese Patent Laid-Open Publication No. 07-95418 discloses a technique in terms of an image communication apparatus in which various parameters, used in the event of image transfer, can be manually set when the image is transferred.

The above technique disclosed in the Japanese Patent Laid-Open Publication No. 07-95418 has a disadvantage that the user cannot recognize the traffic of a network during image data communication. In consequence, the user cannot set parameters during image transfer according to a change in traffic of the network. As a result, similarly to the above case, it is impossible to smoothly carry out services other than image transfer if the network is congested.

Japanese Patent Laid-Open Publication No. 07-75092 discloses a technique in terms of a digital motion picture compressing technique which shifts high frequency components of motion picture data having been compressed to lower frequency components depending on the state of traffic when the motion picture data is transferred to control the quantity of transmission data, thereby ensuring the number of frames per unit time period.

The above technique disclosed in Japanese Patent Laid-Open Publication No. 07-75092, however, needs some means for more effectively transferring the motion picture data on the basis of the state of the traffic, since the motion picture data is compressed, moreover, a frequency of which is converted.

In light of the above problems, an object of the present invention is to provide an image data communicating apparatus and a communication data quantity adjusting method used in an image data communication system, which transfer image data in an appropriate quantity of data on the basis of the traffic of a network without affecting other service provided by the network.

SUMMARY OF THE INVENTION

FIG. 1 is a block diagram showing a principle of this invention. An image data communicating apparatus 1a is connected over a network 20 to be able to transmit image data to the network 20, and includes a data transmitting unit 2, a traffic detecting unit 3 and a communication data quantity adjusting unit 4.

Here, the data transmitting unit 2 transmits image data to another image data communicating apparatus 19. The traffic detecting unit 3 detects the traffic of the network 20.

Further, the communication data quantity adjusting unit 4 sets a transmittable number of image transferring frames on the basis of the traffic detected by the traffic detecting unit 3 to automatically adjust the quantity of communication data in the data transmitting unit 2 on the basis of the set number of frames The traffic detecting unit 3 may transmit survey data to another image data communicating apparatus 19 prior to the image data. The traffic detecting unit 3 may have a survey data transmitting/receiving unit for receiving the survey data sent back from another image data communicating apparatus 19, and a time measuring unit for measuring the elapsed time from when the survey data was transmitted to when the survey data was sent back, thereby determining a traffic condition on the basis of the elapsed time measured by the time counting unit.

The above communication data quantity adjusting unit 4 may have a table in which a transmittable number of image transferring frames in relation to the traffic is stored to set the quantity of image transferring frames by referring to the table on the basis of the traffic detected by the traffic detecting unit 3.

Further, the traffic detecting unit 3 may detect the traffic of the network 20 at predetermined times to judge whether the image data can be transferred in an initial quantity of communication data or not. In which case, if the traffic detecting unit 3 judges that the image data cannot be transferred in an initial quantity of communication data, the communication data quantity adjusting unit 4 may re-set the transmittable number of image data transferring frames to re-adjust the quantity of communication data being transmitted.

The image data communicating apparatus 1a may have a first image data compressing unit for compressing image data that should be transmitted. In addition, the image data communicating apparatus may further have a compression parameter controlling unit for variably controlling a compression parameter by the first image data compressing unit so as to bring the number of frames close to the number of frames initially set by the communication data quantity adjusting unit 4 if the traffic detecting unit 3 judges that image data cannot be transferred in an initial quantity of communication data.

Further, the above compression parameter controlling unit may have a table in which a compression parameter used by the first image data compressing unit for a change in traffic is stored to variably control the compression parameter by referring to the table on the basis of a change in traffic detected by the traffic detecting unit 3.

The image data communicating apparatus may have a drawing size reducing unit for reducing a drawing size of image data, and a drawing size control unit for controlling to reduce a drawing size in the drawing size reducing unit so as to bring the current number of frames close to the number of frames initially set by the communication data quantity adjusting unit 4 if the traffic detecting unit 3 judges that it is impossible to transfer the image data in the initial quantity of communication data.

The above drawing size control unit may have a table in which a drawing size in relation to a change in traffic is stored to control the drawing size by referring to the table on the basis of a change in traffic detected by the traffic detecting unit.

The image data communicating apparatus 1b may have a second image data compressing unit for compressing image data that should be transmitted in a desired compressing method selected among plural compressing methods, and a compressing method selecting unit for selecting a compressing method in the second image data compressing unit so as to bring the number of frames close to the number of frames initially set by the communication data quantity adjusting unit 4 if the traffic detecting unit 3 judges that it is impossible to transfer the image data in the initial quantity of communication data.

The above compressing method selecting unit may have a table in which a compressing method corresponding to a change in traffic is stored to select a compressing method by the second image compressing unit by referring to the table on the basis of a change in traffic detected by the traffic detecting unit 3.

FIG. 2 is a block diagram showing another principle of this invention. The image data communicating apparatus 1b is connected over a network 20 to be able to transmit image data to the network 20. A data transmitting unit 2 operates for transmitting the image data to another image data communicating unit 19. A traffic detecting unit 3 detects traffic of the network 20.

The communication data quantity adjusting unit 4 sets a transmittable number of image transferring frames on the basis of the traffic detected by the traffic detecting unit 3 to automatically adjust a quantity of communication data in the data transmitting unit 2 on the basis of the set number of frames.

A first image data compressing unit 5 is for compressing image data that should be transmitted. A drawing size reducing unit 7 operates for reducing a drawing size of image data. A second image data compressing unit 9 is for compressing image data that should be transmitted in a desired compressing method selected among plural compressing methods.

The compression parameter-variably controlling unit 6 variably controls a compression parameter of the first image data compressing unit 5 so as to bring the number of frames close to the number of frames initially set by the communication data quantity adjusting unit 4 on the basis of the traffic detected by the traffic detecting unit 3.

The drawing size control unit 8 controls to reduce a drawing size in the drawing size reducing unit 7 on the basis of the traffic detected by the traffic detecting unit 3 so as to bring the number of frames close to the number of frames initially set by the communication data quantity adjusting unit 4.

The compressing method control unit 10 selects a compressing method for the second image data compressing unit 9 on the basis of the traffic detected by the traffic detecting unit 3 so as to bring the number of frames close to the number of frames initially set by the communication data quantity adjusting unit 4.

The selection control unit 11 selects at least one data processing mode among available data processings for the communication data quantity adjusting unit 4, the first image data compressing unit 5, the drawing size reducing unit 7, and the second image data compressing unit 9 according to the traffic detected by the traffic detecting unit 3. The selection control unit 11 does not implement data processings, which are not selected, but implements only the selected data processing.

FIG. 3 is a block diagram showing still another principle of this invention. In FIG. 3, the image data communicating apparatus 1c is connected over a network 20 to be able to transmit image data over the network 20.

A data receiving unit 12 serves for receiving the image data from another image data communicating apparatus 19 over the network 20. A data identifying unit identifies the type of data received by the data receiving unit 12.

The display control unit 15 displays received image data on the displaying unit 16 if the received data is identified as image data as a result of identification of the type of data by the data identifying unit 13.

The image data communicating apparatus 1c may have a survey data control unit for sending back survey data to another image data communicating apparatus 19 if received data transmitted from the another image data communicating apparatus 19 is identified as survey data as a result of identification of the type of data by said data identifying unit 13.

The display control unit 15 may have a drawing size regenerating unit for enlarging a drawing size of image data into an original size if a drawing size of received data have been reduced.

The above display control unit 15 may be configured with a window display control unit for displaying received image data in a window on the basis of a window system. The display control unit 15 may have a window managing unit for managing windows in the window system, and a transfer halt requesting unit for requesting the image data transmitting side to halt transfer of image data in a covered region if the window managing unit judges that a window displaying the image data therein is covered with another window.

In which case, if the window managing unit judges that a window displaying the image data therein is completely covered with another window, the transfer halt requesting unit may request the image data transmitting side to temporarily halt transfer of the image data.

Further, the display control unit 15 may be configured with a window display control unit for displaying received image data in a window on the basis of a window system, which has a focus state managing unit for managing the state of focus in a window in the window system, and a frame number adjusting signal outputting unit for outputting a signal to the image data transmitting side instructing adjustment of the number of transferring frames according to the state of focus in a window displaying therein the image data managed by the focus state managing unit.

The image data communicating apparatus may have a preferentially transferred region designating unit for designating an image region that should be preferentially transferred in a screen displayed by the displaying unit 16, and a designated region notifying unit for providing notifying information to the image data transmitting side as to the image region designated by the preferentially transferred region designating unit.

Further, the display control unit 15 may be configured with a window display control unit for displaying received image data in a window on the basis of a window system, besides having a pointing device position managing unit for managing a position of a pointing device in the window system, a preferentially transferred region designating unit for designating image data surrounding the pointing device as an image region that should be preferentially transferred if a position of the pointing device managed by the pointing device position managing unit is on image data displayed in a window by the window display control unit, and a designated region notifying unit for providing notifying information as to the image region designated by the preferentially transferred region designating unit to the image data transmitting side.

FIG. 4 is a block diagram showing still another principle of this invention. The image data communicating apparatus 1*d* is connected over a network 20 to be able to transmit/receive image data over the network 20, and is configured with a transmitting unit 17 and a receiving unit 18.

The transmitting unit 17 has a data transmitting unit 2, a traffic detecting unit 3 and a communication data quantity adjusting unit 4, whereas the receiving unit 18 has a data receiving unit 12, a data identifying unit 13, a display control unit 15 and a displaying unit 16.

The data transmitting unit 2 of the transmitting unit 17 transmits image data to another image data communicating unit 19. The traffic detecting unit 3 detects the traffic of the network 20.

The communication data quantity adjusting unit 4 sets a transmittable number of image transferring frames on the basis of the traffic detected by the traffic detecting unit 3 to automatically adjust the quantity of communication data in the data transmitting unit 2 on the basis of the set number of frames.

The data receiving unit 12 of the receiving unit 18 receives data from another image data communicating apparatus 19 over the network 20. The data identifying unit 13 identifies the type of the data received by the data receiving unit 12.

The display control unit 15 displays image data on the displaying unit 16 if the data identifying unit 13 identifies the received data as image data.

The traffic detecting unit 3 of the transmitting unit 17 may transmit survey data to another image data communicating apparatus 19 prior to transmitting image data. The traffic detecting unit 3 may have a survey data transmitting/receiving unit for receiving survey data sent back from another image data communicating apparatus 19, and a time measuring unit for measuring an elapsed time from when the survey data was transmitted to when the survey data was received back, thereby determining the traffic on the basis of the elapsed time measured by the time measuring unit. The receiving unit may have a survey data control unit for sending back survey data to another image data communicating apparatus 19 if received data is identified as the survey data sent back from another image data communicating apparatus 19 as a result of identification of the type of data by the data identifying unit 12, and outputting survey data to the survey data transmitting/receiving unit if received data is identified as the survey data transmitted from the survey data transmitting/receiving unit as a result of identification of the type of data by the data identifying unit 12.

The transmitting unit 17 may have a drawing size reducing unit for reducing a drawing size of image data, and a drawing size control unit for controlling to reduce the drawing size in the drawing size reducing unit so as to bring the number of frames close to the number of frames initially set by the communication data quantity adjusting unit, if the traffic detecting unit judges that it is impossible to transfer image data in the initial quantity of communication data. The receiving unit 18 may, at the same time, have a drawing size regenerating unit for enlarging a drawing size into an original size and displaying it if the drawing size of received image data has been reduced.

The display control unit 15 of the receiving unit 18 may be configured with a window display control unit for displaying received image data in a window on the basis of a window system, also having a window managing unit for managing windows in the window system, and a transfer halt requesting unit for requesting the image data transmitting side to halt transfer of image data in a covered region if the window managing unit judges that a window displaying image data therein is covered with another window. If receiving a request to halt transfer of image data from the image data receiving side, the data transmitting unit 2 of the transmitting unit 17 may halt transmission of image data in the covered region.

The display control unit 15 of the receiving unit 18 may be configured with a window display control unit for displaying received image data in a window on the basis of a window system, also having a focus state managing unit for managing the state of focus in a window in the window system, and a frame number adjusting signal outputting unit for outputting a signal to the image data transmitting side instructing an adjustment in the number of transferring frames according to the state of focus in a window displaying therein image data managed by the focus state managing unit. The data transmitting unit 2 of the transmitting unit 17 may adjust the number of frames on the basis of the signal when receiving the signal instructing adjustment in the number of transferring frames from the image data receiving side.

The receiving unit 18 may further have a preferentially transferred region designating unit for designating an image region that should be preferentially transferred in a screen displayed on the displaying unit 16, and a designated region notifying unit for sending information to the image data transmitting side as to the image region designated by the preferentially transferred region designating unit. The data transmitting unit 2 of the transmitting unit 17 may be inputted thereto the information as to the image region designated by the image data receiving side, thereby preferentially transferring the designated image region so as to decrease the frequency of transfer of image data of the remaining parts.

The display control unit 15 of the receiving unit 18 may be configured with a window display control unit for displaying received image data in a window on the basis of a window system, also having a pointing device position managing unit for managing the position of a pointing device in the window system, a preferentially transferred region designating unit for designating image data surrounding the pointing device as an image region that should be a preferentially transferred region if a position of the pointing device is on the image data displayed in the window by the window display control unit, and a designated region notifying unit for notifying information to the image data transmitting side as to the image region designated by the preferentially transferred region designating unit. The data transmitting unit 2 of the transmitting unit 17 may be inputted thereto the information from the image data receiving side, as to the designated image region thereby preferentially transferring the designated image region so as to decrease the frequency of transfer of image data of another part.

A communication data quantity adjusting method according to this invention is used in an image data communication system having plural image data communicating apparatuses connected to each other over a network to be able to transmit/receive image data over the network. In the communication data quantity adjusting method according to this invention a transmittable number of image data transferring frames is set on the basis of traffic of the network to automatically adjust the quantity of communication data.

In the image data communicating apparatus on a transmitting side, the state of the traffic of the network is examined at predetermined times to judge whether or not it is possible to transfer image data in an initially set quantity of communication data. If it is determined as a result of the judgement that it is impossible to transfer the image data in frames in the initial number, the transmittable number of image data transferring frames for the image data may be re-set on the basis of the traffic of the network so as to adjust the quantity of communication data.

If it is found as a result of the judgement that it is impossible to transfer the image data in frames in the initial number, image compression may be implemented on the image data with a compression parameter set on the basis of the traffic of the network to transmit the compressed image data, thereby controlling to bring the transferable number of frames of the image data close to the initial number of frames.

If it is found as a result of the judgement that it is impossible to transfer the image data in frames in the initial number, image size of the image data may be altered on the basis of the traffic of the network to transmit the image data, thereby controlling to bring the transferable number of frames of the image data close to the initial number of frames. When the image data communicating apparatus on the receiving side receives the image data whose image size has been altered, it is possible to restore the received image data into the original size and display it.

If it is found as a result of the judgement that it is impossible to transfer the image data in frames in the initial number, image compression may be implemented on the image data in a desired compressing method on the basis of the traffic of the network, thereby controlling to bring the transferable number of image data close to the initial number of frames.

Image data in a region designated by the user within a screen in which the image data is drawn in the image data communicating apparatus on the receiving side may be preferentially transferred from the image data communicating apparatus on the transmitting side so as to decrease the frequency of transfer of image data of another part.

As another aspect of this invention, a communication data quantity adjusting method according to this invention is used in a image data communication system having plural image data communicating apparatuses connected to each other over a network 20 to be able to transmit/receive image data, each of which displays the received data in a window by a window system, where a transmittable number of image data transferring frames is set in the image data communicating apparatus on a transmitting side on the basis of the traffic of the network 20 so as to automatically adjust the quantity of communication data.

If image data displayed in a window is covered with another window in the image data communicating apparatus on a receiving side, it is possible to request an image data transmitting side to halt transfer of image data in the covered region. When the image data communicating apparatus on the transmitting side receives the request to halt transfer of the image data from the image data communicating apparatus on the receiving side, it is possible to halt transmission of image data in the covered region.

It is further possible to vary the number of transferring frames that should be transmitted from the image data communicating apparatus on the transmitting side on the basis of the state of focus in a window for image data displayed in the window in the image data communicating apparatus on the receiving side.

It is still further possible that the image data communicating apparatus on the transmitting side preferentially transfers image data surrounding a pointing device within a window of the image displayed in the window in the image data communicating apparatus on the receiving side so as to decrease a frequency of transfer of image data of another part.

As still another aspect of this invention, a communication data quantity adjusting method according to this invention is used in an image data communication system having plural image data communicating apparatuses connected to each other over a network to be able to transmit/receive image data over the network, where survey data used to detect the traffic of the network 20 is transmitted along with image data from the image data communicating apparatus on a transmitting side to the image data communicating apparatus on a receiving side over the network 20. In the image data communicating apparatus on the receiving side, the image data and the survey data from the image data communicating apparatus on the transmitting side are identified, then the survey data is sent back to the image data communicating apparatus on the transmitting side, whereas the image data is displayed on a displaying unit. In the image data communicating apparatus on the transmitting side, the traffic of the network 20 is detected on the basis of the survey data from the image data communicating apparatus on the receiving side to set a transmittable number of image data transferring frames on the basis of the detected traffic of the network 20, thereby automatically controlling the quantity of communication data.

BRIEF DESCRIPTION OF THE DRAWINGS

FIG. 14 is a diagram showing a form of a compression parameter table according to the third embodiment of this invention;

FIG. 17 is a diagram showing a form of an image size table according to the fourth embodiment of this invention;

FIG. 43 is a diagram showing a priority table according to the tenth embodiment of this invention;

FIG. 44 is a diagram showing an image size table according to the tenth embodiment of this invention;

FIG. 45 is a diagram showing a compression parameter table according to the tenth embodiment of this invention;

FIG. 46 is a diagram showing a compressing system table according to the tenth embodiment of this invention;

FIG. 47 is a diagram showing a traffic control table according to the tenth embodiment of this invention;

DESCRIPTION OF PREFERRED EMBODIMENTS (a) First Embodiment

Figure 5:
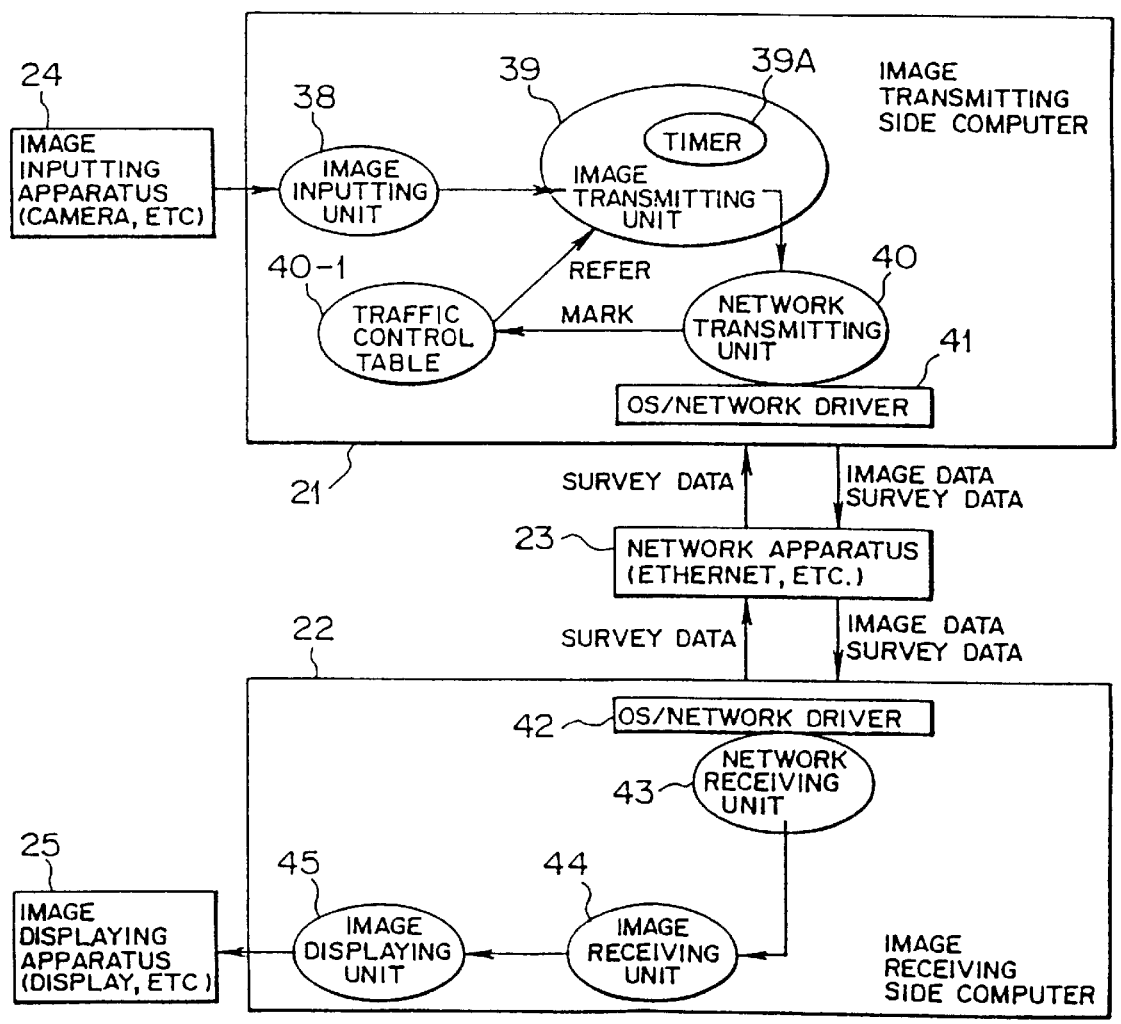
FIG. 5 is a block diagram showing an image data communication system to which an image data communicating apparatus according to a first embodiment of this invention is applied.

FIG. 5 is a block diagram showing an image data communication system to which an image data communicating apparatus according to a first embodiment of this invention is applied. The network apparatus 23 is connected to an image transmitting side computer 21, an image receiving side computer 22 and other communication terminals not shown to configure a computer network such as LAN, WAN or the like, which is configured with, for example, Ethernet.

Namely, the image transmitter side computer 21 can transmit image data such as video images over the network apparatus 23 to the image receiver side computer 22.

Figure 6:
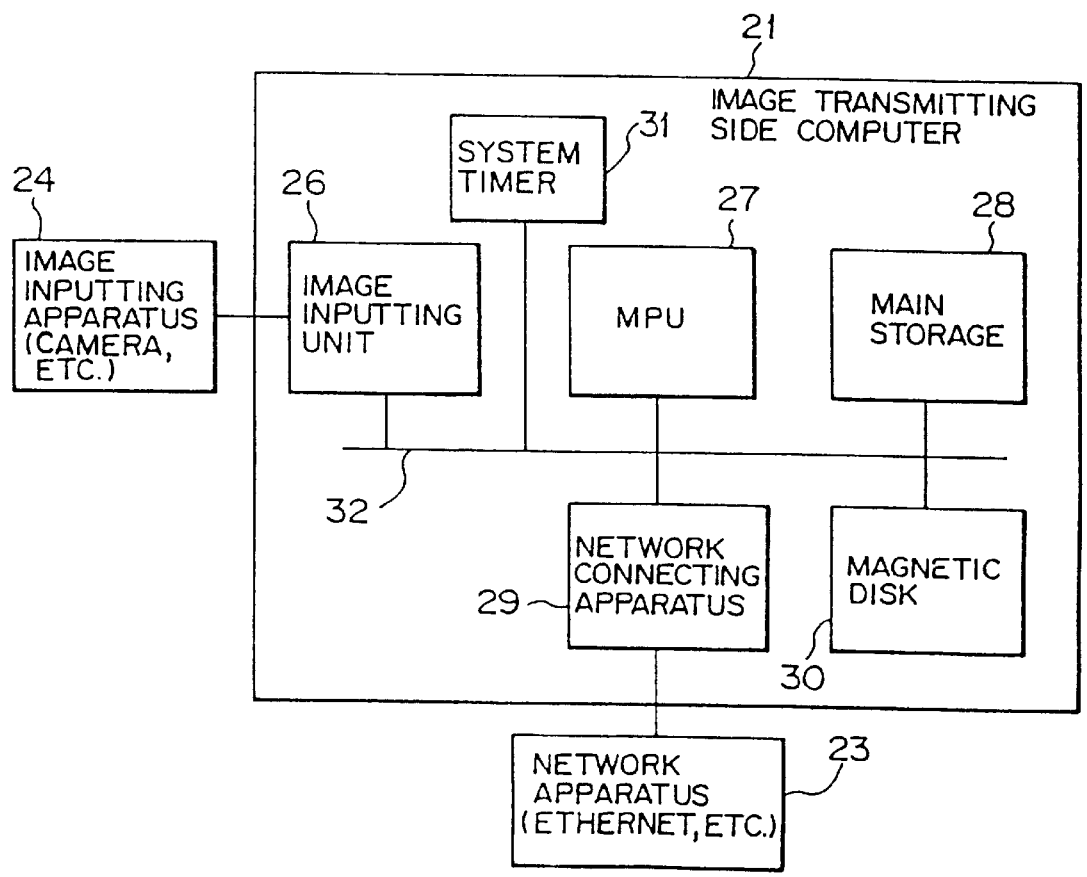
FIG. 6 is a block diagram showing a hardware structure of an image transmitting side computer according to the first embodiment of this invention.

The image transmitter side computer 21 has a function as an image data communicating apparatus, which is connected over the network apparatus 23, to be able to transmit image data or survey data used to detect traffic of the network apparatus 23, which has a hardware structure as shown in FIG. 6.

Namely, the image transmitter side computer 21 is, as shown in FIG. 6, configured with an image inputting unit 26, an MPU (a microprocessing unit) 27, a main storage 28, a network connecting apparatus 29 and a magnetic disk 30 which are connected to each other via a bus 32.

Here, the image inputting unit 26 is connected to an image inputting apparatus 24 such as a video camera or the like to interface the image inputting apparatus 24 with the image transmitter side computer 21, to which image information from the image inputting apparatus 24 is inputted. In other words, the image inputting unit 26 converts the image information from the image inputting apparatus 24 into data which can be processed by the image transmitter side computer 21.

The MPU 27 is served to execute a program. The main storage 28 stores therein operation data such as a program and the like. The network connecting apparatus 29 functions as an interface with the network apparatus 23. The magnetic disk 30 stores retention data therein. A system timer 31 notifies time information to an OS (an Operating System) in an OS/network driver 41 described later.

The image transmitting side computer 21 functionally has an image inputting unit 38, an image transmitting unit 39, a network transmitting unit 40, an OS/network driver 41 and a traffic control table 40-1. When these functions are executed, the OS in the OS/network driver 41 is loaded into the main storage 28 and the MPU 27 successively executes a program stored in the main storage 28.

Here, the image inputting unit 38 converts image data (digital data) inputted from the video camera 24 into a data form which can be processed within the image transmitting side computer 21 besides storing it in the main storage 28.

Further, the image transmitting unit 39 notifies image data stored in the main storage 28 to a network transmitting unit 40 on the basis of a transmitting timing. The image transmitting unit 39 is provided with a timer 39A.

Here, the timer 39A generates frame transmitting timings so as to transfer image data in frames in a number (quantity) set by the network transmitting unit 40. The timings of the timer 39A are set in the image transmitting unit 39 by referring to information as to the number of frames that should be transmitted in the traffic control table 40-1 described later.

The network transmitting unit 40 requests the OS/network driver 41 to transmit image data in the main storage 28. In addition, the network transmitting unit 40 requests the OS/network driver 41 to transmit survey data used to detect traffic of the network apparatus 23 prior to the above transmission of image data. The network transmitting unit 40 also has a function as a survey data transmitting/receiving unit for receiving the survey data sent back from the image receiving side computer 22 via the OS/network driver 41 and the network transmitting unit 40.

The network transmitting unit 40 further has a function as a time measuring unit for measuring a time period from when survey data is transmitted as transmitting data to when the survey data are sent back from the image receiving side computer 22 on the basis of time information from the OS/network driver 41.

Therefore, the above-mentioned network transmitting unit 40 functions as a traffic detecting unit for detecting traffic of the network apparatus 23 on the basis of the survey data sent back from the image receiving side computer 22.

The network transmitting unit 40 divides a data length of the survey data by an elapsed time, thereby calculating a data transfer rate (a quantity of communication data per unit time period) representing traffic of the network apparatus 23.

Figure 8:
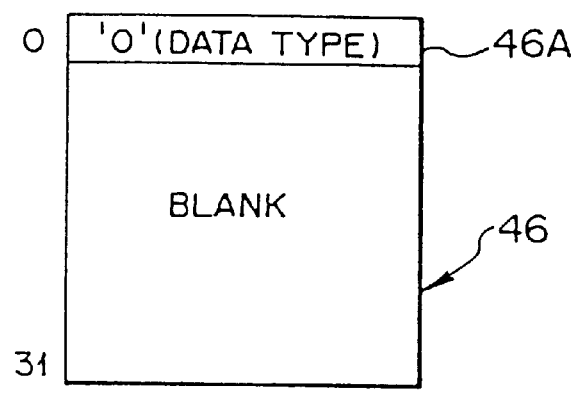
FIG. 8 is a diagram showing a format of survey data according to the first embodiment of this invention.

The survey data 46 used to detect traffic of the above-mentioned network apparatus 23 has a data format of 32 octets as shown in FIG. 8, for example. Namely, in a first octet region 46A of the survey data 46, there is described information "0" representing that the data type is the survey data.

Figure 9:
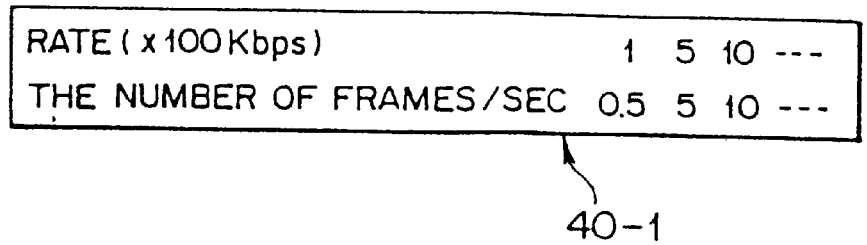
FIG. 9 is a diagram showing a form of a traffic control table according to the first embodiment of this invention.

Incidentally, the traffic control table 40-1 has a function as a table in which a transmittable number of transmitting frames relative to a data transfer rate is stored as traffic information of the network apparatus 23. In particular, the traffic control table 40-1 has a structure as shown in FIG. 9.

Namely, if an image transfer rate is 100 kbps, the number of image transferring frames per second is set to 0.5 frame. If the image transfer rate is 500 kbps, the number of image transferring frames is set to 5 frames per second. If the image transfer rate is 1000 kbps, the number of image transferring frames is set to 10 frames per second.

In the network transmitting unit 40, a flag is set (marked) in a region corresponding to a data transfer rate as the traffic information in the above-mentioned traffic control table 40-1, whereby the image transmitting unit 39 can read the number of transferring frames corresponding thereto from the traffic control table 40-1.

In the network transmitting unit 40, if a data transfer rate not stored in the above-mentioned traffic control table 40-1 is obtained, it is possible to mark the number of image transferring frames to be set to a transfer rate which is smaller than and closest to the obtained data transfer rate in the traffic control table 40-1 as the number of frames that should be transmitted.

The image transmitting unit 39 can thereby set the timer 39A by referring to the number of transferring frames marked in the traffic control table 40-1, and transmit image data in transmitting frames in the number marked in the traffic control table 40-1. Namely, the image transmitting computer 21 can transmit image data in an appropriate quantity of transmission data on the basis of the traffic.

Therefore, the image transmitting unit 39, the network transmitting unit 40, and the traffic control table 40-1 mentioned above have a function, as a communication data quantity adjusting unit, for setting a transmittable number of image transmitting frames on the basis of detected traffic to automatically adjust the quantity of communication data on the basis of the set number of frames.

The OS/network driver 41 transfers data (image data or survey data) in the main storage 28 to the network apparatus 23 through the network connecting apparatus 29. Namely, the OS/network driver 41 is a part interfacing the network transmitting unit 40 with the network connecting apparatus 29, which has a function to virtualize the equipments so as to facilitate use of the device.

In other words, the above-mentioned OS/network driver 41 has a function as a data transmitting unit for transmitting image data or survey data to the image receiving side computer 22.

Further, the image receiving side computer 22 has a function as an image data communicating apparatus connected over the network apparatus 23 to be able to receive image data along with survey data which is used to detect traffic of the network apparatus 23. The image receiving side computer 22 has a hardware structure as shown in FIG. 7.

Figure 7:
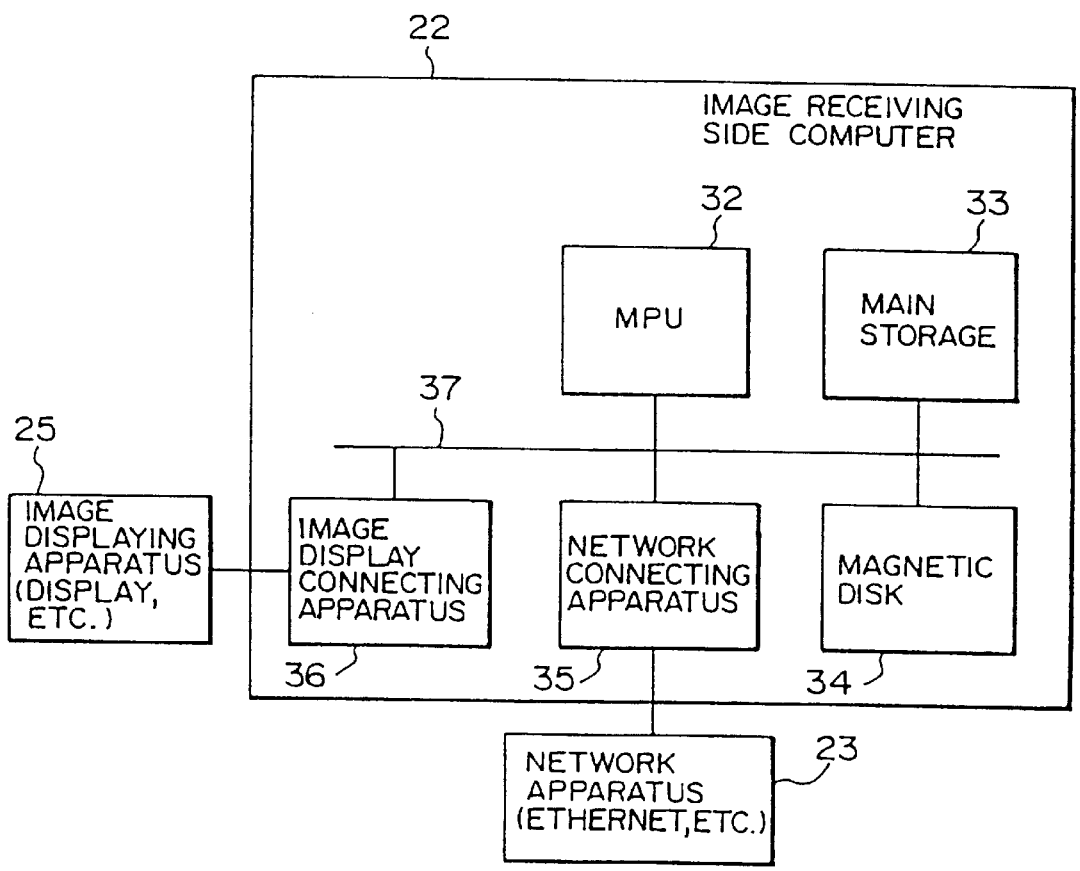
FIG. 7 is a block diagram showing a hardware structure of an image receiving side computer according to the first embodiment of this invention.

The image receiving side computer 22 has an MPU 32, a main storage 33, a magnetic disk 34 and a network connecting apparatus 35 similar to those in the above-mentioned image transmitting side computer 21, in addition to an image display connecting apparatus 36, which are connected to each other via a bus 37, as shown in FIG. 7.

The image display connecting apparatus 36 is connected to an image displaying apparatus 25 such as a display or the like to controllably display image data received from the image transmitting side computer 21 over the network 23.

Incidentally, the image receiving side computer 22 functionally has an OS/network driver 42, a network receiving unit 43, an image receiving unit 44 and an image displaying unit 45. When these function are executed, an OS in the OS/network driver 42 is loaded into the main storage 33 and the MPU 32 successively executes a program stored in the main storage 33, similarly to the above-mentioned image transmitting side computer 21.

The OS/network driver 42 has a function as a data receiving unit for receiving image data from the image transmitting side computer 21 over the network apparatus 23.

In particular, the OS/network driver 42 is inputted thereto received data from the network apparatus 23, temporarily holds the received data in the main storage 33, and notifies data reception to the network receiving unit 43.

The network receiving unit 43 receives a notification of data reception from the OS/network driver 42 and identifies the type of the data by referring to the first octet region of the received data. If the received data is identified as image data, the network receiving unit 43 notifies the image receiving unit 44 that there is image data stored in the main storage 33.

Figure 1:
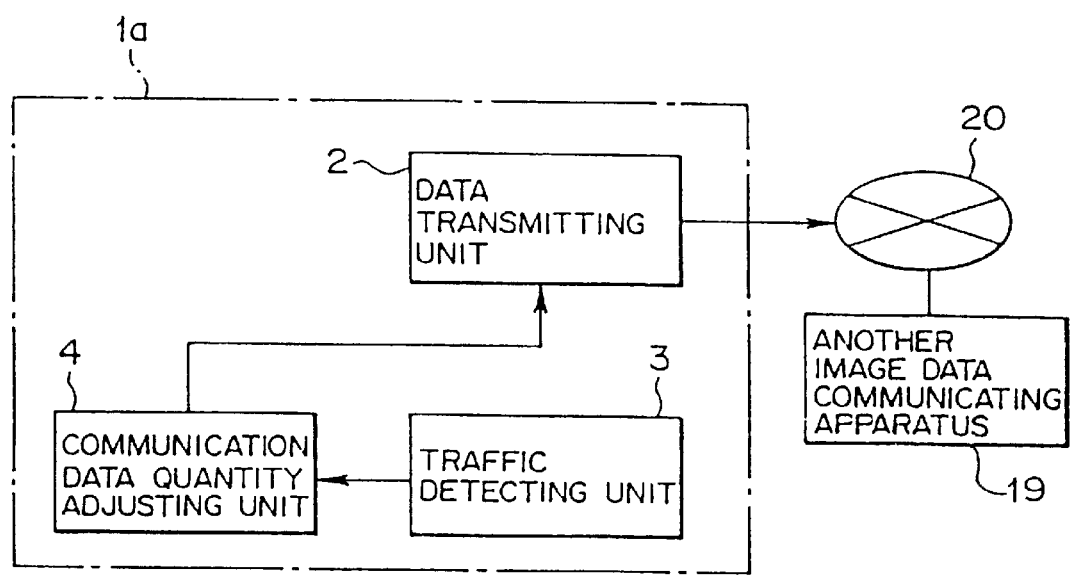
FIG. 1 is a block diagram showing a principle of this invention.
Figure 2:
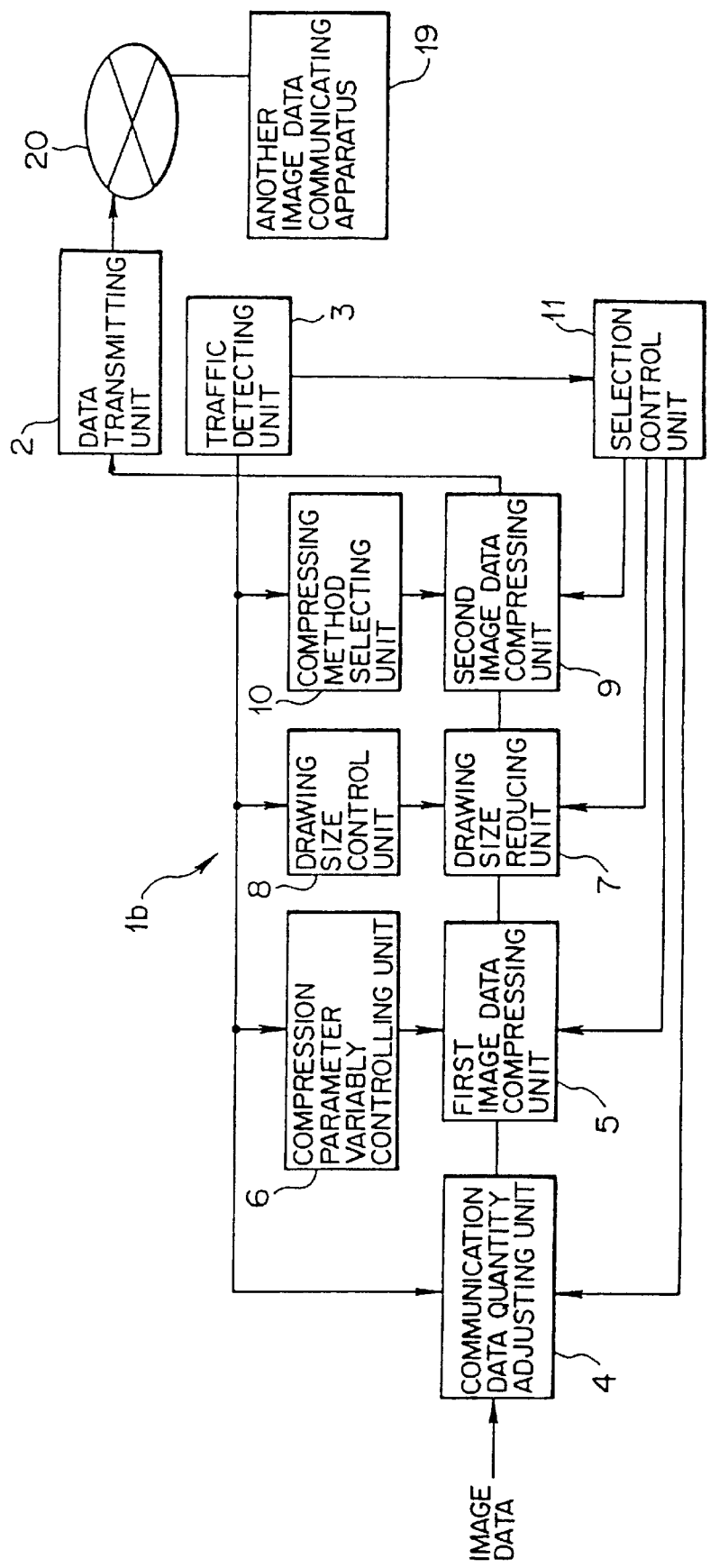
FIG. 2 is a block diagram showing another principle of this invention.
Figure 3:
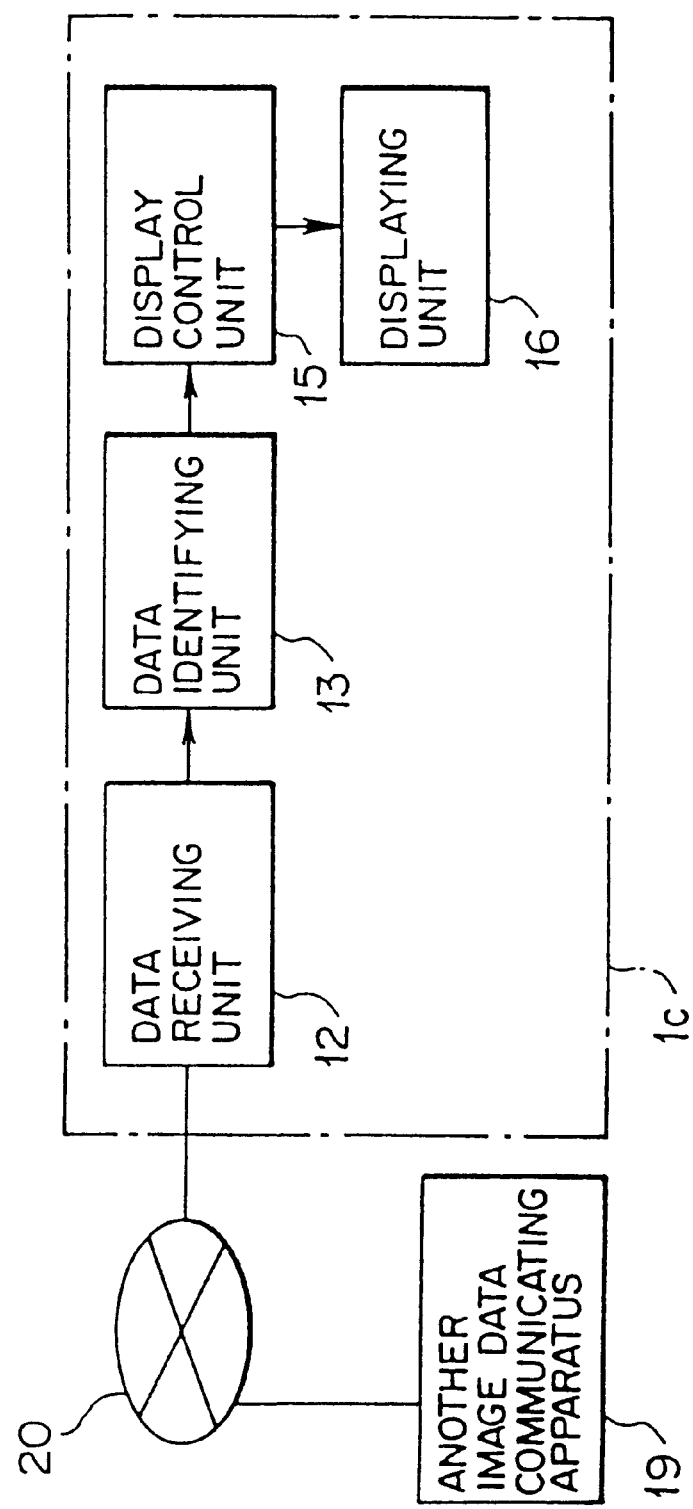
FIG. 3 is a block diagram showing still another principle of this invention.
Figure 4:
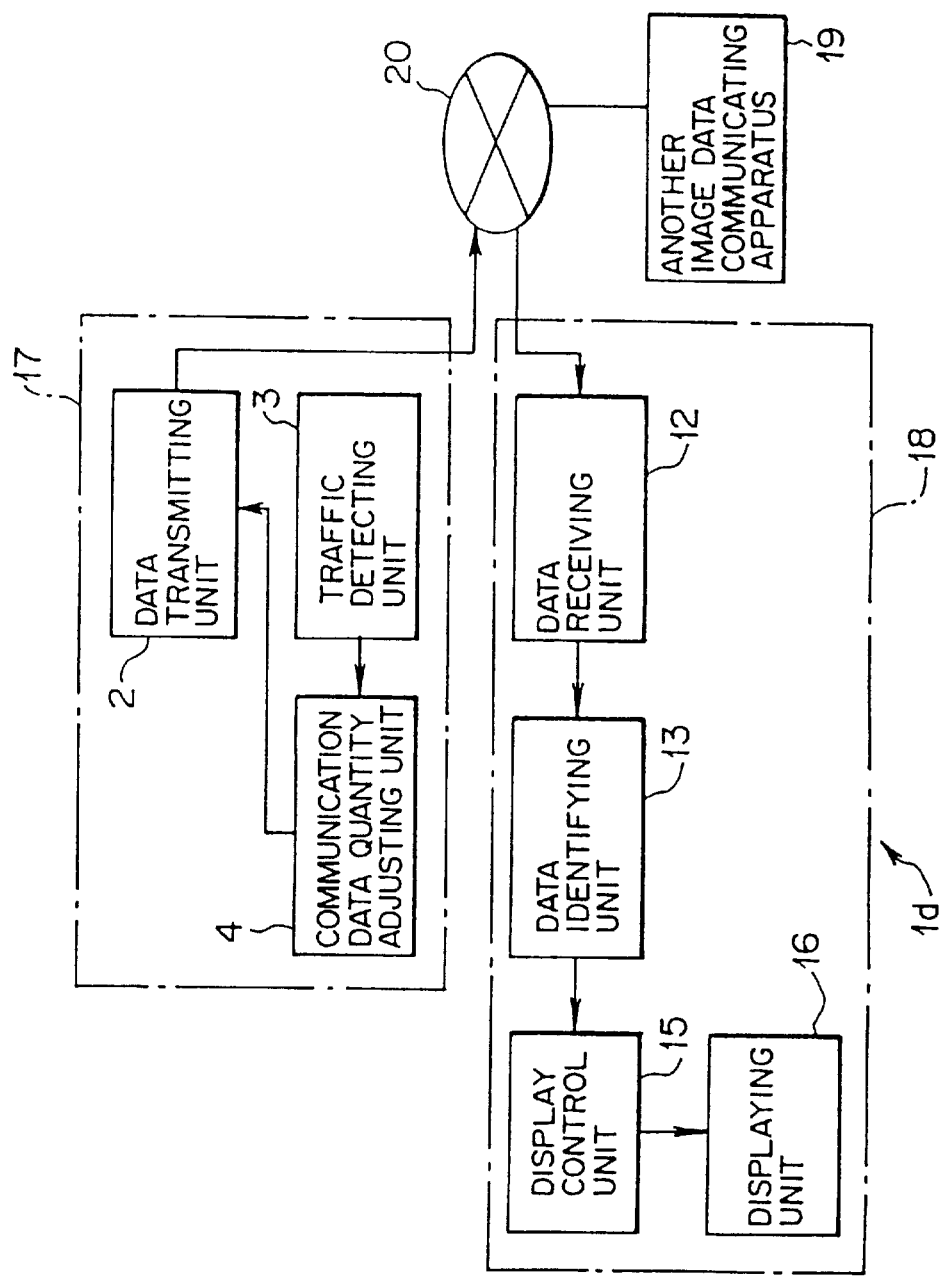
FIG. 4 is a block diagram showing still another principle of this invention.

If the received data is identified as the survey data 46A transmitted from the image transmitting side computer 21 on the basis of the information "0" described in the first octet region 46A as data shown in FIG. 3, for example, the network receiving unit 43 sends back the survey data 46 to the image transmitting side computer 21.

Namely, the above-mentioned network receiving unit 43 has a function as a data identifying unit for identifying types of image data and survey data received by the OS/network driver 42, and a function as a survey data control unit for sending back received survey data to the image transmitting side computer 21 if the received data is identified as survey data as a result of identification of the type of the data.

The image receiving unit 44 receives a notification from the network receiving unit 43 to take out image data from received data stored in the main storage 33, places it in the main storage 33, and notifies the data to the image displaying unit 45.

The image displaying unit 45 has a function as a display control unit for displaying received data identified as image data by the network receiving unit 43 on the image displaying apparatus 25. In particular, the image displaying unit 45 receives a notification from the image receiving unit 44 to activate the image display connecting apparatus 36 with respect to image data placed in the main storage 33, thereby controlling display of the image data on the image displaying unit 25.

Now, operation of the first embodiment with the above structure according to the first embodiment of this invention will be described with reference to FIG. 10.

When an image communication such as a video image communication or the like is initiated between the image transmitting side computer 21 and the image receiving side computer 22, the traffic of the network apparatus 23 is surveyed in advance using survey data.

Figure 10:
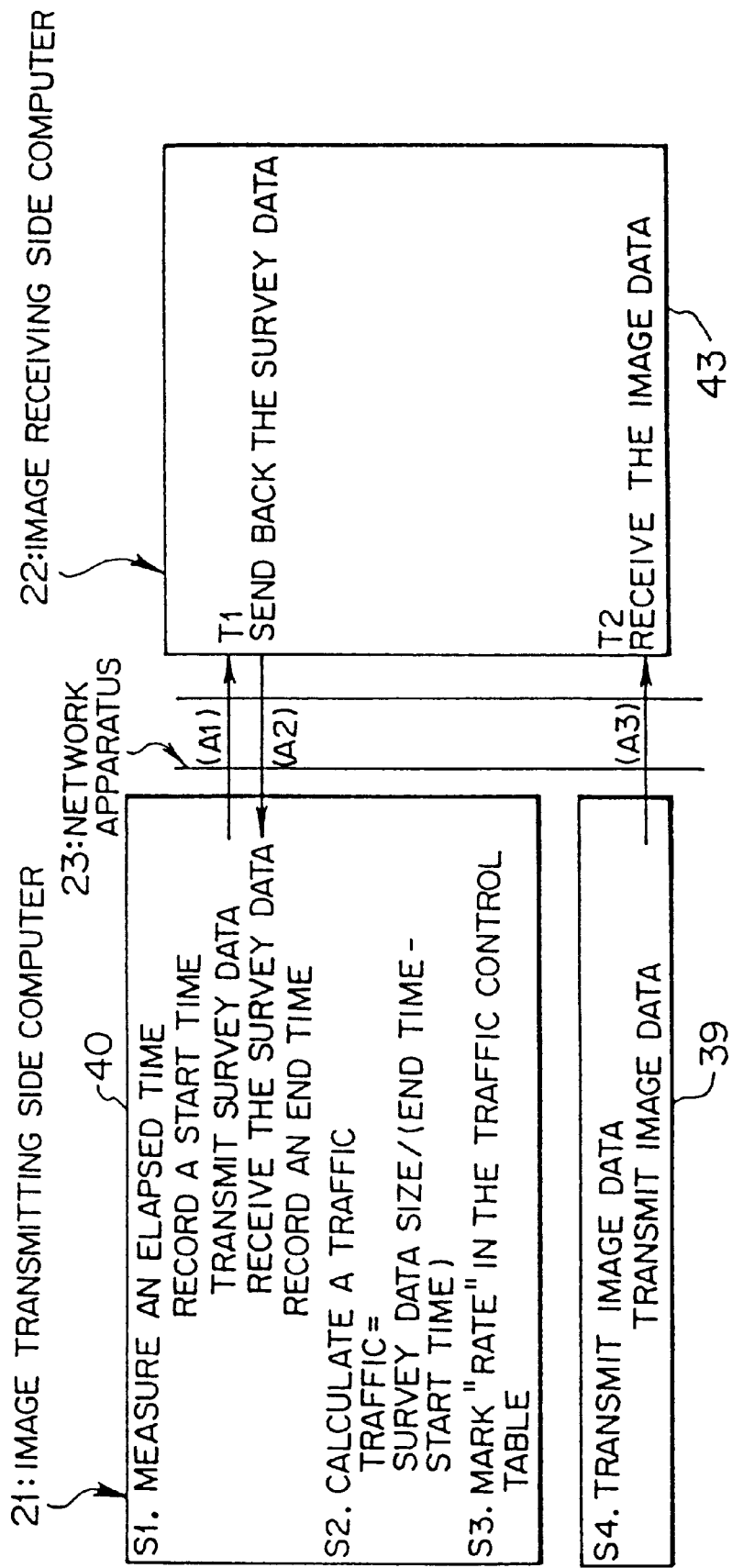
FIG. 10 is a communication sequence diagram for illustrating an operation of the first embodiment of this invention.

Namely, the network transmitting unit 40 records the current time notified from the OS/network driver 41, and at the same time, transmits survey data to the image receiving side computer 22 via the OS/network driver 41 over the network apparatus 23 [refer to a signal (A1) in FIG. 10]

When the OS/network driver 42 of the image receiving side computer 22 receives the data, the network receiving unit 43 identifies the data type of the received data by examining the first octet region of the received data.

In this case, the network receiving unit 43 identifies that the received data is survey data since the network receiving unit 43 has received the survey data and has determined that the first octet region of the received data is "0". The network receiving unit thus immediately sends back the survey data to the image transmitting side computer 21 [Step T1, refer to a signal (A2) in FIG. 10]

When receiving the survey data sent back from the image receiving side computer 22, the network transmitting unit 40 records that arrival time supplied from the OS/network driver 41 to measure an elapsed time from when the survey data was transmitted to when the survey data was received back, thereby detecting a rate of the network (Step S1).

The network transmitting unit 40 further divides the data length (32 octets in this case) of the survey data by the measured elapsed time so as to obtain a data transfer rate as a current traffic value (Step S2).

Following that, the network transmitting unit 40 refers to the traffic control table 40-1 to mark a current traffic value. If the calculated data transfer rate does not coincide with a data transfer rate recorded in the traffic control table 40-1, the network transmitting unit 40 marks a value smaller than and closest to the calculated data transfer rate (Step S3).

For instance, in the case where the traffic control table 40-1 is as shown in FIG. 9, if the calculated traffic is 250 kbps, 100 kbps of the traffic is marked.

The image transmitting unit 39 sets the timer 39A controlling transmitting timings for image data on the basis of the number of image transferring frames corresponding to the traffic value marked in the traffic control table 40-1, thereby initiating an image transmission in frames in the number corresponding to the traffic value (Step S4).

If 100 kbps is marked in the traffic control table 40-1, for example, the number of image transferring frames is "0.5", so that the image transmitting unit 39 generates image data at a timing of 0.5 frame per second, and transmits the image data to the image receiving side computer 22 via the network transmitting unit 40 and the OS/network driver 41 [refer to a signal (A3) in FIG. 10].

When receiving the image data, the network receiving unit 43 in the image receiving side computer 22 controls the image displaying unit 45 through the image receiving unit 44 to display the image data on the image displaying apparatus 25 (Step T2).

The image data communicating apparatus according to the first embodiment of this invention is used in an image data communication system having the image transmitting side computer 21 and the image receiving side computer 22 as plural image data communicating apparatuses, which are connected to each other over the network apparatus 23 to be able to transmit/receive image data over the network. The image transmitter side computer 21 has the image transmitting unit 39, the network transmitting unit 40 and the traffic control table 40-1, in which a transmittable number of image data transferring frames is set on the basis of traffic of the network apparatus prior to transmission of image data, thereby automatically adjusting the quantity of communication data, as above. In consequence, this embodiment enables image data transmission most suitable for a network environment without affecting other services provided by the network apparatus 23.

In this embodiment described above, there is provided a traffic control table 40-1, in which a transmittable number of image transferring frames in respect to the traffic is stored, and the image transmitting unit 39 determines an appropriate number of image transferring frames by referring to the traffic control table 40-1. However, this invention is not limited to the above example. It is alternatively possible to provide a function unit for marking the traffic and another function unit for outputting the number of frames corresponding to a traffic value when the traffic value is inputted thereto, and these function units are substituted for the above table 40-1.

It is further possible, for example, that there is provided a function-operation function unit having a characteristic relating the number of image transferring frames to a data transfer rate stored in the above-mentioned traffic control table 40-1, then the appropriate number of image transferring frames is determined through an operation with the calculated data transfer rate as a variable, and this function unit is substituted for the above table 40-1.

In this embodiment described above, a traffic value is determined using survey data. However, this invention is not limited to the above example, but it is possible that the OS/network driver 41 detects the number of times of collision of packets in the network apparatus 23, and the detected number of times of collision of packets is used as a traffic value. In which case, a table including the number of times of collision and the number of frames is prepared to determine the number of image transferring frames using this table.

(b) Second Embodiment

Figure 11:
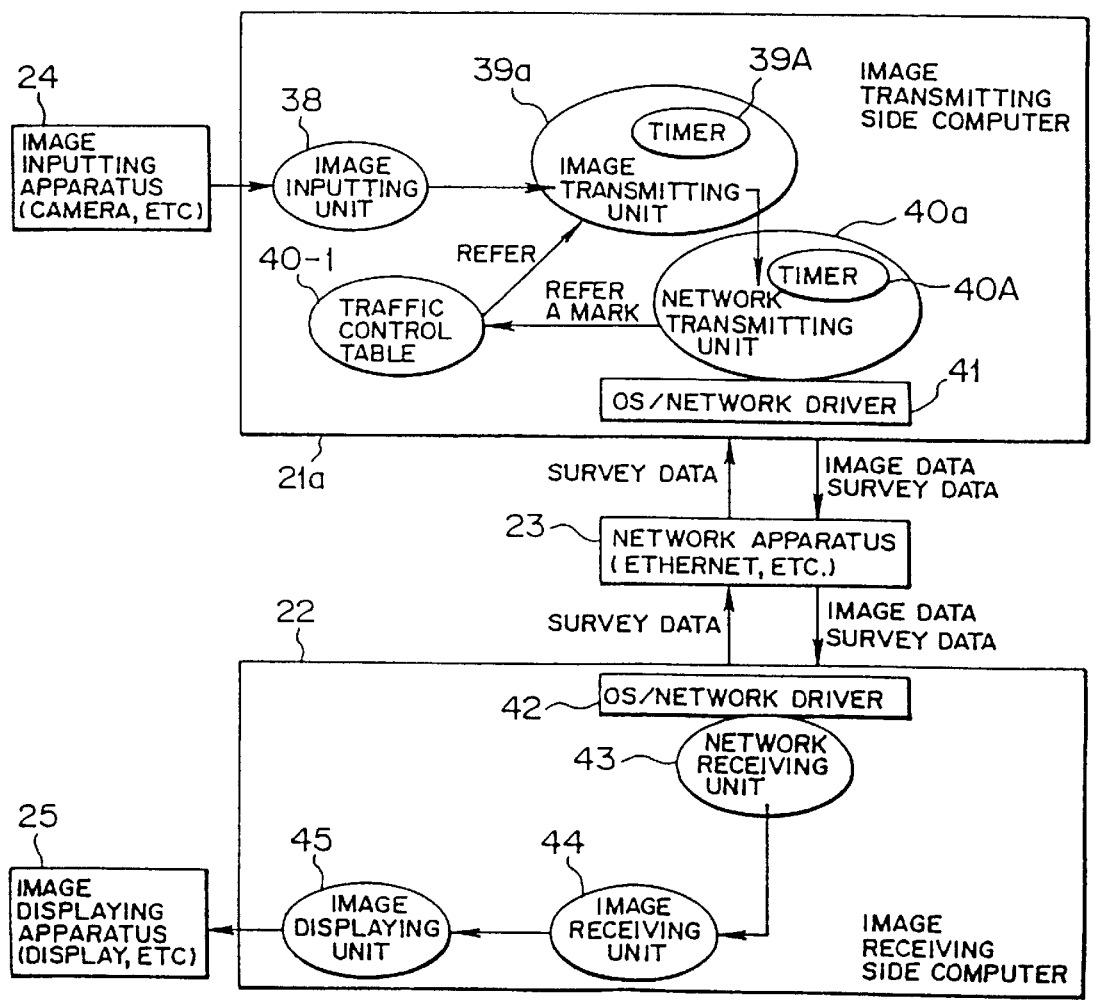
FIG. 11 is a block diagram showing an image data communication system to which an image data communicating apparatus according to a second embodiment of this invention is applied.

FIG. 11 is an image data communication system to which an image data communicating apparatus according to a second embodiment of this invention is applied. The image data communication system shown in FIG. 11 has an image transmitting side computer 21a as the image data communicating apparatus having a structure different from that according to the first embodiment described hereinbefore. Other parts of the structure remain the same as the image data communication system according to the first embodiment, detailed description of which are thus omitted.

The image transmitting side computer 21a according to this second embodiment has a hardware structure similar to that according to the first embodiment described hereinbefore (refer to FIG. 6). The image receiving side computer 22 has a hardware structure similar to that according to the first embodiment described hereinbefore (refer to FIG. 7), as well.

Like reference characters in FIG. 11 designate like or corresponding parts in FIG. 5.

The image transmitting side computer 21a according to this embodiment sets the number of transmitting frames corresponding to the traffic of the network apparatus 23 prior to transmission of image data in the same manner as in the first embodiment described hereinbefore (refer to reference numeral 21). Different from the image transmitting side computer 21 according to the first embodiment, the image transmitting side computer 21a according to this embodiment detects the traffic at every predetermined period (at predetermined intervals) to judge whether it is possible to transmit image data in an initial quantity of communication data or not. If it is judged that it is impossible to transmit the image data in the initial quantity of communication data, the image transmitting side computer 21a re-adjusts the quantity of communication data.

For instance, transfer of image data in an initially set quantity of communication data may affect communications over another network apparatus 23 if traffic of the network apparatus 23 is congested. The image transmitting side computer 21a thus can judge that transfer of image data in an initial quantity of communication data is impossible.

Here, an image transmitting unit 39a, a network transmitting unit 40a and the traffic control table 40-1 set the number of frames for image data that should be transmitted on the basis of a traffic value detected using survey data in a stage preceding transmission of the image data, similarly to the first embodiment described hereinbefore.

Further, the network transmitting unit 40a which has a timer 40A, transmits survey data at predetermined time intervals to the image receiving side computer 22 even during transfer of images so as to detect the traffic.

The timer 40A generates timings used to transmit survey data at predetermined times (every one minute, for example) to the image receiving side computer 22 during transfer of images.

The network transmitting unit 40a refers to the traffic control table 40-1 on the basis of the traffic value detected from survey data transmitted every predetermined time. If a traffic value marked in the traffic control table 40-1 differs from a traffic value newly detected, the network transmitting unit 40a nullifies the marked traffic value and marks the newly detected traffic value in the traffic control table 40-1.

For instance, the network transmitting unit 40a can judge whether it is possible to transfer image data in an initial quantity of communication data or not depending on whether the detected traffic value is larger than the initial traffic value or not.

If a data transfer rate as a detected traffic value is smaller than an initial traffic value, the network transmitting unit 40a judges that image data cannot be transferred in a quantity of communication data as initially set, since the network apparatus 23 is presently more congested than at the earlier evaluation of traffic. The network transmitting unit 40a therefore re-adjusts the quantity of communication data by marking the newly detected traffic value in the traffic control table 40-1.

If a data transfer rate not stored in the above-mentioned traffic control table 40-1 is obtained, the network transmitting unit 40a can mark the number of image transferring frames, set to a transfer rate smaller than and closest to the obtained data transfer rate, as the number of frames that should be transmitted, similarly to the first embodiment described hereinbefore.

The image transmitting unit 39a refers to the traffic control table 40-1, reads out the number of transmitting frames corresponding to a traffic value marked in the traffic control table 40-1 to set the timer 39A for controlling timing of transmission.

Namely, image data transmitted from the image transmitting unit 39a is transmitted at a data transfer rate (in number of transmitting frames) marked in the traffic control table 40-1 at timings provided by the timer 39A. The image transmitting side computer 21a can therefore transmit image data in an appropriate quantity of transmitting data on the basis of a traffic.

The image transmitting unit 39a, the network transmitting unit 40a and the traffic control table 40-1 have a function as a communication data quantity adjusting unit for setting a transmittable number of image transferring frames on the basis of the detected traffic to automatically adjust the quantity of communication data, which is sent, on the basis of the set number of frames, similarly to the first embodiment described hereinbefore.

An operation of the image data communication system to which the image data communicating apparatus with the above structure according to the second embodiment of this invention will next be described with reference to a signal sequence diagram shown in FIG. 12.

Figure 12:
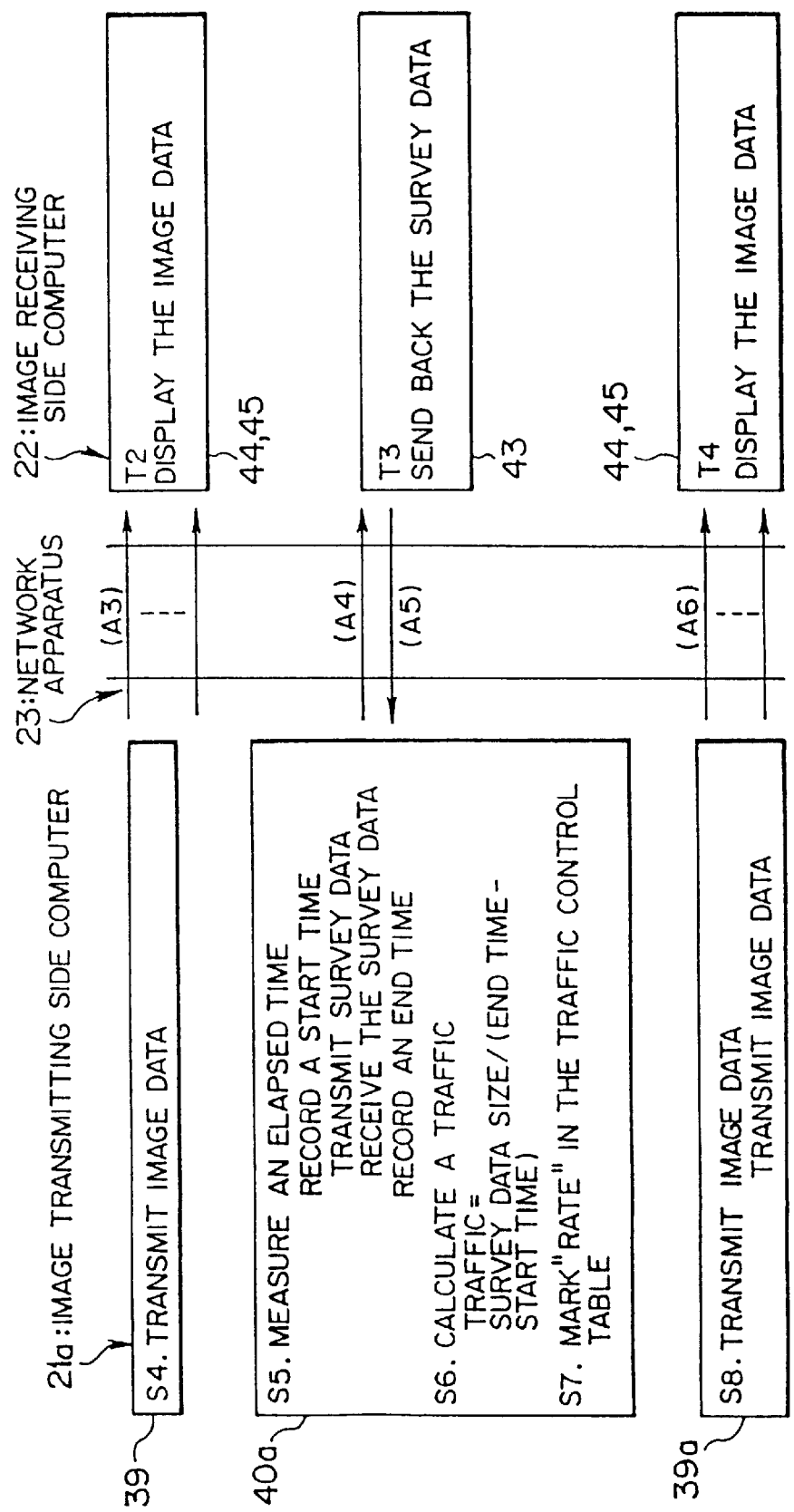
FIG. 12 is a communication sequence diagram for illustrating an operation of the second embodiment of this invention.

Similarly to the first embodiment described hereinbefore, the network transmitting unit 40a sets the number of transferring frames on the basis of a traffic value detected using survey data in a stage preceding transmission of image data (not shown in FIG. 12, refer to Steps S1 through S3 in FIG. 10 described hereinbefore). The image transmitting unit 39a transfers image data in frames in a set number [Step S4, refer to a signal (A3)].

Namely, the network transmitting unit 40a marks a traffic value in the traffic control table 40-1. After that, the image transmitting unit 39a refers to the traffic table 40-1 to read out the number of transmitting frames corresponding to the marked traffic value, then transfers image data in this number of transmitting frames.

The network receiving unit 43 of the image receiving side computer 22 examines, for example, the first octet of received data. If the received data is identified as image data, the image receiving unit 44 receives it, and the image displaying unit 45 displays it under its control on the image displaying unit 25 (Step T2).

While the above-mentioned image transmitting unit 39a transmits the image data, the timer 40A of the network transmitting unit 40a measures a predetermined time interval (one minute, for example), and the network transmitting unit 40a implements an interrupting process during the process of image data transmission at every predetermined time interval, thereby transmitting survey data at these regular predetermined time intervals.

In particular, when receiving a signal instructing to implement an interrupting process from the timer 40A during transmission of image data, the network transmitting unit 40a records the current time, while transmitting survey data [refer to a signal (A4)]

The network receiving unit 43 of the image receiving side computer 22 examines the first octet of the received data. If the first octet of the data is "0", the network receiving unit 43 identifies that the received data is survey data, then immediately sends the survey data back to the image transmitting side computer 21a [Step T3, refer to a signal (AS)].

When receiving the survey data from the image receiving side computer 22, the network transmitting unit 40a records that time, thereby detecting a rate of the network by measuring elapsed time from when the survey data was transmitted to when the survey data was received back (Step S5).

Further, the network transmitting unit 40a divides the size of the survey data by the elapsed time (the time elapsed from when the survey data was transmitted to when the survey data was received back) so as to calculate a current traffic value (Step S6).

Following that, the network transmitting unit 40a refers to the traffic control table 40-1. If an initial value marked in the table differs from the traffic value calculated at this time, the network transmitting unit 40a marks the traffic value newly calculated at this time in the traffic control table 40-1 (Step S7).

Whereby, the image transmitting unit 39a discards the number of transferring frames (intervals of signal generation corresponding thereto) having been set in the timer 39A when the traffic table was initially referred to, and alters the intervals for signal generation of the timer 39A in order to transmit the image data in frames in the number (quantity) corresponding to the traffic value newly marked.

After that, when the time comes to transmit image data as a new frame, the image data transmitting unit 39 generates image data, and transmits the image data in transmitting frames in the number newly set by the timer 39A via the network transmitting unit 40a [Step S8, refer to a signal (A6)].

When receiving the image data, the image receiving unit 44 of the image receiving side computer 22 controls the image displaying unit 45 to display the image data on the image displaying apparatus 25 (Step T4).

According to the image data communication apparatus of the second embodiment of this invention, the network transmitting unit 40a has the timer 40A, and the image transmitting side computer 21a examines condition of the traffic of the network apparatus 23 at every predetermined time interval to judge whether it is possible to transmit image data in an initial quantity of communication data or not. If it is judged that it is impossible to transmit the image data in frames using the number (frame rate) initially set, the network transmitting unit 40a marks the traffic control table 40-1 to re-set a transmittable number of image data transferring frames for the image data on the basis of the traffic of the network apparatus 23, thereby re-adjusting the quantity of communication data. If the traffic of the network apparatus 23 increases during transmission of image data, it is therefore possible to adjust the quantity of communication data according to the traffic so that image data transmission of image data most suitable for the network environment becomes possible without affecting other services provided by the network apparatus 23.

In this embodiment described above, the traffic control table 40-1 is used when the number of transmitting frames is re-adjusted during transmission of image data. However, this invention is not limited to the above example. It is alternatively possible to provide, instead of the traffic control table 40-1, a function unit for providing the number of frames corresponding to the traffic when the traffic is evaluated.

In this embodiment described above, the image transmitting unit 39 has the timer 39A for notifying frame transmission timings to the image transmitting unit 39. However, this invention is not limited to the above example. The timer 40A of the network transmitting unit 40a may be used as a function unit for notifying frame transmission timings instead.

In that case, when the network transmitting unit 40a receives image data from the image transmitting unit 39, the timer 40A examines the current time to examine the difference between the current time and the time when the image data was initially transmitted. If the examined difference is shorter than a difference of transmission of a frame, the network transmitting unit 40a transmits image data. If not, the network transmitting unit 40a discards the image data.

(c) Third Embodiment

Figure 13:
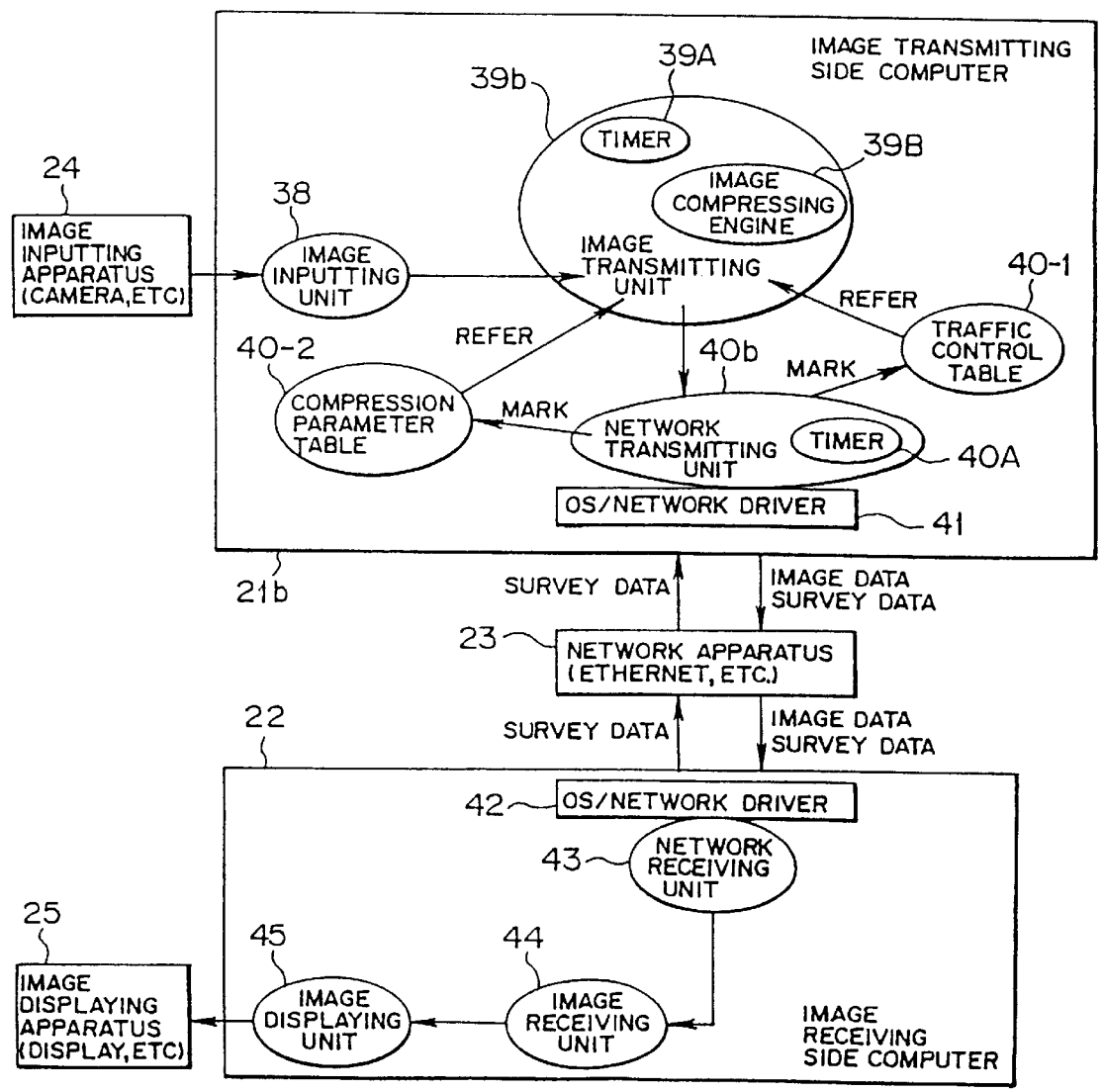
FIG. 13 is a block diagram showing an image data communication system to which an image data communicating apparatus according to a third embodiment of this invention is applied.

FIG. 13 is a block diagram showing an image data communication system to which an image data communicating apparatus according to a third embodiment of this invention is applied. The image data communication system according to this embodiment has an image transmitting side computer 21b as an image data communicating apparatus having a structure different from that according to the second embodiment described hereinbefore (refer to FIG. 11). Structures of the image receiving side computer 22, the network apparatus 23, the image input system 24 and the image displaying unit 25 are basically the same.

The image transmitting side computer 21b according to this embodiment has a hardware structure similar to that of the first embodiment described hereinbefore (refer to FIG. 6). The image receiving side computer 22 also has a hardware structure similar to that of the first embodiment described hereinbefore (refer to FIG. 7).

Like reference characters in FIG. 13 designate like or corresponding parts in FIG. 11.

An image transmitting unit 39b of the image transmitting side computer 21b has an image compressing engine 39B having a function as a first image data compressing unit for performing image processing on the image data that should be transmitted on the basis of a traffic value.

The image compressing engine 39B performs a compressing process on image data in a system such as JPEG (Joint Photographic Coding Expert Group), MPEG (Motion Picture Image Coding Expert Group), or the like, whose compressing rate is variably controlled by a compression parameter from a compression parameter table 40-2 described later.

The compression parameter table 40-2 has a function to store therein information as to a compression parameter representing an image compression rate used in the image compressing engine 39B with respect to a traffic value. If JPEG is used as a compression system in the above-mentioned image compressing engine 39B, it is possible to use, for example, a Q factor used to control an image quality as the compression parameter.

The above-mentioned compression parameter table 40-2 may have a structure as shown in FIG. 14 according to a rate of change in data transfer rate as a traffic value.

Namely, the compression parameter table 40-2 shown in FIG. 14 is stored therein with "−10" as a compression parameter if a rate of change in data transfer rate is "−50%", "−5" as a compression parameter in the case of "−25%" and "+3" as a compression parameter in the case of "+25%".

The network transmitting unit 40b detects the traffic value of the network apparatus 23 using survey data prior to transmission of image data similarly to the first and second embodiments described hereinbefore, sets the number of transferring frames on the basis of the detected traffic value, or judges whether the image data can be transferred in an initial quantity of communication data initially set on the basis of the traffic value detected every predetermined time interval during transmission of the image data.

Further, the network transmitting unit 40b calculates a rate of change in traffic value of the network apparatus 23 detected using the survey data, and marks the calculated traffic value in the compression parameter table 40-2.

Namely, the network transmitting unit 40b controls the image compressing engine 39B so as to increase a compression rate of an image if it has been judged that the traffic value decreases (traffic gets worse, thst is, deteriorates). If the traffic value increases (the traffic improves), the network transmitting unit 40b controls the image compressing engine 39B so as to decrease a compression rate of the image.

In other words, the network transmitting unit 40b variably controls the compression parameter by referring to the traffic control table 40-1 on the basis of a detected change in traffic.

If a rate of change in the traffic value which was not stored in the above-mentioned compression parameter table 40-2, is obtained, the network transmitting unit 40b marks a rate of change smaller than and closest to the obtained rate of change in traffic value in the compression parameter table 40-2, thereby determining a compression parameter.

Therefore, the network transmitting unit 40b and the compression parameter table 40-2 have a function as a compression parameter-variably controlling unit to variably control the compression parameter so as to bring the number of frames for image data close to the initial number of frames if it is judged that it is impossible to transfer the image data in an initial quantity of communication data (if the traffic of the network apparatus 23 deteriorates).

If it is judged that it is impossible to transmit the image data in an initial quantity of communication data, the image compressing engine 39B of the image transmitting unit 39b performs a compressing process on the image data using a compression parameter obtained by referring to the above-mentioned compression parameter table 40-2 so as to bring the number of transmitting frames for the image data close to the number of frames initially set while decreasing the quantity of data that should be transmitted.

In other words, the image compressing engine 39B varies the quantity of data by compressing image data so as to transmit the image data that should be transmitted in frames in the number (quantity) marked in the traffic control table 40-1, thereby decreasing an effect on the traffic of the network apparatus 23.

Figure 15:
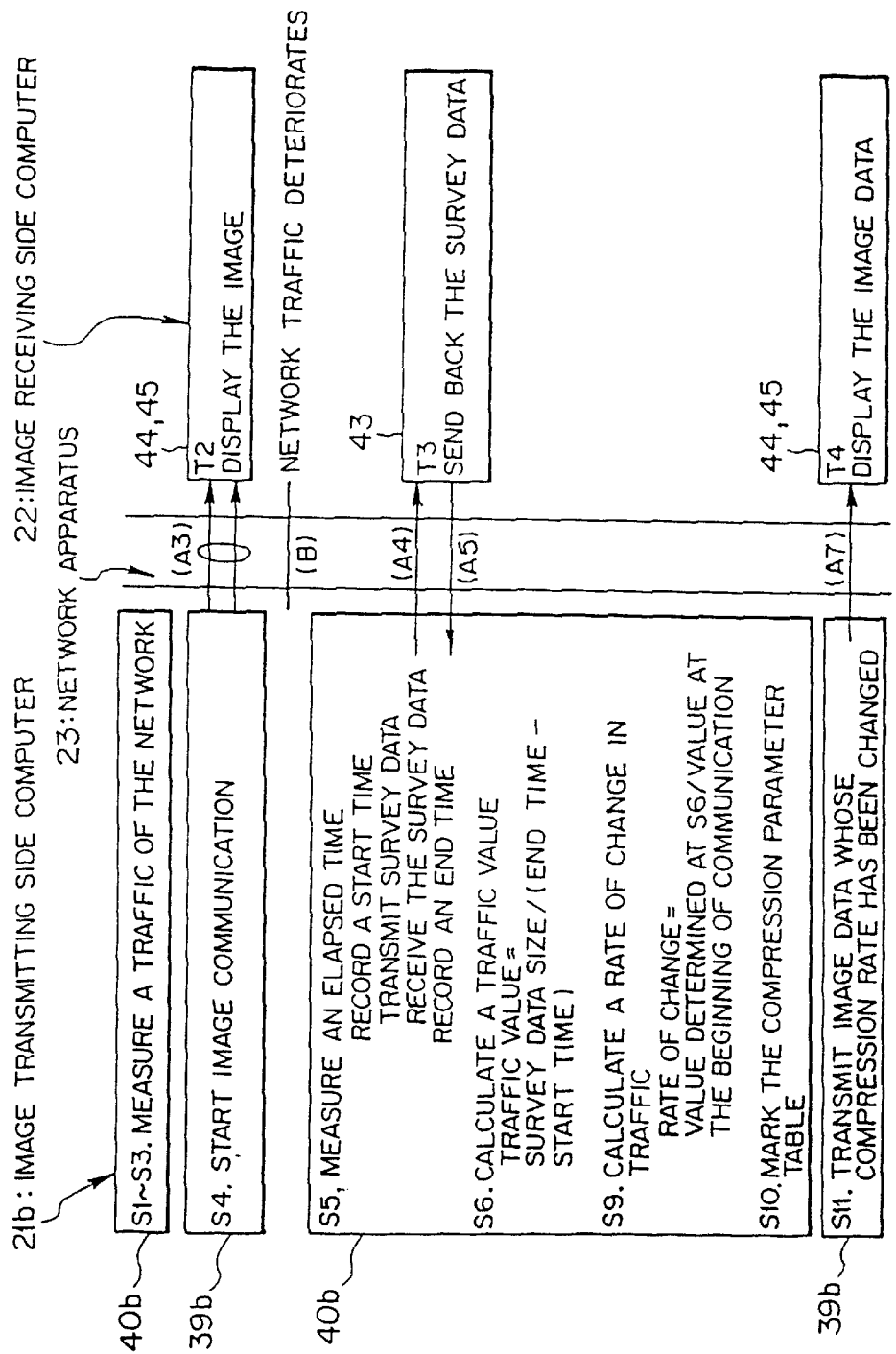
FIG. 15 is a communication sequence diagram for illustrating an operation of the third embodiment of this invention.

Description will be next made, with reference to a signal sequence diagram shown in FIG. 15, of an operation of the image data communication system including the image data communicating apparatus with the above structure according to the third embodiment of this invention.

Similarly to the first and second embodiments described hereinbefore, the network transmitting unit 40b sets the number of transferring frames on the basis of a traffic value detected using survey data in a stage preceding transmission of image data (refer to Steps S1 through S3 in FIG. 10 described hereinbefore). The image transmitting unit 39b transfers the image data in frames in the set number [Step S4, refer to a signal (A3)].

Namely, the network transmitting unit 40b marks a traffic value, in the traffic control table 40-1. After that, the image transmitting unit 39b refers to the traffic control table 40-1, reads out the number of transmitting frames corresponding to the marked traffic value, and then transfers the image data in transmitting frames in the read-out number.

If the network receiving unit 43 of the image receiving side computer 22 identifies that the received data is image data by examining, for example, the first octet of the received data, the image receiving unit 44 receives it and the image displaying unit 45 controls the image displaying apparatus 25 to display it thereon (Step T2).

While the above-mentioned image transmitting unit 39b transmits the image data, the timer 40A of the network transmitting unit 40b measures a predetermined time (one minute, for example). The network transmitting unit 40b performs an interruption process during the image data transmitting process at every interval of this predetermined time to transmit survey data, thereby detecting a traffic value of the network apparatus 23.

In particular, when receiving a signal instructing an interruption process from the timer 40A during transmission of the image data, the network transmitting unit 40b records the current time, in addition to transmitting survey data [refer to a signal (A4)].

The network receiving unit 43 of the image receiving side computer 22 examines the first octet of the received data. If data of the first octet is "0", the network receiving unit 43 identifies that the received data is survey data so that the network receiving unit 43 immediately sends it back to the image transmitting side computer 21b [Step T3, refer to a signal (A5)].

When receiving the survey data back from the image receiving side computer 22, the network transmitting unit 40-1 records that reception time so as to measure an elapsed time from when the survey data was transmitted to when the survey data was sent back, thereby detecting a rate of the network apparatus 23 (Step S5).

The network transmitting unit 40b further divides the size of the survey data by the elapsed time (a time period from when the survey data was transmitted to when it was sent back) to calculate a current traffic value (Step S6).

Following that, the network transmitting unit 40b computes a rate of change in current traffic value relative to the traffic value detected using initial survey data (refer to Step S2 in FIG. 10 described hereinbefore) (Step S9), and sets (marks) a flag in a region corresponding to the rate of change in traffic value obtained as a result of the computation in the compression parameter table 40-2 (Step S10).

After that, when being notified of a transmitting timing for a frame by the timer 39A, the image transmitting unit 39b refers to the compression parameter table 40-2 and reads out a compression parameter corresponding to the change in the rate marked by the network transmitting unit 40b.

The image compressing engine 39B of the image transmitting unit 39b thereby performs a predetermined compressing process on the image data as transmission data on the basis of the compression parameter read out from the compression parameter table 40-2 to transmit the image data to the image receiver side computer 22 via the network transmitting unit 40b [Step S11, refer to a signal (A7)].

If traffic of the network apparatus 23 deteriorates during transmission of image data at Step S4 as shown at (B) in FIG. 15 in the case where JPEG is used as a compressing system in the image compressing engine 39B, the current traffic value decreases relative to a traffic value detected in a preceding stage to the transmission of the image data so that a Q factor helpful to decrease image quality may be read out as a compression parameter from the compression parameter table 40-2.

In such a case, reduced picture quality leads to an increase in compression rate so that the image data is decreased. If the traffic improves, the image compressing engine 39B reads out a Q factor helpful to increase the picture quality so as to decrease a compression rate, thereby increasing the image data to an extent close to the size of the image data before compression.

When receiving the image data, the image receiving unit 44 of the image receiving side computer 22 controls the image displaying unit 45 to display the image data on the image displaying apparatus 25 (Step T4).

It is thereby possible to transmit image data according to the traffic without necessity of re-adjustment of the number of frames set prior to transmission of the image data.

The image data communicating apparatus according to the third embodiment of this invention is provided with the image compressing engine 39B and the compression parameter table 40-2. If current traffic of the network apparatus 23 gets more crowded than an initial traffic of the network apparatus 23, the image data communicating apparatus implements image compression on the basis of a compression parameter, which was set based on a traffic of the network, to transmit compressed image data, thereby controlling a transferrable number of frames for the image data so as to bring the quantity of transmitted frames close to the initial number of frames. If traffic of the network apparatus 23 increases during transmission of image data, it is possible to adjust the quantity of communication data according to the traffic while keeping the number of transmitting frames, and provide an effective image data transmission most suitable for a network environment without affecting other services provided by the network apparatus 23.

In this embodiment described above, the compression parameter table 40-2 is used when the number of transmitting frames is re-adjusted during transmission of image data. However, this invention is not limited to the above example. Instead of the compression parameter table 40-2, a function unit may be used to provide the number of frames corresponding to the traffic when the traffic is evaluated.

(d) Fourth Embodiment

Figure 16:
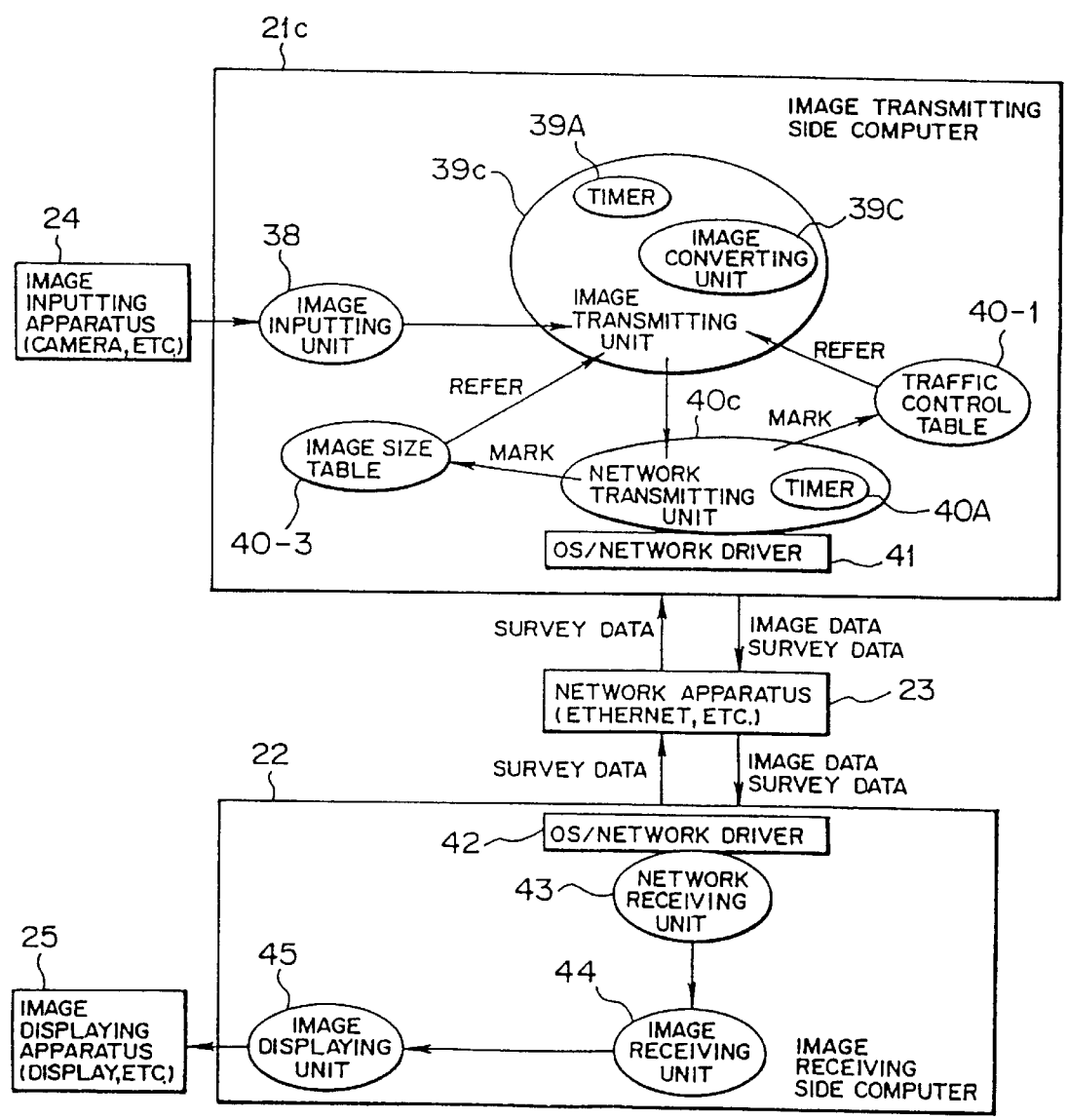
FIG. 16 is a block diagram showing an image data communication system to which an image data communicating apparatus according to a fourth embodiment of this invention is applied.

FIG. 16 is a block diagram showing an image data communication system to which an image data communicating apparatus according to a fourth embodiment of this invention is applied. The image data communication system shown in FIG. 16 includes an image transmitting side computer 21c as the image data communicating apparatus having a structure different from the second and third embodiments described hereinbefore (refer to FIGS. 11 and 13). Structures of the image receiver side computer 22, the network apparatus 23, the image inputting apparatus 24 and the image display apparatus remain basically the same.

The image transmitting side computer 21c has a hardware structure similar to that (refer to FIG. 6) of the first embodiment described hereinbefore. The image receiver side computer 22 has a hardware structure similar to that (refer to FIG. 7) of the first embodiment described hereinbefore, as well.

Like reference characters in FIG. 16 designate like or corresponding parts in FIG. 11.

The image transmitting side computer 21c according to this embodiment has an image size table 40-3 and an image converting unit 39C in an image transmitting unit 39c instead of the compression parameter table 40-2 and the image compressing engine 39B in the image transmitting unit 39b as compared with the above-mentioned third embodiment, thereby having a function to variably control a drawing size (an image size) of image data to transmit it.

The image converting unit 39C refers to the image size table 40-3 to variably control a drawing size of image data correspondingly to a rate of change in traffic, which has a function as a drawing size reducing unit for reducing a drawing size of image data.

In particular, the image converting unit 39C implements a primary converting operation, such as a formula (1) shown below, on each pixel of image data, and outputs the image as enlarged/reduced data.

$$\begin{pmatrix} x_1 \\ y_1 \end{pmatrix} = \begin{pmatrix} a & c \\ b & d \end{pmatrix} \begin{pmatrix} x_0 \\ y_0 \end{pmatrix}$$ formula (1)

The image size table 40-3 stores therein a rate of enlargement/reduction as an image size of image data that should be transferred in relation to a rate of change in traffic value. Namely, the image size table 40-3 has a function as a table in which is stored an image size of image data that should be transferred in relation to the traffic.

Figure 17:
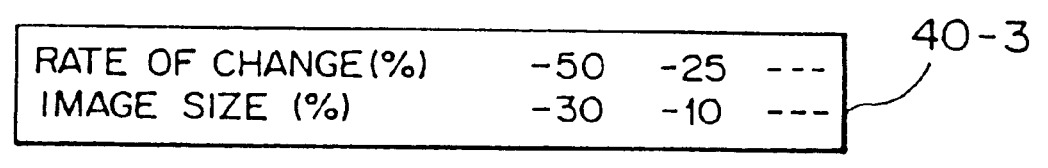

The image size table 40-3 may store therein information as, for example, shown in FIG. 17 as an image size in relation to a rate of change in traffic. More specifically, the image size table 40-3 may store therein "–30%" as a rate of enlargement of image data if a rate of change in data transfer rate as a rate of change in traffic is "–50%", "–10%" as a rate of enlargement in the case where a rate of change in data transfer rate is "–25%", and so on.

If a rate of change in transfer rate of "–50%" is obtained in the image converting unit 39C as a result of referring to the image size table 40-3, the image converting unit 39C implements a primary converting operation as a formula (2) shown below on each pixel of image data, thereby obtaining "–30%" as a rate of enlargement for the image data.

$$\begin{pmatrix} x_1 \\ y_1 \end{pmatrix} = \begin{pmatrix} \frac{7}{10} & 0 \\ 0 & \frac{7}{10} \end{pmatrix} \begin{pmatrix} x_0 \\ y_0 \end{pmatrix}$$ formula (2)

The network transmitting unit 40c uses survey data prior to transmission of image data to detect a traffic value of the network apparatus 23 similarly to the first to third embodiments described hereinbefore. The network transmitting unit 40c thereby sets the number of frames on the basis of the detected traffic value, or judges whether the image data can be transmitted in an initial quantity of communication data on the basis of a traffic value detected every predetermined time interval during transmission of the image data.

The network transmitting unit 40c, further, calculates a rate of change in traffic value of the network apparatus 23 detected using the survey data, and marks the calculated traffic value in the image size table 40-3.

Namely, the network transmitting unit 40c refers to the image size table 40-3, and controls to reduce an image size if the detected traffic value decreases (the traffic condition deteriorates). If the traffic value increases (if the traffic improves), the network transmitting unit 40c controls so as to enlarge an image.

In other words, the network transmitting unit 40c controls a drawing size by referring to the image size table 40-3 on the basis of a detected change in traffic.

If a rate of change in traffic value, not stored in the above-mentioned image size table 40-3, is obtained in the network transmitting unit 40c, the network transmitting unit 40c marks a rate of change smaller than and closest to the obtained rate of change in traffic value in the image size table 40-3 to determine a rate of enlargement/reduction.

The network transmitting unit 40c and the image size table 40-3 have a function as a drawing size control unit for controlling to reduce drawing size in the image converting unit 39C if it is judged that it is impossible to transfer image data in an initial quantity of communication data so as to bring the number of frames for the image data close to the number of frames initially set by the communication data quantity adjusting unit.

If it is judged that the image data cannot be transferred in an initial quantity of communication data, the image converting unit 39C of the image transmitting unit 39c varies image size using a rate of enlargement/reduction for an image obtained by referring to the above-mentioned image size table 40-3 so as to bring the number of transmitting frames for the image data close to the number of frames initially set, while decreasing the quantity of data that should be transmitted.

In other words, the image converting unit 39C varies the quantity of data by enlarging/reducing image data in order to be able to transmit the image data that should be transmitted in transmitting frames in the number (quantity) marked in the traffic control table 40-1, thereby reducing the effect on the traffic of the network apparatus 23 due to the image data transmission.

Next description will be given of an operation of the image data communication system to which the image data communicating apparatus according to the fourth embodiment of this invention is applied with reference to a signal sequence diagram shown in FIG. 18.

Similarly to the first to third embodiments described hereinbefore, the network transmitting unit 40c sets the number of transferring frames on the basis of a traffic value detected using survey data in a stage preceding transmission of image data. The image transmitting unit 39c then transfers the image data in frames in the set number.

Namely, the network transmitting unit 40c marks a traffic value in the traffic control table 40-1. After that, the image transmitting unit 39c refers to the traffic control table 40-1, and reads out the number of transmitting frames corresponding to the marked traffic value to transfer the image data in transmitting frames in this number.

The network receiving unit 43 of the image receiving side computer 22 examines, for example, the first octet of received data. If it is identified by the network receiving unit 43 that the received data is image data, the image receiving unit 44 receives the image data and the image displaying unit 45 displays the image data under control on the image displaying apparatus 25.

Figure 18:
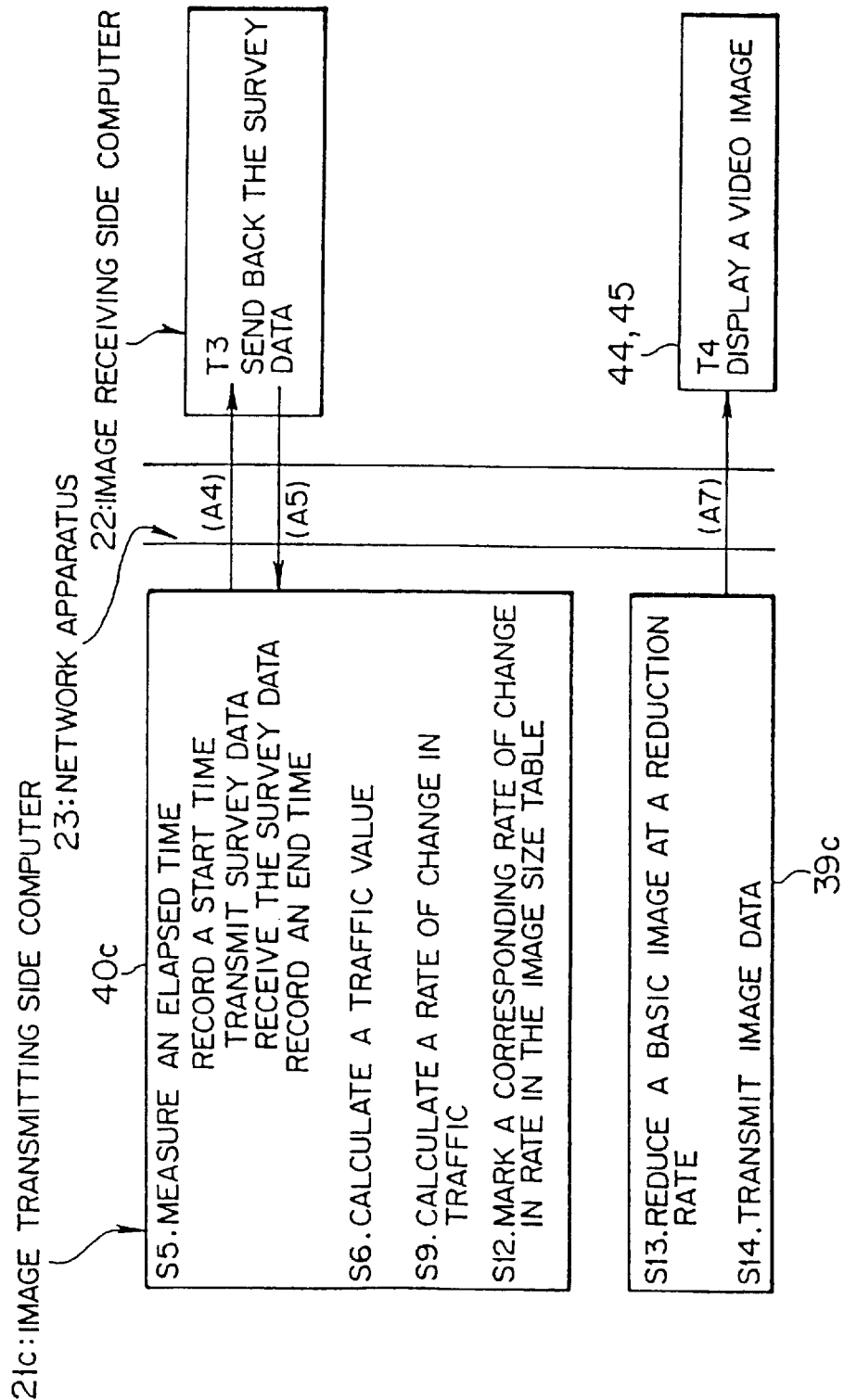
FIG. 18 is a communication sequence diagram for illustrating an operation of the fourth embodiment of this invention.

The above process (refer to Steps S1 through S4 in FIG. 10) is omitted in FIG. 18.

Following that, while the above-mentioned image transmitting unit 39c transmits the image data, the timer 40A measures a predetermined time interval (one minute, for example) in the network transmitting unit 40c similarly to each of the embodiments described hereinbefore. The network transmitting unit 40c performs an interruption process every predetermined time interval during an image data transmitting process to transmit survey data, thereby detecting the current traffic value of the network apparatus 23.

Namely, when receiving the survey data from the image receiving side computer 22, the network transmitting unit 40c records that time. The network transmitting unit 40c thereby measures an elapsed time from when the survey data was transmitted to when it was sent back so as to measure a rate of the network apparatus (Step S5).

The network transmitting unit 40a, further, divides the size of the survey data by the elapsed time (a time from when the survey data was transmitted to when the survey data was received back) so as to calculate a current traffic value (Step S6).

Following that, the network transmitting unit 40c computes a rate of change in current traffic value relative to the traffic value initially detected using the survey data (refer Step S2 in FIG. 10 described hereinbefore (Step S9), and sets a flag (marks) in a region in the image size table 40-3 corresponding to the rate of change in the traffic value obtained as a result of the computation (Step S12).

After that, when being notified of a transmitting timing of a frame from the timer 39A, the image transmitting unit 39c refers to the image size table 40-3, and reads out a compression parameter corresponding to the rate of change marked by the network transmitting unit 40c.

In the image transmitting unit 39c, the image compression converting unit 39C performs a predetermined image converting process on image data as transmitting data on the basis of a rate of enlargement/reduction read out from the image size table 40-3 (Step S13), then transmits it to the image receiver side computer 22 via the network transmitting unit 40c (Step S14, refer to a signal (A7)].

In particular, the image converting unit 39C reduces an image size and transmits the reduced image size if a traffic value of the network apparatus 23 is decreased (a traffic deteriorates). If the traffic value is increased (the traffic improves), the image converting unit 39C enlarges an image and transmits it, thereby decreasing an effect on the traffic of the network apparatus 23 due to the image data transmission.

When receiving image data, the image receiving unit 44 of the image receiving side computer 22 controls the image displaying unit 45 to display the image data on the image displaying apparatus 25 (Step T4).

It is thereby possible to transmit image data accordingly to the traffic without necessity of re-adjustment of the number of transmitting frames set prior to transmission of the image data.

The image data communicating apparatus according to the fourth embodiment of this invention has the image converting unit 39c and the image size table 40-3, as above. If it is judged that it is impossible to transfer image data in frames in the number initially set (if the traffic of the network apparatus 23 gets more crowded than the initial traffic), the image data communicating apparatus alters image size on the basis of the traffic of the network apparatus 23 and transmits the image data, thereby controlling the number of frames for the image data that can be transferred to bring it close to the initial number of frames. Even if the traffic of the network apparatus 23 increases during transmission of the image data, it is possible to adjust the quantity of communication data according to the traffic while keeping the number of transmitting frames so that an effective image data transmission most suitable for a network environment is feasible without affecting other services provided by the network apparatus 23.

In the above embodiment, the image size table 40-3 is used when the number of transmitting frames is re-adjusted during transmission of image data. However, this invention is not limited to this example, but it is alternatively possible that the image data communicating apparatus has a function unit, instead of the image size table 40-3, for providing a rate of reduction of image size corresponding to the evaluated traffic.

(e) Fifth Embodiment

Figure 19:
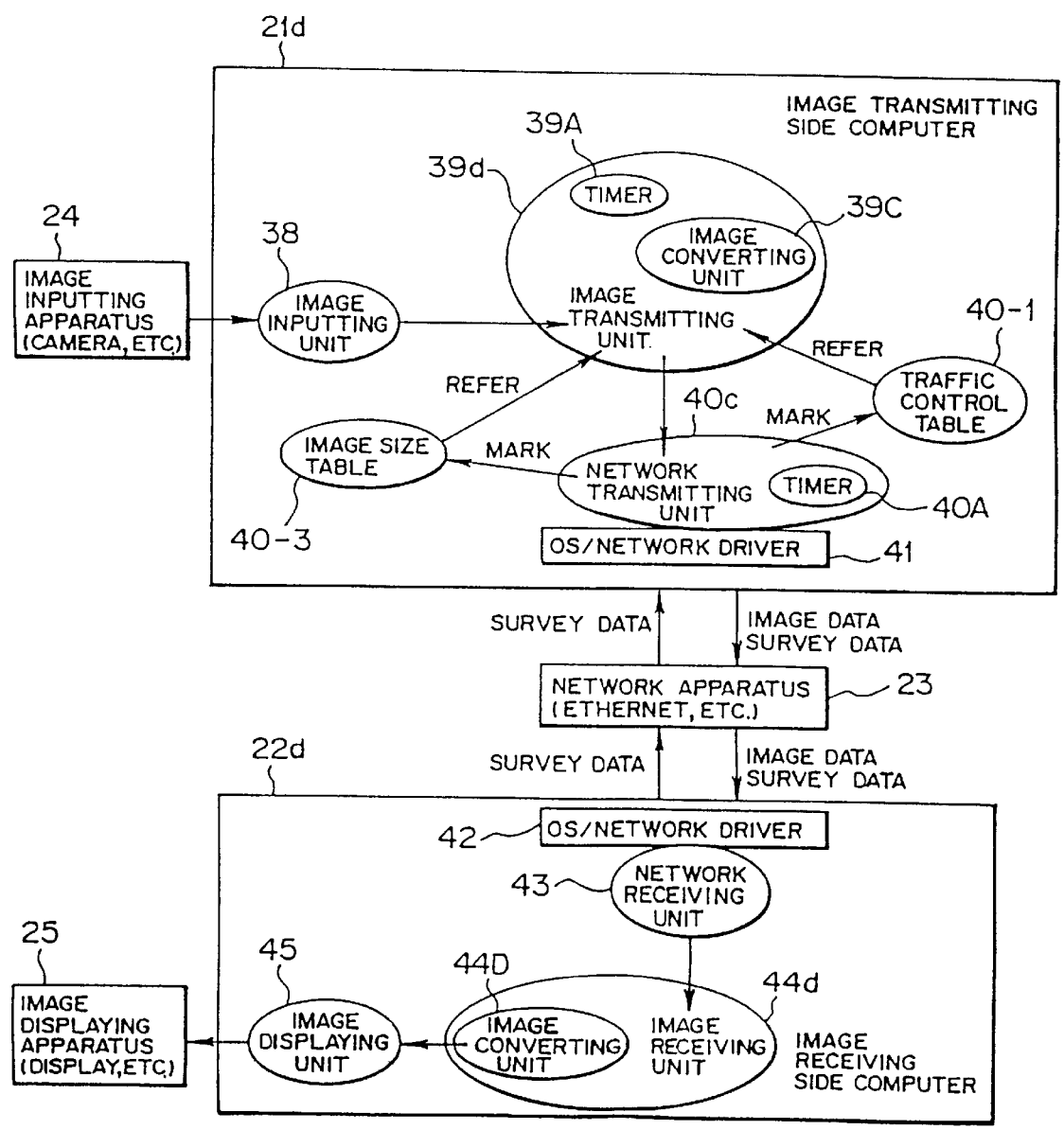
FIG. 19 is a block diagram showing an image data communication system to which an image data communicating apparatus according to a fifth embodiment of this invention is applied.

FIG. 19 is a block diagram showing an image data communication system to which an image data communicating apparatus according to a fifth embodiment of this invention is applied. In the image data communication system shown in FIG. 19, an image size converted on the side of an image transmitting side computer 21d is regenerated in an original image size on the side of an image receiving side computer 22d, differently from that according to the fourth embodiment described hereinbefore (refer to FIG. 16). Other parts of the image data communication system remain basically the same.

The image transmitting side computer 21d according to this embodiment has a hardware structure similar to that of the first embodiment described hereinbefore (refer to FIG. 6). The image receiving side computer 22d has, as well, a hardware structure similar to that of the first embodiment described hereinbefore (refer to FIG. 7).

Like reference characters in FIG. 19 designate like or corresponding parts in FIG. 16.

The image transmitting side computer 21d, as the image data communicating apparatus according to this embodiment, has an image transmitting unit 39d having a function different from that of the fourth embodiment described hereinbefore.

Namely, the image transmitting unit 39d adds a conversion parameter as control information used upon, for example, a leading portion of image data whose size has been converted by the image converting unit 30D depending on the traffic.

Figure 20:
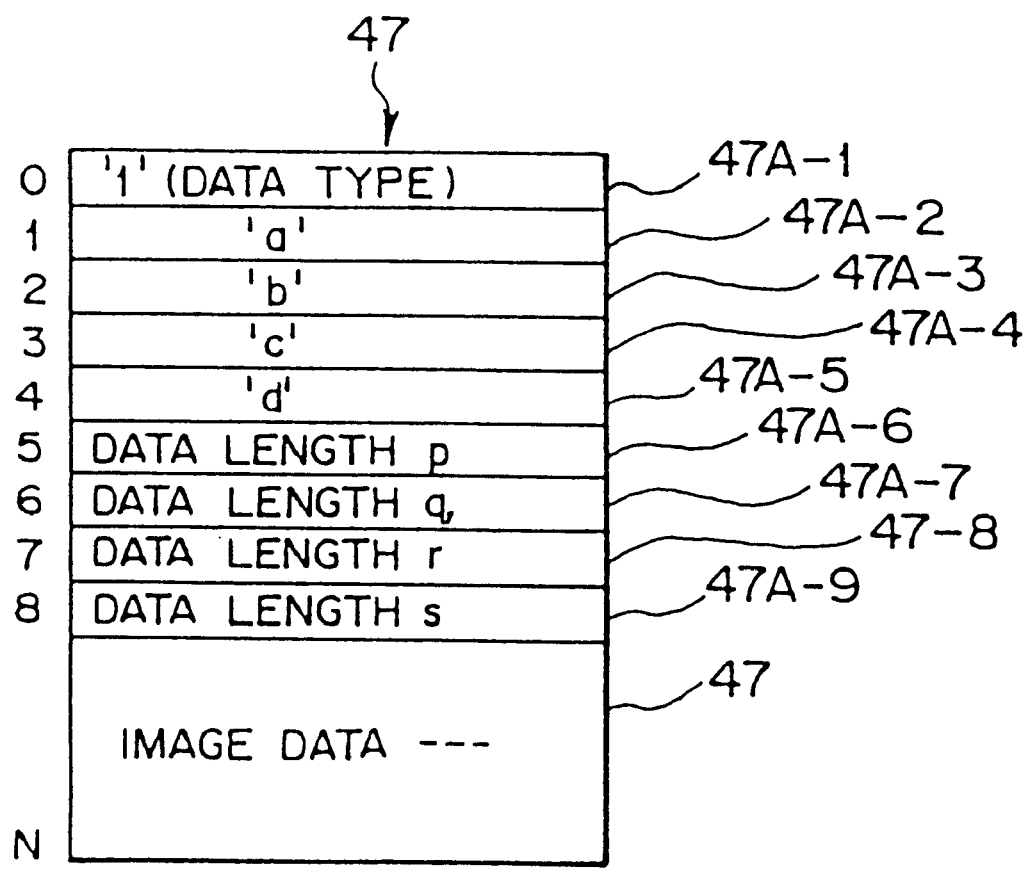
FIG. 20 is a diagram showing image data to which control information according to the fifth embodiment of this invention is added.

In particular, image data 47 with control information added to its leading portion has a form as shown in FIG. 20.

Namely, the control information 47A is configured with data identification information (the first octet) 47A-1 representing that there is conversion information used upon an image conversion of the image data 47 ("1"), conversion parameters (the second to fifth octets) 47A-2 through 47A-5 as information as to components of a 2×2 matrix used for a primary converting operation, and information (the sixth to ninth octets) 47A-6 through 47A-9 as to data length of the image data.

If the data length of following image data is 1024 bytes, for example, the above-mentioned information (a data length p through data length s) 47A-6 through 47A-9 are, "1", "0", "2" and "4", respectively.

The image receiving side computer 22*d* as the image data communicating apparatus according to this embodiment has an image receiving unit 44*d* different from that (refer to reference numeral 22) of the fourth embodiment described hereinbefore.

Namely, the image receiving unit 44*d* has an image converting unit 44D for regenerating the image data 47 in an original size on the basis of the control information 47A at the ninth octet in the leading portion if the received image data 47 has an image size having been converted in the image transmitting side computer 21*d*.

In other words, the image converting unit 44D has a function as a drawing size regenerating unit for enlarging a drawing size if received image data is identified as image data whose drawing size has been reduced as a result of identification on a type of data by the network receiving unit 43.

Figure 21:
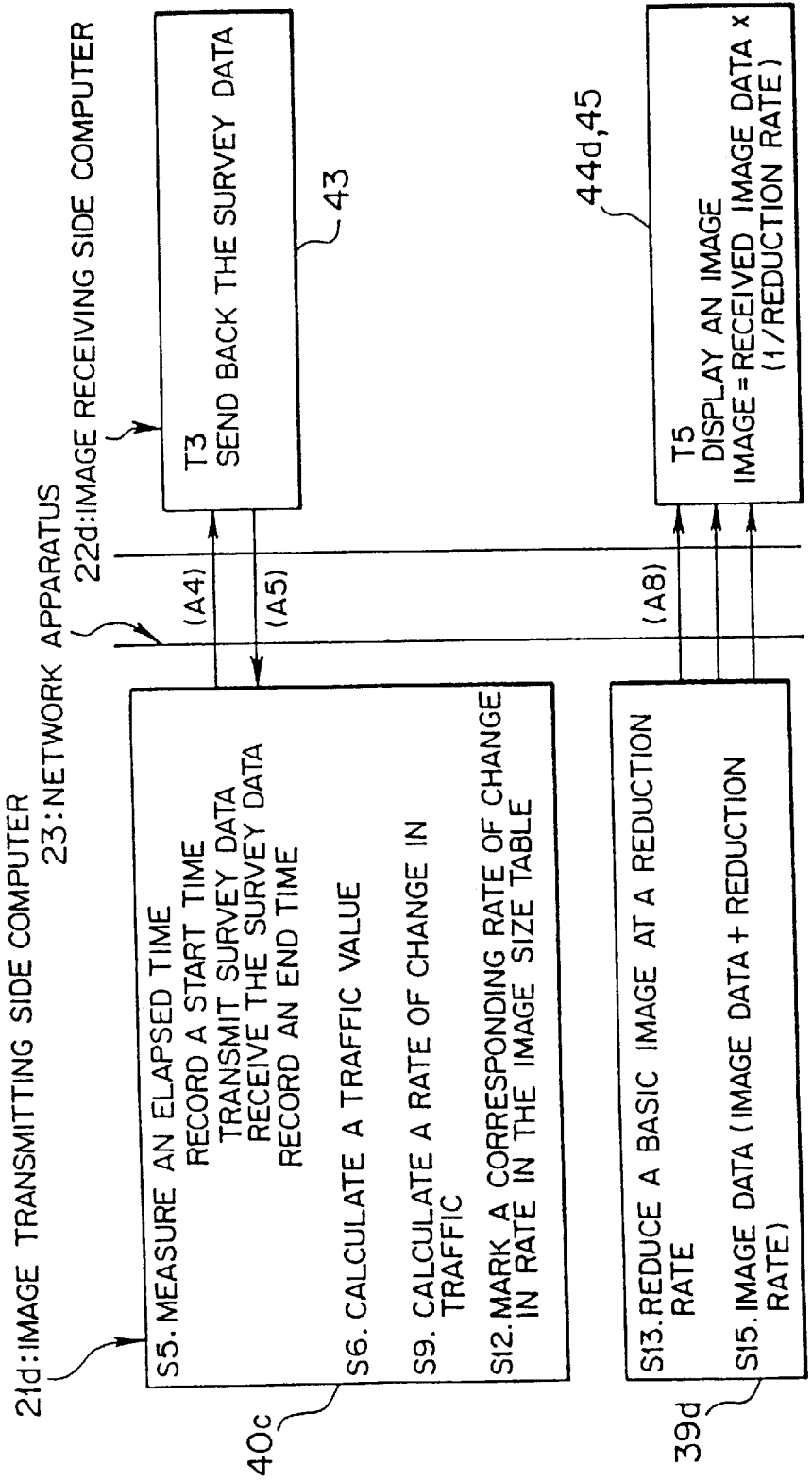
FIG. 21 is a communication sequence diagram for illustrating an operation of the fifth embodiment of this invention.

Next description will be of an operation of the image data communication system to which the image data communication apparatus with the above structure according to the fifth embodiment of this invention is applied with reference to a signal sequence diagram shown in FIG. 21.

Similarly to the fourth embodiment described hereinbefore, the image transmitting side computer 21*d* sets a transmittable number of transferring frames for image data on the basis of traffic of the network apparatus 23 prior to transmission of the image data to automatically adjust the quantity of communication data.

It is noted that an operation to set the above transferring frames is not shown in FIG. 21 (refer to Steps S1 through S4 in FIG. 10).

Following that, the network transmitting unit 40*d* measures a predetermined time interval (one minute, for example) by the timer 40A during transmission of image data by the image transmitting unit 39*d*. The network transmitting unit 40*d* performs an interruption process during an image data transmitting process every predetermined time interval to transmit survey data, thereby detecting the current traffic value of the network apparatus 23.

Namely, when receiving the survey data from the image receiving side computer 22*d*, the network transmitting unit 40-1 records that time to measure an elapsed time from when the survey data was transmitted to when it was sent back, thereby detecting a rate of the network apparatus 23 (Step S5).

The network transmitting unit 40*a* further divides the size of the survey data by the elapsed time (a time from when the survey data was transmitted to when it was send back) to calculate a current traffic value (Step S6).

Following that, the network transmitting unit 40*a* computes a rate of change of the current traffic value relative to the traffic value initially detected using the survey data (Step S9), then sets a flag (marks) in a region in the image size table 40-3 corresponding to the rate of change of the traffic value obtained as a result of the computation (Step S12).

After that, when being notified of a transmitting timing of a frame from the timer 39A, the image transmitting unit 39*d* refers to the image size table 40-3, and reads out a compression parameter corresponding to the rate of change marked by the network transmitting unit 40*c*. The image converting unit 39C of the image transmitting unit 39*d* thereby performs a predetermined image converting process on the image data as transmission data on the basis of the rate of enlargement/reduction read out from the image size table 40-3 (Step S13).

After that, the image transmitting side computer 21*d* adds the control information 47A as to an image conversion to a leading portion of the image data 47 to which is applied the image conversion process, and transmits the image data to the image receiving side computer 22*d* via the network transmitting unit 40*c* [Step S15, refer to a signal (A8)].

In particular, the image converting unit 39C reduces image size if the traffic value of the network apparatus 23 is decreased (if the traffic deteriorates) and transmits the reduced image. If the traffic value is increased (if the traffic value improves), the image converting unit enlarges an image and transmits it, thereby decreasing an effect on the traffic of the network apparatus 23 due to an image data transmission.

It is thereby possible to transmit image data according to the traffic without necessity of re-adjustment of the number of transmitting frames set prior to transmission of image data.

The image receiving unit 44*d* of the image receiving side computer 22*d* refers to the data identification information described at the first octet of the received data. If the data identification information of the received data is "1", it means that the received data is image data whose image size has been converted so that the data is handed over to the image converting unit 44D of the image receiving unit 44*d*.

The image converting unit 44D takes out the conversion parameters 47A-2 through 47A-5 and the information as to data length 47A-6 through 47A-9 in the control information 47A, then takes out image data according to the data length designated by the information 47A-6 through 47A-9 as to this data length.

Following that, the image converting unit 44D operates an inverse matrix of a conversion matrix consisting of the conversion parameters 47A-2 through 47A-5, and implements a primary converting operation using the inverse matrix similarly to the above-mentioned image converting unit 39C of the image transmitting side computer 21*c* to regenerate the original image data.

If a rate of change in traffic value is "−50%" and the primary converting operation as shown in the formula (2) is implemented on each pixel of the image data by the above-mentioned image converting unit 39C, for example, the image converting unit 44D determines an inverse matrix of a 2×2 matrix for a coordinate conversion in the above-mentioned formula (2).

Following that, using the determined inverse matrix, the image converting unit 44D implements the primary converting operation as shown in the following formula (3) to regenerate the original image data.

$$\begin{pmatrix} x_1 \\ y_1 \end{pmatrix} = \begin{pmatrix} \dfrac{1}{\sqrt{7/10}} & 0 \\ 0 & \dfrac{1}{\sqrt{7/10}} \end{pmatrix} \begin{pmatrix} x_0 \\ y_0 \end{pmatrix} \qquad \text{formula (3)}$$

After that, the image data regenerated into the original data by the image converting unit 44D of the image receiving unit 44*d* is controlled to be displayed on the image display apparatus 25 through the image displaying unit 45 (Step T5).

The image data communicating apparatus according to the fifth embodiment of this invention has the image converting unit 39C and the image size table 40-3 in the image transmitting side computer 21d as the image data communicating apparatus on the transmitting side. Further, the image data communicating apparatus has the image converting unit 44D in the image receiving side computer 22d as the image data communicating apparatus on the receiving side. When receiving image data whose image size has been altered, the image receiver side computer 22d may regenerate the received image data in the original size and display it. The image data communicating apparatus according to the fifth embodiment has an advantage obtained in the fourth embodiment. In addition, the image data communication apparatus according to the fifth embodiment also has an advantage such that the image receiving side computer 22d as the image data communicating apparatus on the receiving side may display image data with a predetermined precision irrespective of the degree of congestion of the traffic of the network apparatus 23.

According to this embodiment described above, the control information 47A is added as the conversion parameters to the image data 47. However, this invention is not limited to this example, but it is alternatively possible that only the conversion parameters are transmitted, and the image receiver side computer 22d continuously uses these conversion parameters until receiving new conversion parameters so as to decrease the quantity of transmission data.

(f) Sixth Embodiment

Figure 22:
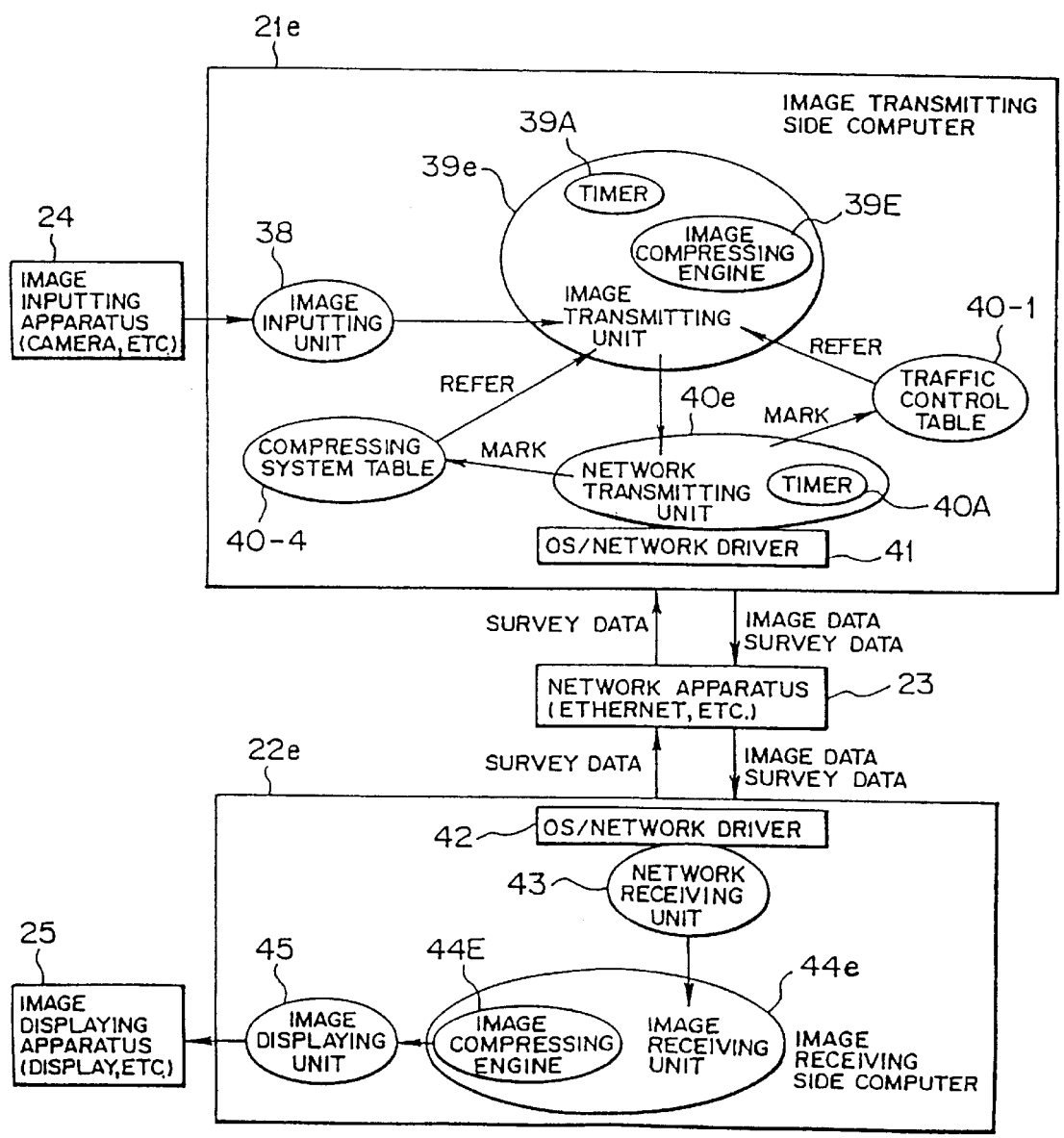
FIG. 22 is a block diagram showing an image data communication system to which an image data communicating apparatus according to a sixth embodiment of this invention is applied.

FIG. 22 is a block diagram showing an image data communication system to which an image data communicating apparatus according to a sixth embodiment of this invention is applied. In the image data communication system shown in FIG. 22, an image transmitting side computer 22e compresses an image in an image compressing system (method) selected according to a change in traffic value to adjust a quantity of communication data, whereas an image receiving side computer 22e regenerates the original image data, differently from that according to the second embodiment described hereinbefore.

The image transmitting side computer 21e according to this embodiment has a hardware structure similar to the first embodiment described hereinbefore (refer to FIG. 6). The image receiving side computer 22e has a hardware structure similar to that of the first embodiment described hereinbefore (refer to FIG. 7), as well.

Like reference characters in FIG. 22 designate like or corresponding parts in FIG. 11.

Here, the image transmitting side computer 21e as the image data communicating apparatus according to this embodiment has an image transmitting unit 39e having a function different from that of the second embodiment described hereinbefore.

Namely, the image transmitting unit 39e has an image compressing engine 39E for referring to a compressing system table 40-4 described later to compress an image in an image compressing system selected according to a rate of change in traffic value. The image compressing engine 39E supports plural compressing systems such as MPEG, JPEG and the like.

In other words, the image transmitting unit 39e has a function as a second image data compressing unit for selecting a desired compressing system among plural compressing systems to compress image data that should be transmitted in the selected compressing system.

The image transmitting unit 39e adds information as to the above image compression as control information upon transmission of image data applied a compressing process thereto.

Figures 23, 24:
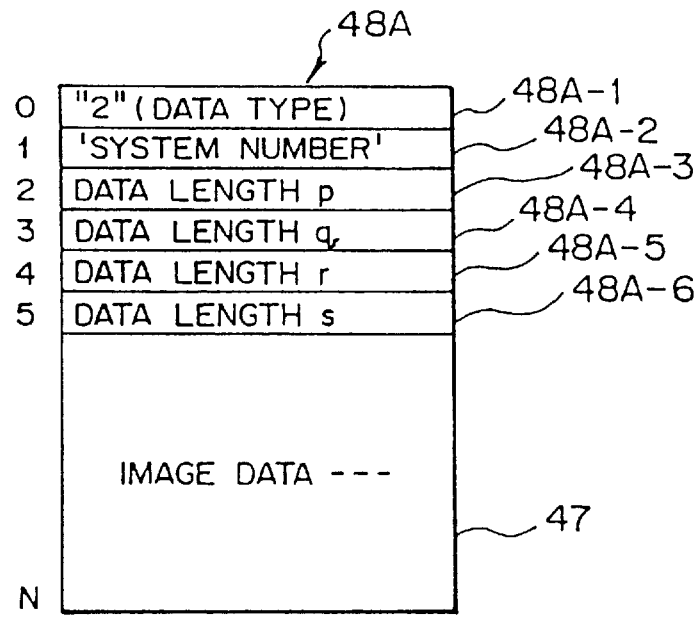
FIG. 23 is a block diagram showing image data to which control information according to the sixth embodiment of this invention is added.
FIG. 24 is a diagram showing a form of a compressing system table according to the sixth embodiment of this invention.

In particular, control information 48A as to image compression is added to a leading portion of the image data 47, as shown in FIG. 23.

The control information 48A is formed with data identification information (the first octet) 48A-1 representing that the image data 47 has been compressed ("2"), an identification number representing a system for image compression (the first octet) 48A-2, and information as to a data length of the image data (the sixth to ninth octets) 48A-3 through 48A-6.

If data length of the following image data is 1024 bytes, for example, the above information (a data length p through a data length s) 47A-6 through 47A-9 are "1", "0", "2" and "4", respectively.

The compressing system table 40-4 has a function as a table in which compressing systems related to changes in traffic are stored. As a type of a compressing system to be stored, a compressing system such as MPEG, JPEG or the like is stored.

Meanwhile, the above compressing system table 40-4 may have a form as shown in FIG. 24, for example, according to a rate of change in data transfer rate as the traffic value. Namely, the compressing system table 40-4 is stored therein with information to an effect that the compressing system is JPEG if a rate of change in data transfer rate is "−50%", and information to an effect that a compressing system is MPEG in the case of "−25%".

In the above-mentioned compressing system table 40-4, if a rate of reduction of data transfer rate further increases (if a rate of change in data transfer rate gets closer to "−50%"), the data compressing system having a higher effect is selected. If the rate of reduction of data transfer rate further decreases (the rate of reduction of data transfer rate gets farther from "−50%"), the data compressing system having a lower effect is selected.

The network transmitting unit 40e detects the traffic value of the network apparatus 23 using survey data prior to transmission of image data, sets the number of transferring frames on the basis of the detected traffic value, or judges as to whether the image data can be transmitted in an initial quantity of communication data on the basis of the traffic value detected every predetermined time interval during transmission of image data similarly to the first to fifth embodiments described hereinbefore.

The network transmitting unit 40e calculates a rate of change in traffic value of the network apparatus 23 detected using survey data, and marks the calculated traffic value in the compressing system table 40-4.

In other words, the network transmitting unit 40e refers to the compressing system table 40-4 on the basis of a detected change in traffic to select a compressing system to be used by the image compressing engine 39E.

Namely, if it is judged that a detected traffic value decreases (if the traffic condition deteriorates) on the basis of a rate of change in traffic value, the network transmitting unit 40e controls the image compressing engine 39E to select a compressing system such as to increase the rate of image compression in the image compressing engine 39E. If the traffic value rises (if the traffic improves), the network transmitting unit 40e controls the image compressing engine 39E to select a compressing system such as to decrease the rate of image compression.

Therefore, the network transmitting unit 40e and the compressing system table 40-4 described above have a function as a compressing system selecting unit for judging whether image data can be transmitted in an initial quantity of communication data on the basis of a rate of change in traffic value, and select a compressing system so as to bring the number of frames close to the number of frames initially set if it is judged that the image data cannot be transferred.

If it is judged that it is impossible to transmit the image data in the initial quantity of communication data, the image compressing engine 39E of the image transmitting unit 39e performs a compressing process on the image data using a compression parameter obtained by referring to the above-mentioned compressing system table 40-4 to bring the number of transmitting frames for the image data close to the number of frames initially set while decreasing the quantity of data that should be transmitted.

In other words, the image compressing engine 39E varies the quantity of data by compressing the image data in order to be able to transmit the image data that should be transmitted in transmitting frames in the number (quantity) marked in the traffic control table 40-1 so as to decrease an effect on the traffic of the network apparatus 23.

The image receiving side computer 22e as the image data communicating apparatus according to this embodiment has an image receiving unit 44e different from that (refer to reference numeral 22) of the fourth embodiment described hereinbefore.

Namely, the image receiving unit 44e has an image compressing engine 44E for elongating (restoring) received image data 47 into original image data on the basis of the control information 48A for six octets in the leading portion if to the received image data 47 an image compressing process has been applied in the image transmitting side computer 21e.

Figure 25:
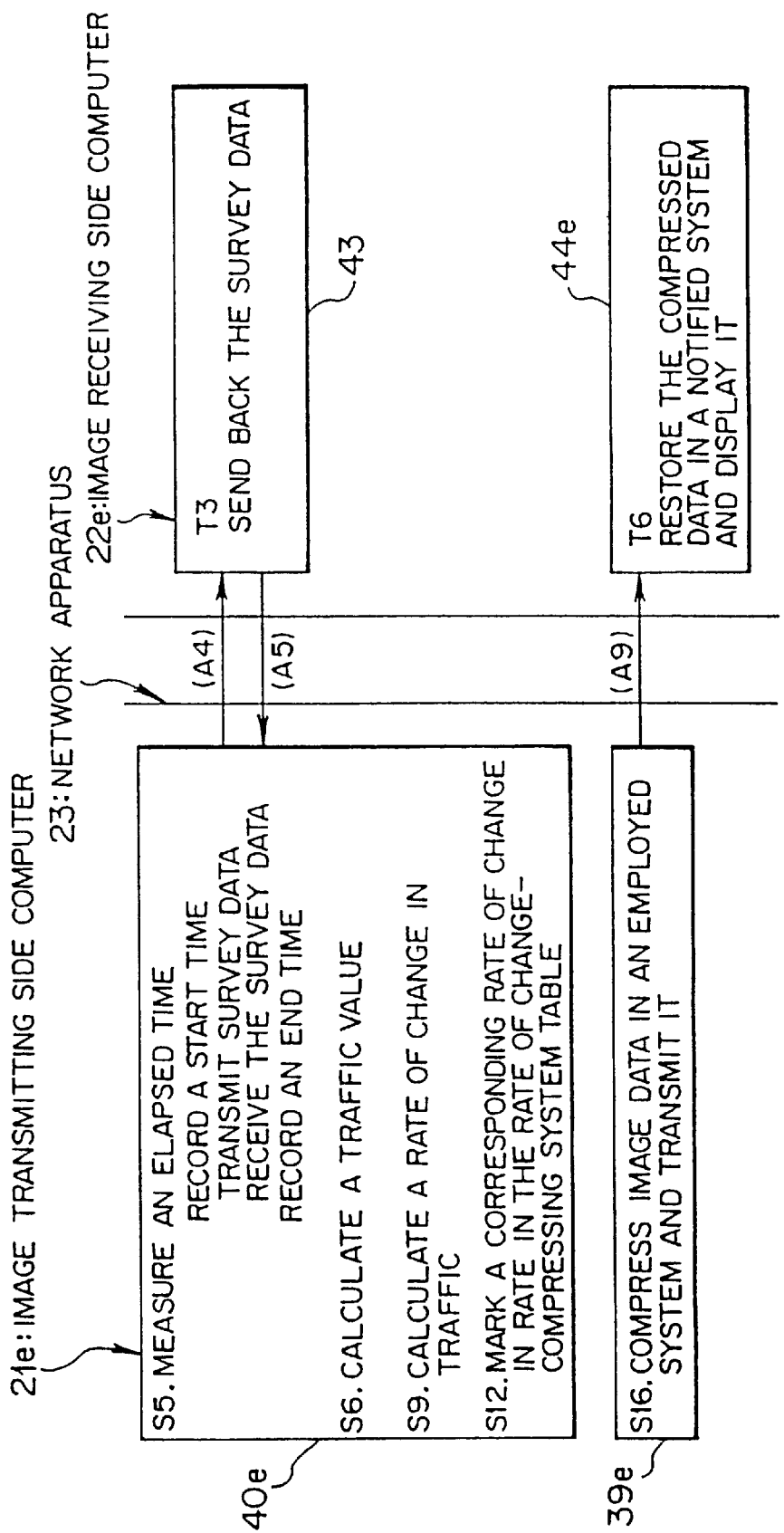
FIG. 25 is a communication sequence diagram for illustrating an operation of the sixth embodiment of this invention.

Next description will be of an operation of the image data communication system to which the image data communicating apparatus according to the sixth embodiment of this invention is applied with reference to a signal sequence diagram shown in FIG. 25.

Similarly to the second to fifth embodiments described hereinbefore, the image transmitting side computer 21e sets a transmittable number of transferring frames for image data on the basis of the traffic of a network apparatus 23 prior to transmission of the image data so as to automatically adjust the quantity of communication data.

The above operation to set the transferring frames is not shown in FIG. 25 (refer to Steps S1 through S4 in FIG. 10).

While the image transmitting unit 39e transmits the image data in a quantity of communication data automatically adjusted, the network transmitting unit 40e measures a predetermined time interval (one minute, for example) by the timer 40A, and performs an interruption process at every predetermined time interval during transmission of the image data to transmit survey data (A4), thereby detecting the traffic value of the network apparatus 23.

Namely, when receiving the survey data (A5) from the image receiving side computer 22e, the network transmitting unit 40-1 records that time to measure an elapsed time from when the survey data was transmitted to when it was received back, thereby detecting a rate of the network apparatus 23 (Step S5).

The network transmitting unit 40a further divides the size of the survey data by the elapsed time (a time from when the survey data was transmitted to when it was received back) to calculate a current traffic value (Step S6).

Following that, the network transmitting unit 40a computes a rate of change of the current traffic value relative to the traffic value initially detected using the survey data (Step S9), and sets a flag (marks) in a region in the image size table 40-3 corresponding to a rate of change of the traffic value obtained as a result of the computation (Step S12).

After that, when notified of a transmitting timing for a frame from the Timer 39A, the image transmitting unit 39e refers to the compressing system table 40-4 and reads out information as to a compressing system corresponding to the rate of change marked by the network transmitting unit 40e.

The image compressing engine 39E of the image transmitting unit 39e thereby performs a predetermined image compressing process on the basis of the compressing system read out from the image size table 40-4 on the image data as transmitting data.

After that, the image transmitting unit 39e adds the control information 48A as to the image compressing system to a leading portion of the image data 47 having been subjected to the image compressing process, and transmits it to the image receiving side computer 22e via the network transmitting unit 40e [Step S16, refer to a signal (A9)].

In particular, the image compressing engine 39E selects a compressing system such as to decrease the quantity of data if the traffic value of the network apparatus 23 decreases (if traffic deteriorates), and transmits the data. If the traffic value increases (if traffic improves), the image compressing engine 39E selects a compressing system such as to increase the quantity of data and transmits the data, thereby decreasing an effect on the traffic of the network apparatus 23 due to image data transmission.

It is thus possible to transmit image data according to the current traffic without necessity of re-adjusting the number of transmitting frames set prior to image data transmission.

The image receiving unit 44e of the image receiving side computer 22e refers to the data identification information 48A-1 described at the first octet of the received data. In this case, the data identification information 48A-1 is "2", it thus means that the received data is image data having been subjected to a compressing process in a compressing system selected according to a rate of change in traffic value. In consequence, the received data is handed over to the image compressing engine 44E of the image receiving unit 44e.

The image compressing engine 44E takes out the information as to a compressing system and the information 48A-3 through 48A-5 as to a data length in the control information 48A, then takes out the image data according to the data length designated by the information 47A-6 through 47A-9 as to this data lengths.

Following that, the image compressing engine 44E performs a restoring process in a compressing system corresponding to the information 48A-2 as to a compressing system to regenerate the original image data.

After that, the image data regenerated into the original data in the image compressing engine 44E of the image receiving unit 44e is controlled to be displayed on the image displaying apparatus 25 via the image displaying unit 45 (Step T6).

The image data communicating apparatus according to the sixth embodiment of this invention has the image compressing engine 39E and the compressing system table 40-4 in the image transmitting side computer 21e. If it is judged that the image data cannot be transferred in frames in the number initially set, the image data communicating apparatus implements an image compression on the image data in a desired compressing system on the basis of the traffic of the network apparatus 23 and transmits it, thereby controlling so as to bring about a transmittable number of frames for the image data close to the initial number of frames. Even if the traffic of the network apparatus 23 increases during transmission of the image data, it is therefore possible to adjust the quantity of communication data according to the current traffic while keeping the number of transmitting frames and provide an effective image data transmission most suitable for a network environment without affecting other services provided by the network apparatus 23.

Further, the image compressing engine 44E provided in the image receiving side computer 22e enables display of image data with a predetermined precision irrespective of the degree of congestion of the network apparatus 23 in the image receiving side computer 22e as the image data transmitting apparatus on the receiving side.

(g) Seventh Embodiment

Figure 26:
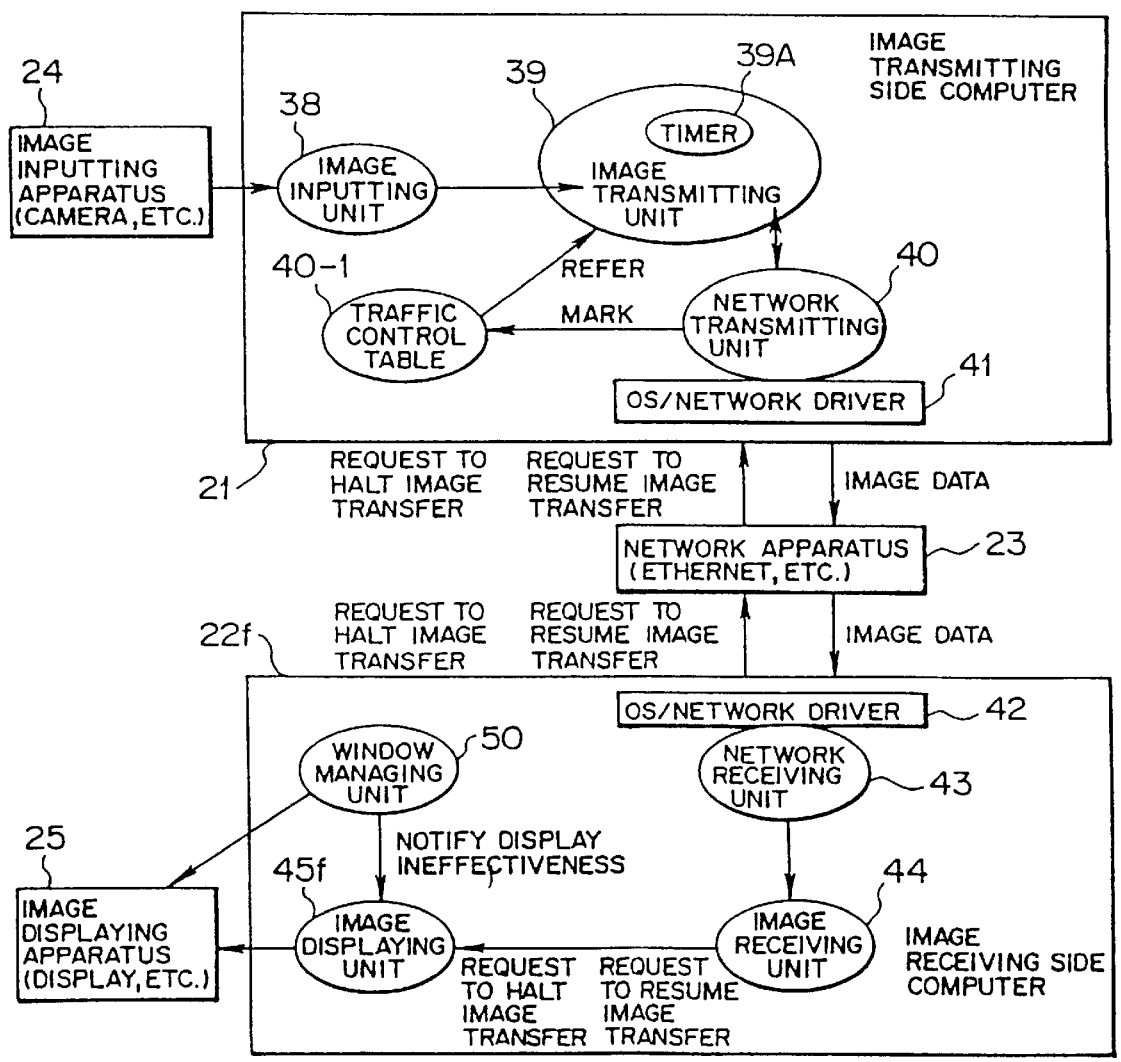
FIG. 26 is a block diagram showing an image data communication system to which an image data communicating apparatus according to a seventh embodiment of this invention is applied.

FIG. 26 is a block diagram showing an image data communication system to which an image data communicating apparatus according to a seventh embodiment of this invention is applied. In the image data communication system shown in FIG. 26, a window system is incorporated in an image receiving side computer 22f, differently from that according to the first embodiment described hereinbefore, to display received image data (video image data, for example) in a window by the window system. Other parts of the image data communication system remain basically the same.

In other words, the window system is incorporated in the image receiving side computer 22f, whereby the user can see image data in a multi-window environment utilizing the window system on the image displaying apparatus 25. As the above-mentioned window system, X window system can be used, for example.

The image transmitting side computer 21 according to this embodiment has a hardware structure similar to that of the first embodiment described hereinbefore (refer to FIG. 6). The image receiving side computer 22f has a hardware structure similar to that of the first embodiment described hereinbefore (refer to FIG. 7), as well.

Like reference characters in FIG. 26 designate like or corresponding parts in FIG. 10.

An image displaying unit 45f has a function as a window display control unit for controlling display of the image displaying apparatus 25 so as to display received image data on the basis of the window system.

In particular, when receiving a notification from the image receiving unit 44, the image displaying unit 45f activates the image display connecting apparatus 36 to controllably display image data placed in the main storage 33 (refer to FIG. 7) on the image displaying apparatus 25.

A window managing unit 50 of the image receiving side computer 22f manages windows of the window system. If X window system is applied as the window system, the window managing unit 50 is configured with a window manager, twm or the like.

In particular, the window managing unit 50 supervises and manages all objects displayed on the image displaying apparatus 25. If a window is generated, the window managing unit 50 supervises and controls a stack showing a position of display, a size and an order of displaying the window and the like.

The window managing unit 50 notifies, as management information to the image displaying unit 45f, necessary information including, for example, information as to generation, deletion, movement or size of all windows displayed on the image displaying apparatus 25.

In particular, if a window for image data displayed on the image displaying apparatus 25 is completely covered with another window, the window managing unit 50, as management information, notifies the image displaying unit 45f of the ineffectiveness of the image display. If a part of a window for image data is covered with another window, the window managing unit 50, as management information, notifies the image displaying unit 45f of the covered region.

If it is judged that another window covering the window for the image data displayed on the image displaying apparatus 25 has moved or vanished, whereby the window for the image data can be completely displayed, the window managing unit 50, as management information, notifies the image displaying unit 45f of the effectiveness of the image display.

If the image displaying unit 45f is notified on the basis of the management information from the window managing unit 50, of ineffectiveness of the image display or information as to a region of a window in which image data is displayed covered with another window, the image displaying unit 45f halts image transfer for that region via the network receiving unit 43 and the image receiving unit 44. When notified of the effectiveness of image display, the image displaying unit 45f causes the image displaying unit 45f to resume the image transfer via the network receiving unit 43 and the image receiving unit 44.

The network receiving unit 43 outputs a control signal to the image transmitting side computer 21 corresponding to an instruction received from the image displaying unit 45f to halt image transfer of the covered region or make a request to resume the image transfer.

Figure 27:
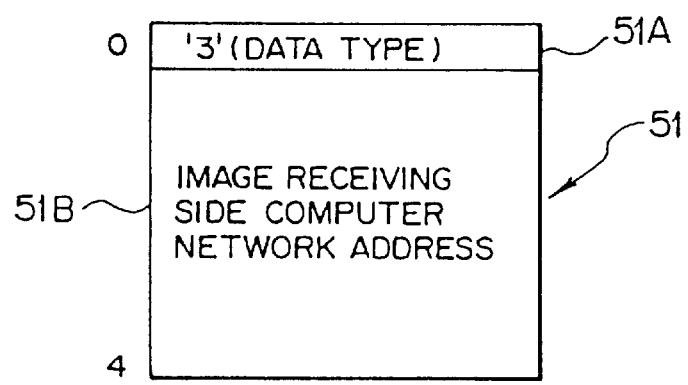
FIG. 27 is a diagram showing a format of a control signal used in the seventh embodiment of this invention.

In particular, if the network receiving unit 43 receives an instruction from the image displaying unit 45f, to halt transfer of image data the network receiving unit 43 transmits a control signal 51 having a data format as shown in FIG. 27 to the image transmitting side computer 21 to make a request to stop (temporarily stop) the image transfer.

Namely, the control signal shown in FIG. 27 has a first octet region 51A in which data identification information "3" used to identify a type of data (that is, identify a control signal used to make a request to halt image transfer), and a second octet to fifth octet region 51B in which is a network address unique to the image receiving side computer 22f.

As the network address in the above-mentioned second to fifth octet region 51B, an address is used, the address being given uniquely to each computer accommodated by the network apparatus 23.

Figure 28:
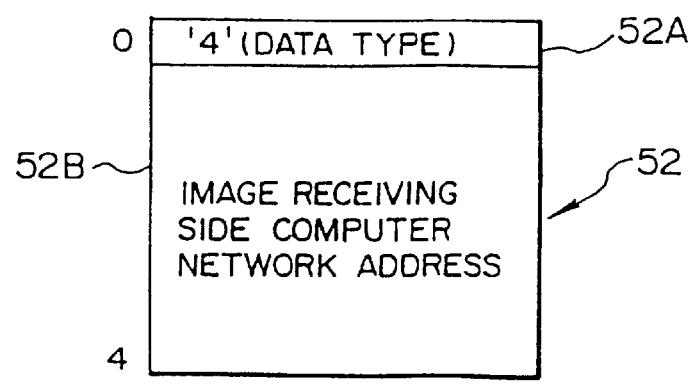
FIG. 28 is a diagram showing a format of another control signal used in the seventh embodiment of this invention.

If the network receiving unit 43 receives an instruction to resume image transfer from the image displaying unit 45f, the network receiving unit 43 transmits the control signal 52 having a data format as shown in FIG. 28 to the image transmitting side computer 21 to make a request to resume the image transfer.

Namely, the control signal 52 shown in FIG. 28 consists of the a first octet region 52A in which data identification information used to identify a type of data (that is, a control signal used to make a request to resume the image transfer) is described, and a second to fifth octet region 52B in which a network address unique to the image receiving side computer 22f is described, similarly to the control signal 51 described above (refer to FIG. 27).

Figure 29:
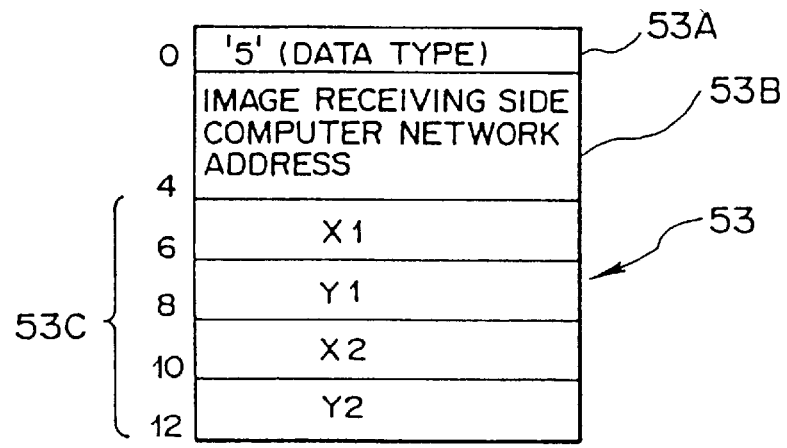
FIG. 29 is a diagram showing a format of still another control signal used in the seventh embodiment of this invention.

Further, if the network receiving unit 43 receives information as to a covered region of a window displaying the image data therein from the image displaying unit 45f via the image receiving unit 44, the network receiving unit 43 transmits a control signal 53 having a data format of 13 octets as shown in FIG. 29 to the image transmitting side computer 21 to make a request to halt the image transfer of data in the covered region.

In a first octet region 53A of the control signal 53 shown in FIG. 29, data identification information "5" used to identify a type of data (that is, a control signal used to make a request to halt the image transfer of data in the covered region) is described.

In a second to fifth octet region 53B, a network address unique to the image receiver side computer 22f similar to that of the above-mentioned control signal 51 (refer to FIG. 27) is described.

Further, in a sixth to thirteenth octet region 53C, coordinate information of a covered region is described. In particular, if the covered region is a rectangle, coordinates at the top left-hand vertex are assumed to be (X1, Y1) and described in a sixth to ninth octet region, and coordinates at the bottom right-hand vertex are assumed to be (X2, Y2) and described in a tenth to thirteenth octet region, thereby specifying the covered rectangular region.

Figure 30:
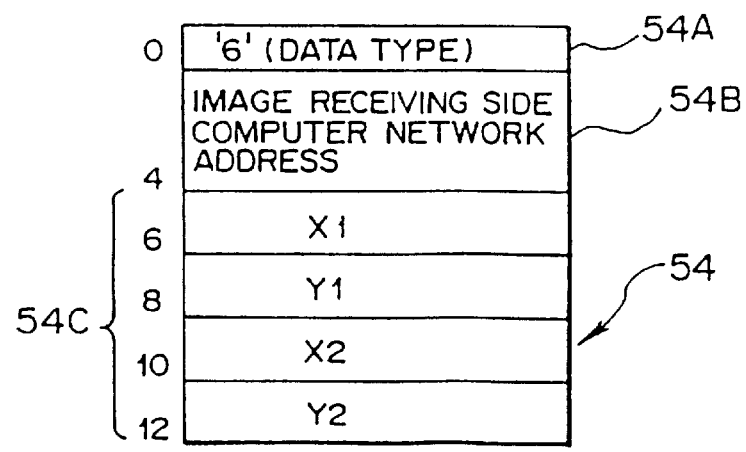
FIG. 30 is a diagram showing a format of still another control signal used in the seventh embodiment of this invention.

If the network receiving unit 43 receives information from the image displaying unit 45f via the image receiving unit 44 to the effect that another window covering a window displaying the image data therein has moved so that the window displaying the image data is again effective, the network receiving unit 43 transmits a control signal 43 having a data format of 13 octets as shown in FIG. 30 to the image transmitting side computer 21 to make a request to resume transfer of the image data as to an entire image region including data of the covered region.

In the control signal 54 shown in FIG. 30, there is described data identification information "6" used to identify a type of data (that is, a control signal used to make a request to resume image transfer of image data as to an entire image region including a covered region) in a first octet region 54A.

In the second to fifth octet region 54B, there is described a network address unique to the image receiving side computer 22f similar to that of the above-mentioned control signal 51 (refer to FIG. 27).

In a sixth to thirteenth octet region 54C, there is described coordinate information of a covered region. In particular, if the covered region is a rectangular region, coordinates at the top left-hand vertex are assumed to be (X1, Y1) and described in a sixth to ninth octet region, and coordinates at bottom right-hand vertex are assumed to be (X2, Y2) and described in a tenth to thirteenth octet region, thereby specifying the covered rectangular region.

Therefore, the image displaying unit 45f, the image receiving unit 44 and the network receiving unit 43 described above have a function as a transfer halt requesting unit for requesting the image transmitting side computer 21 as the image data transmitting side to halt transfer of image data in a covered region if receiving management information from the window managing unit 50, and it is judged that the window displaying the image data therein is covered with another window.

If the image transmitting unit 39 of the image transmitting side computer 21 receives a request to halt transfer of image data (that is, a region covered with another window or an entire window) from the above-mentioned image displaying unit 45f, the image transmitting unit 39 halts the image transfer of that region. If receiving a request to resume the transfer, the image transmitting unit 39 resumes the image data transfer of image data as to the entire image region.

Figure 31:
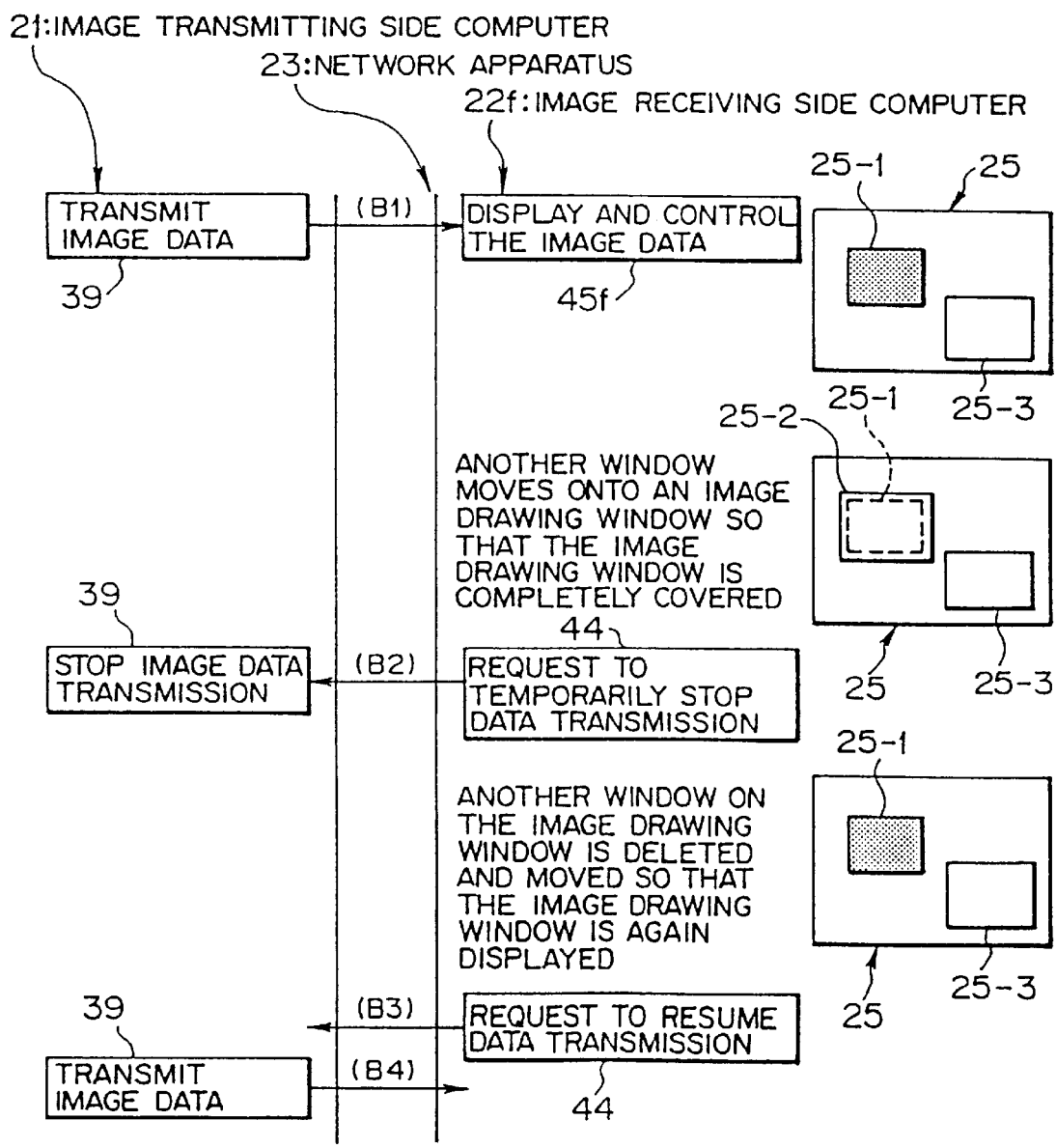
FIG. 31 is a communication sequence diagram for illustrating the operation of the seventh embodiment of this invention.
Figure 32:
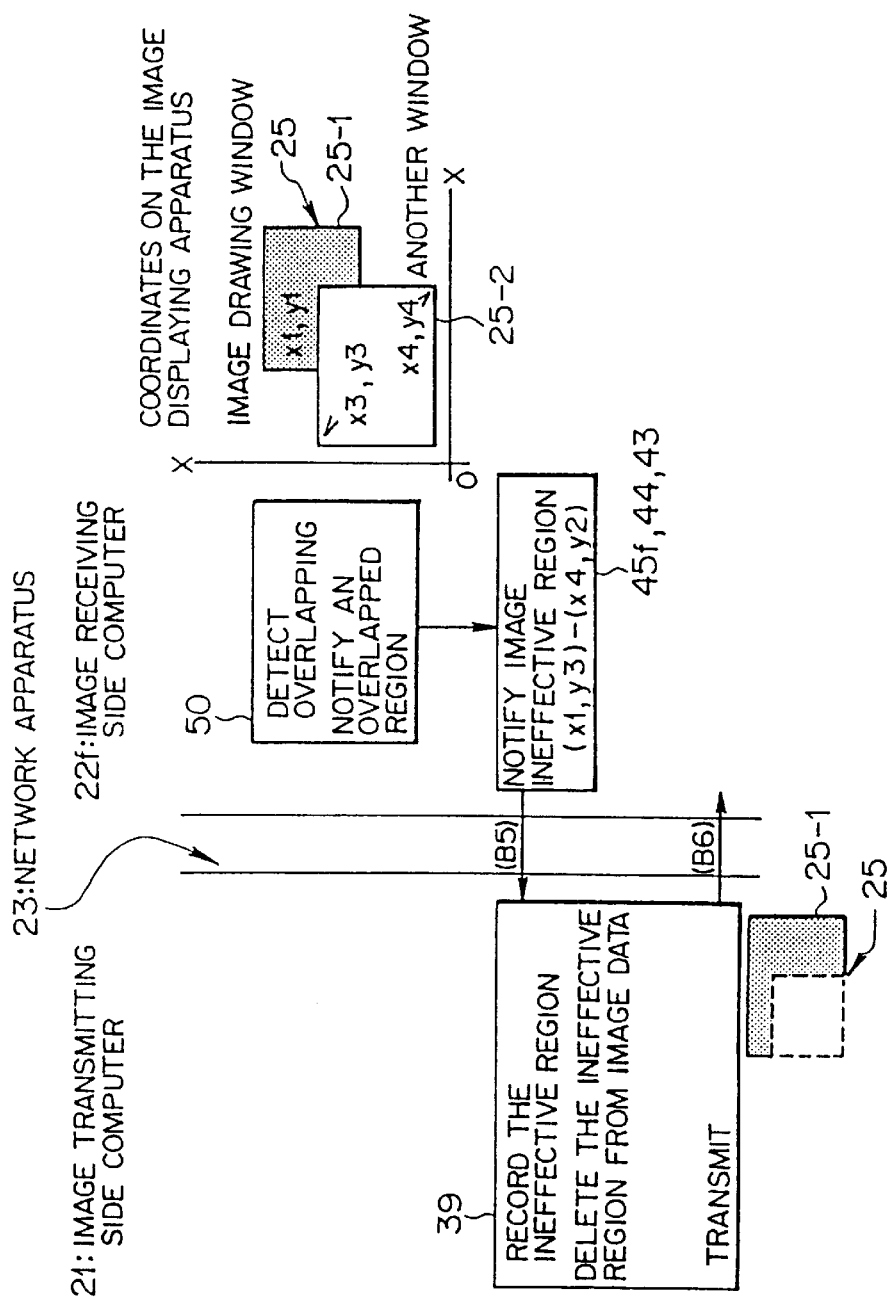
FIG. 32 is a communication sequence diagram for illustrating an operation of the seventh embodiment of this invention.

Next description is presented of an operation of the image data communication system to which the image data communicating apparatus with the above structure according to the seventh embodiment of this invention is applied with reference to FIGS. 31 and 32.

The image transmitting side computer 21 sets a transmittable number of transferring frames of image data on the basis of the traffic of the network apparatus 23 prior to transmission of the image data, to automatically set a quantity of communication data similarly to the first embodiment described hereinbefore.

It is therefore possible to generate image data transmitting timings by the timer 39A so as to transmit the image data in frames in the set number. If the image data that should be transmitted is inputted, the image data is transmitted to the image receiving side computer 22f over the network apparatus 23 on the basis of the transmitting timings [refer to a signal (B1) in FIG. 31]

Namely, the image transmitting side computer 21 transmits an image with the number of frames as an initial value set prior to image data transmission. The image displaying unit 45f of the image receiving side computer 22f controls the image displaying apparatus 25 to display the image in a window thereon.

In this case, an image drawing window 25-1 is not covered with another window 25-2 so that an entire image region is displayed.

There is a case where the image drawing window 25-1 displaying image data therein is completely covered with another window 25-2 caused by, for example, an operation of the operator of the image receiving side computer 22f.

For instance, assuming that when the operator of the image receiving side computer 22f sees a blue print of a certain apparatus in another window 25-3 while displaying an image of the apparatus in the window 25-1, the operator further displays a list of chips equipped on the apparatus in still another window 25-2. If the size of the display of the window 25-2, opened last, is very large, the image in the window 25-2 might completely cover the window 25-1 displaying the image therein.

In such case, the window managing unit 50 detects that the window 25-1 displaying the image therein is completely covered with another window 25-2. The window 25-1 cannot be seen since it is completely covered with the window 25-2 so that the window managing unit 50 notifies image display ineffectiveness to the image displaying unit 45f.

When receiving a notification of image display ineffectiveness from the window managing unit 50, the image displaying unit 45f notifies the network receiving unit 43 via the image receiving unit 44 in order to make a request to halt image transfer to the image transmitting side computer 21. The network receiving unit 43 transmits the control signal 51 (refer to FIG. 27) representing a request to halt the transfer to the image transmitting side computer 21 [refer to a signal (B2) in FIG. 31].

The network transmitting unit 40 refers to the data identification information described at the first octet of the received data. If the data identification information is "3", it means that the received data is the control signal 51 representing a request to halt the transfer so that the control signal 51 is outputted to the image transmitting unit 39.

If image data displayed in a window is covered with another window, the image receiving side computer 22f requests the image data transmitting side to halt transfer of image data in a covered region.

When receiving the control signal 51, the image transmitting unit 39 marks that the image data transmission to the image receiving side computer 22f is ineffective and to stop the image transmission. Even if the image transmitting unit 39 receives a signal representing a transmitting timing generated by the timer 39 and the time for transmitting the following image data comes, the image data is therefore not transmitted since the transmission ineffectiveness is marked.

When receiving a request from the image receiving side computer 22f to halt transfer of image data, the image transmitting side computer 21 halts transmission of image data in a covered region.

After that, if the operator of the image receiving side computer 22f discards the window 25-2 covering the image displaying window 25-1, the operator can see again the image displaying window 25-1. The image managing unit 50 therefore notifies the image displaying unit 45f that the image display is again effective.

The image displaying unit 45f having received a notification of image display effectiveness from the window managing unit 50 instructs the network receiving unit 43 to make a request to resume transfer of the image data via the image receiving unit 44. Following that, the image receiving unit 44 transmits a control signal 52 to the image transmitting side computer 21 through the network receiving unit 43 to make a request to resume the image transfer [refer to a signal (B3) in FIG. 31].

The network transmitting unit 40 refers to the data identification information described at the first octet of received data. If the data identification information is "4", it means that the received data is the above-mentioned control signal 52 representing a request to resume the image transfer so that the control signal 52 is outputted to the image transmitting unit 39.

When receiving the control signal 52, the image transmitting unit 39 cancels the image transmission ineffective mark to the image receiving side computer 22f. Accordingly, the image transmitting unit 39 receives a signal representing a transmitting timing generated by the timer 39A. If the time to transmit the following image data comes, the image transmitting unit 39 transmits the image data to the image receiving side computer 21 [refer to a signal (B4) in FIG. 31].

Meanwhile, a part of the image drawing window 25-1 displaying image data therein is covered with another window 25-2 caused by, for example, an operation of the operator of the image receiving side computer 22f. In such case, the window managing unit 50 can detect it.

If the window is formed with a rectangle, a region of the image drawing window 25-1 is specified by coordinates at the top left-hand vertex (x1, y1) and coordinates at the bottom right-hand vertex (x2, y2) of the rectangle. On the other hand, a region of another window 25-2 is specified by coordinates at the top left-hand vertex (x3, y3) and coordinates at the bottom right-hand vertex (x4, y4) of the rectangle. The window managing unit 50 can detect whether the region of the window 25-1 is overlapped or not by checking coordinate data.

In the following description, a region of a rectangle forming a window displayed on the image displaying apparatus 25 will be occasionally expressed as (xa, ya, xb, yb) using coordinates (xa, ya) at the top left-hand vertex and coordinates (xb, yb) at the bottom right-hand vertex.

If the window managing unit 50 detects that a part of the window 25-1 displaying image data therein is covered (overlapped) with another window 25-2, the window managing unit 50 notifies information as to that region to the image displaying unit 45f. In this case, information about a region (a rectangle) overlapped is formed with coordinates (x1, y3) at the top left-hand vertex and coordinates (x4, y2) at the bottom right-hand vertex as coordinate data.

The image displaying unit 45f having received coordinate data from the window managing unit 50 gives an instruction through the image receiving unit 44 to the network receiving unit 43 to make a request to halt transfer of image data in that region.

The network receiving unit 43 outputs the control signal 52 to the image transmitting side computer 21 over the network apparatus 23 to make a request to halt transfer of image data corresponding to a region in which overlapping occurs in the window 25-1 [refer to a signal (B5) in FIG. 32].

The network transmitting unit 40 refers to the data identification information described at the first octet of received data. If the data identification information is "5", it means that the received data is the control signal 53 making a request to halt transfer of a part of image data so that the control signal 52 is outputted to the image transmitting unit 39.

When receiving the control signal 53, the image transmitting unit 39 marks that transmission of image data is ineffective corresponding to a region in which overlapping occurs. If the image transmitting unit 39 receives a signal representing a transmitting timing generated by the timer 39A and the time to transmit the following image data comes, image data of only a region in which overlapping does not occur is transmitted [refer to a signal (B6)].

In this case, image data of a region (x1, y3, x4, y2) among image data of a region (x1, y1, x2, y2) constituting the window 25-1 is deleted and image data of the remaining part is transmitted.

After that, if the operator of the image receiving side computer 22f discards the window 25-2 covering a part of the image displaying window 25-1, the window managing unit 50 notifies the image displaying unit 45f that the image display is again effective.

The image displaying unit 45f gives an instruction through the image receiving unit 44 to the network receiving unit 43 to resume transfer of the image data. The network receiving unit 43 transmits the control signal 54 to the image transmitting side computer 21 to make a request to resume the transfer of the image data.

The network transmitting unit 40 refers to the data identification information described at the first octet of received data. If the data identification information is "6", it means that the received data is the above-mentioned control signal 54 representing a request to resume the transfer of the image data so that the control signal 54 is outputted to the image transmitting unit 39.

When receiving the control signal 54, the image transmitting unit 39 cancels an image transmission ineffective mark of a part of the image data. When the image transmitting unit 39 receives a signal representing a transmitting timing generated by the timer 39A, the image transmitting unit 39 transmits image data of an entire image region to the image receiving side computer 21 when the time to transmit the following image data comes.

The image data communicating apparatus according to the seventh embodiment of this invention has the window managing unit 50f and the image displaying unit 45f in the image receiving side computer 22f as the image data communicating apparatus on the receiving side. The image data communication apparatus according to this embodiment has an advantage such that if image data displayed in the window is covered with another window, it is possible to request the image data transmitting side to halt transfer of image data in the covered region, similarly to the first embodiment described hereinbefore. In addition, it is possible to detect image data from the image transmitting side computer 21 unnecessary to be displayed. The image data communicating apparatus according to this mode has another advantage of reducing the quantity of image data from the image transmitting side computer 21 so as to efficiently transfer image data most suitable to the network environment.

In the above embodiment, transmission of image data in a region covered with another window is halted. According to this invention, it is alternatively possible to paint out image data in a region covered with another window with a specific pixel value to increase an image compression rate, and transmit it.

(h) Eighth Embodiment

Figure 33:
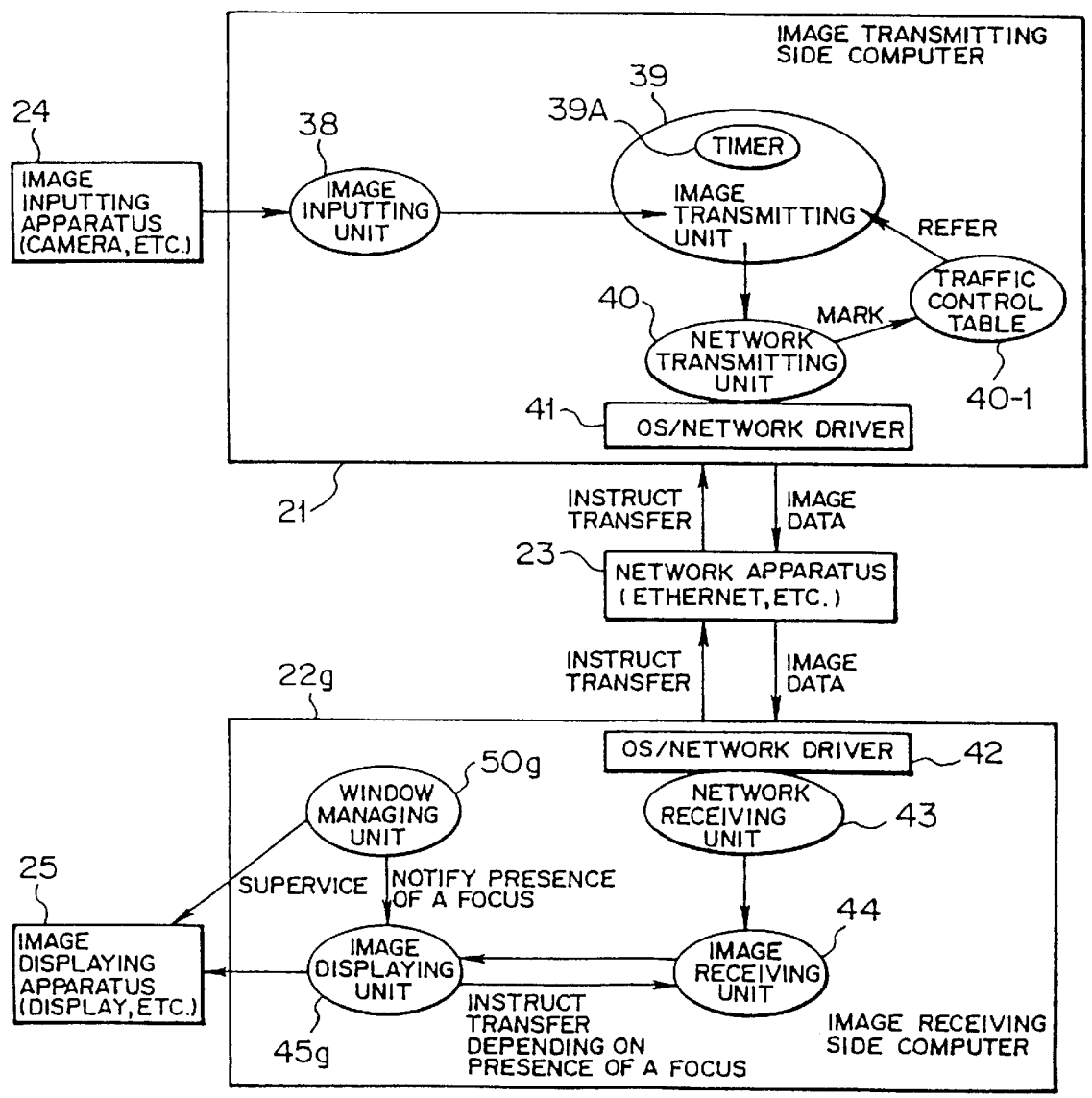
FIG. 33 is a block diagram showing an image data communication system to which an image data communicating apparatus according to an eighth embodiment of this invention is applied.

FIG. 33 is a block diagram showing an image data communication system to which an image data communicating apparatus according to an eighth embodiment of this invention is applied. In the image data communication system shown in FIG. 33, a window system is incorporated in an image receiving side computer 22g, similarly to the seventh embodiment described above, where received image data (video image data, for example) is displayed in a window by the window system.

In other words, the image receiving side computer 22g is incorporated therein with the window system so that the user (operator) can see image data in a multi-window environment utilizing the window system on the image displaying apparatus 25. As the above-mentioned window system, it is possible to use an X window system, for example.

The image data communication system, to which the image data communicating apparatus according to this embodiment is applied, makes a request as to transmission of image data of the image transmitting side computer 21 of the image receiving side computer 22g in a mode different from that according to the seventh embodiment described above. Other structures of the image data communication system remain basically the same.

The image transmitting side computer 21 according to this embodiment has a hardware structure similar to that according to the first embodiment described hereinbefore (refer to FIG. 6). The image receiving side computer 22g has a hardware structure similar to that according to the first embodiment described hereinbefore (refer to FIG. 7), as well.

Like reference characters in FIG. 33 designate like or corresponding parts in FIG. 26.

An image displaying unit 45g has a function as a window display control unit for controlling a display of the image displaying apparatus 25 to display received image data on the basis of a window system.

In particular, the image displaying unit 45g receives notification from the image receiving unit 44, thereby controlling display of the image displaying apparatus 25 to display image data placed in the main storage 33 (refer to FIG. 7) thereon by activating the image display connecting apparatus 36.

A window managing unit 50g of the image receiving side computer 22g manages windows in the window system. If X window system is particularly applied as the window system, the window managing unit 50g is configured with window manager, twm or the like.

In particular, the window managing unit 50g supervises and manages all objects displayed on the image displaying apparatus 25. The window managing unit 50g supervises and controls, for example, a stack storing position of window display, size, the order of displaying windows, and the like, when a window is generated. In addition, the window managing unit 50g supervises and controls a position of a pointing device such as a mouse cursor or the like.

The above-mentioned mouse cursor is a pointing device displayed in a position on the image displaying apparatus 25 according to a position of a mouse. The window managing unit 50 controls a display of the mouse cursor on the image displaying unit 25 on the basis of a position of the mouse.

The window managing unit 50g notifies, in particular, positional information of the pointing device among the above-mentioned object information to the image displaying unit 45g.

In particular, the window managing unit 50g supervises and manages the position of the pointing device. If a position of the pointing device is within a window displaying image data therein, it is judged that the operator is paying attention to (is focusing on) the image data displayed in the window so that the window managing unit 50g notifies this information the image displaying unit 45g.

Similarly, if a position of the pointing device is outside a window displaying image data therein, it is judged that the operator does not pay attention to (does not focus on) the image data displayed in the window so that the window managing unit 50g notifies this information the image displaying unit 45g.

The above-mentioned window managing unit 50g therefore has a function as a focus state managing unit for managing the state of focus in a window in the window system.

If the image displaying unit 45g receives information, from the window managing unit 50g, about the presence of a focus as the positional information of the pointing device and there is a focus, the image displaying unit 45g makes a request to set the number of transmitting frames of image data transmitted from the image transmitting side computer 21 to the number of transmitting frames set prior to the image data transmission through the image receiving unit 44 and the network receiving unit 43.

In other words, the image displaying unit 45g, the image receiving unit 44 and the network receiving unit 43 described above have a function as a frame number adjusting signal outputting unit for outputting a signal instructing the image data transmitting side to adjust the number of transferring frames according to a focus state of a window displaying therein image data managed by the window managing unit 50g.

Figure 34:
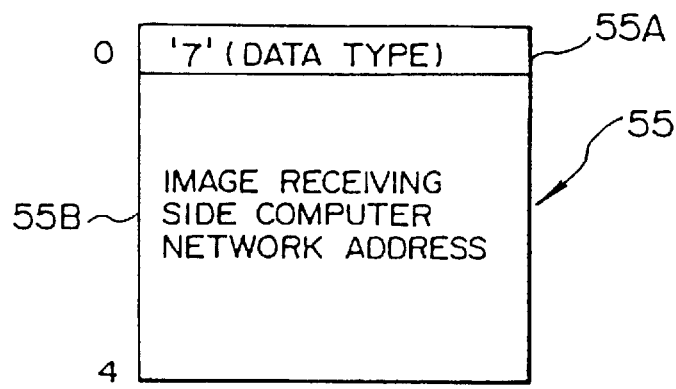
FIG. 34 is a diagram showing a format of a control signal used in the eighth embodiment of this invention.

A request as to the number of transmitting frames of the above image transmitting side computer 21 may be made by transmitting a control signal 55 as shown in FIG. 34, for example, to the image transmitting side computer 21 from the network receiving unit 43.

A control signal shown in FIG. 34 is formed with a first octet region 55A in which data identification information "7" used to identify a type of data (that is, a signal making a request to set the number of transferring frames to the number of frames set prior to image data transmission) is described and a second to fifth octet region 55B in which a network address unique to the image receiving side computer 22g is described.

As the network address in the above second to fifth octet region 55B, an address given uniquely to each computer accommodated by the network apparatus 23 is used.

Similarly, if there is no focus, the image displaying unit 45g requests the image transmitting side computer 21 through the image receiving unit 44 and the network receiving unit 43 to set the number of transmitting frames of image data from the image transmitting side computer 21 to a number smaller than the number of transmitting frames set prior to image data transmission (a half of the set number of transmitting frames, for example) on the basis of information about presence of a focus from the window managing unit 50g.

Figure 35:
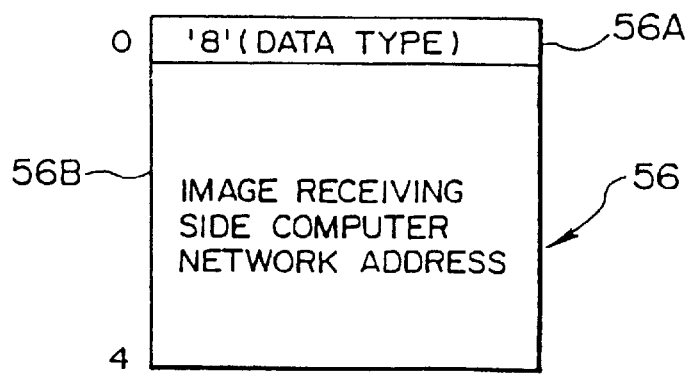
FIG. 35 is a diagram showing a format of a control signal used in the eighth embodiment of this invention.

The above request of the image receiving side computer 21 as to the number of transmitting frames may be made by transmitting a control signal 56 as shown in FIG. 35, for example, to the image transmitting side computer 21 from the network receiving unit 43.

Namely, the control signal 56 shown in FIG. 35 is formed with a first octet region 56A in which data identification information used to identify a type of data (that is, a signal making a request to reduce the number of transmitting frames set prior to image data transmission to a half) is described, and a second to fifth octet region 56B in which a network address unique to the image receiving side computer 22g is described.

As the network address in the above second to fifth octet region, an address given uniquely to each computer accommodated by the network apparatus 23 is used similarly to that shown in FIG. 34 (refer to a reference numeral 55B).

When receiving a request to reduce the number of transmitting frames from the image displaying unit 45g, the image transmitting unit 39 of the image transmitting side computer 21 marks that there is not a focus in the window displaying image data therein, and sets an interval of a frame transmitting timing signal generated by the timer 39A to an increased interval, for example, twice the interval initially set to transmit the image data.

When receiving a request to set the number of frames to the number of transmitting frames initially set, the image transmitting unit 39 cancels the mark representing that there is not a focus in the window displaying the image data therein to restore the interval of the signal showing a frame transmitting timing generated by the timer 39A to an interval originally set, and transmits the image data.

Figure 36:
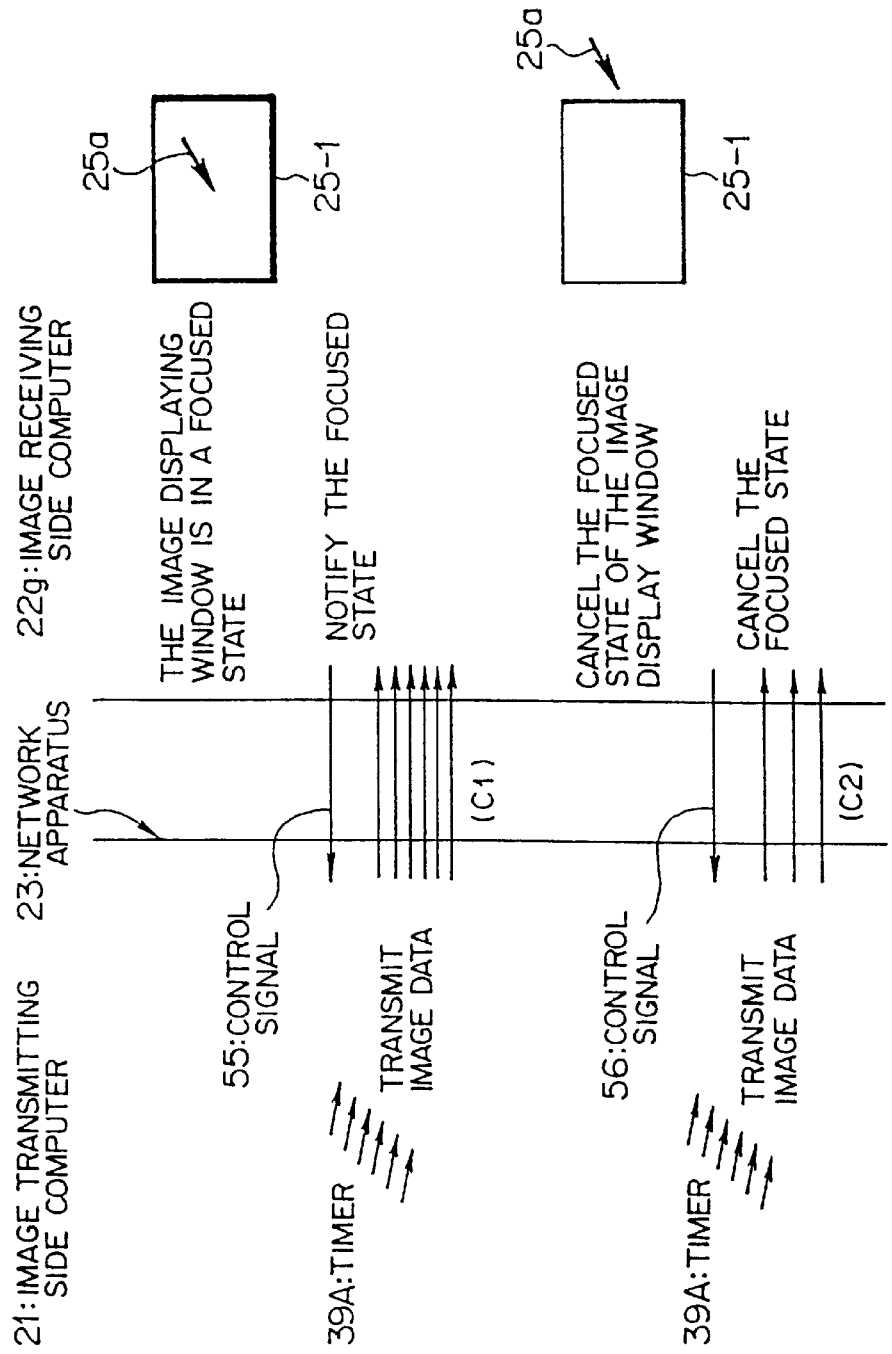
FIG. 36 is a communication sequence diagram for illustrating an operation of the eighth embodiment of this invention.

Next is a description of an operation of the image data communication system to which is applied the image data communicating apparatus according to the eighth embodiment of this invention with reference to a signal sequence diagram shown in FIG. 36.

Namely, the image transmitting side computer 21 sets a transmittable number of transmitting frames for image data on the basis of traffic of the network apparatus 23 prior to transmission of the image data similarly to the first embodiment described hereinbefore, thereby automatically adjusting the quantity of communication data.

Whereby, the timer 39A can generate image data transmitting timings so as to transmit image data in frames in the set number. If image data that should be transmitted is inputted, the image transmitting side computer 21 transmits the image data, on the basis of the transmitting timings, to the image receiving side computer 22g over the network apparatus 23.

Namely, in the image transmitting side computer 21, the image is transmitted in frames in set number prior to the image data transmission as an initial value. The image is then displayed in a window under control of the image displaying unit 45g of the image receiving side computer 22g on the displaying apparatus 25.

For instance, if the operator seeing the image displaying window 25-1 displayed on the image displaying apparatus 25 focuses on an image, the mouse cursor 25a is moved inside the image displaying window 25-1, as shown in FIG. 36.

The window managing unit 50g supervises the position of the mouse cursor 25a. When detecting that the mouse cursor 25a has moved inside the image displaying window 25-1, the window managing unit 50g notifies the image displaying unit 45g that there is a focus.

The image displaying unit 45g having received a notification that there is a focus from the window managing unit 50g makes a request to set the number of transmitting frames of image data that should be transmitted to the number of transmitting frames set prior to transmission of the image data. This request is made by transmitting the control signal 55 from the network receiving unit 43 to the image transmitting side computer 21.

The image transmitting side computer 21 having received the control signal 55 from the image receiving side computer 22g sets the frame transmitting timing signals outputted from the timer 39A of the image transmitting unit 39 so that the number of transmitting frames is equal to the number of frames set prior to the image data transmission.

The image transmitting unit 39 can thereby transmit the image data at frame transmitting timings generated by the timer 39A [refer to a signal (C1)].

Next, if the operator seeing the image displaying window 25-1 on the image displaying apparatus 25 moves the mouse cursor 25a out of the image displaying window 25-1, the window managing unit 50 detects that the mouse cursor 25a has moved outside the image displaying window 25-1 and notifies the image displaying unit 45g that there is no focus.

The image displaying unit 45g having received a notification that there is no focus from the window managing unit 50 makes a request to reduce the number of transmitting frames of image data that should be transmitted, for example, half of the number of transmitting frames set prior to the image data transmission. This request is made by transmitting the control signal 56 from the network receiving unit 43 to the image transmitting side computer 21.

The image transmitting side computer 21 having received the control signal 56 from the image receiving side computer 22g marks that there is no focus in the image displaying window 25-1, and sets the interval of the transmitting frame timing signals outputted from the timer 39A of the image transmitting unit 39 to an increased interval of transferring frames, that is, twice the interval of frames in the set number determined prior to the image data transmission, thereby reducing the number of transmitting frames from the image transmitting side computer 21 to half [refer to a signal (C2)].

If the user again moves the mouse cursor 25a inside the image display window 25-1 in order to pay attention to the image displaying window 25-1, the window managing unit 50 detects the cursor's position, and notifies the image displaying unit 45g that there is a focus, as in the above case.

In consequence, the image displaying unit 45g makes a request to set the number of frames for image data to be transmitted to the number of transmitting frames set prior to the image data transmission as in the above case.

The network transmitting unit 40 of the image transmitting side computer 21 refers to the data identification information "8" described at the first octet 55A of received data from the image receiving side computer 22g, identifies that the received data is the control signal 55 used to restore the number of transmitting frames to the number initially set, then transfers it to the image transmitting unit 39.

When receiving the control signal 55, the image transmitting unit 39 cancels a mark representing that there is no focus, and resets the timer 39A, thereby restoring the number of transmitting frames to the original number.

As compared with a case where image data of a whole image is continuously transmitted on the basis of frame transmitting timings from the timer 39A, this embodiment decreases the frequency of transmission of image data to which the operator does not pay attention, thereby noticeably reducing the quantity of image data while maintaining a visual impression of the image the operator in a high level.

As above, the image data communicating apparatus according to the eighth embodiment of this invention has the window managing unit 50g and the image displaying unit 45g in the image receiver side computer 22g as the image data communicating apparatus on the receiving side, which has an advantage such that it is possible to vary the number of transferring frames that should be transmitted from the image transmitting side computer 21 on the basis of a state of focus in a window of image data displayed on the image receiving side computer 22g, similarly to the first embodiment described hereinbefore. The image data communicating apparatus according to the eighth embodiment further has another advantage such that the image data communicating apparatus transmits in detail a part of the image data to which the operator is paying attention and coarsely transmits image data excepting that part, thereby decreasing the quantity of image data from the image transmitting side computer 21 while continuously keeping a degree of an impression of the image data displayed on the image displaying apparatus 25 to the operator. This allows effective data transfer most suitable for the network environment without affecting traffic of the network apparatus 23.

In the above embodiment, an interval at which a signal is generated by the timer 39A is altered when image data in a region in which there is no focus is transmitted. However, this invention is not limited to this example, but it is possible to keep an interval at which a signal is generated by the timer 39A as before while providing a function unit which ignores one out of two frame transmitting timings from the timer 39A, which can provide the same advantages as the above embodiment.

(i) Ninth Embodiment

Figure 37:
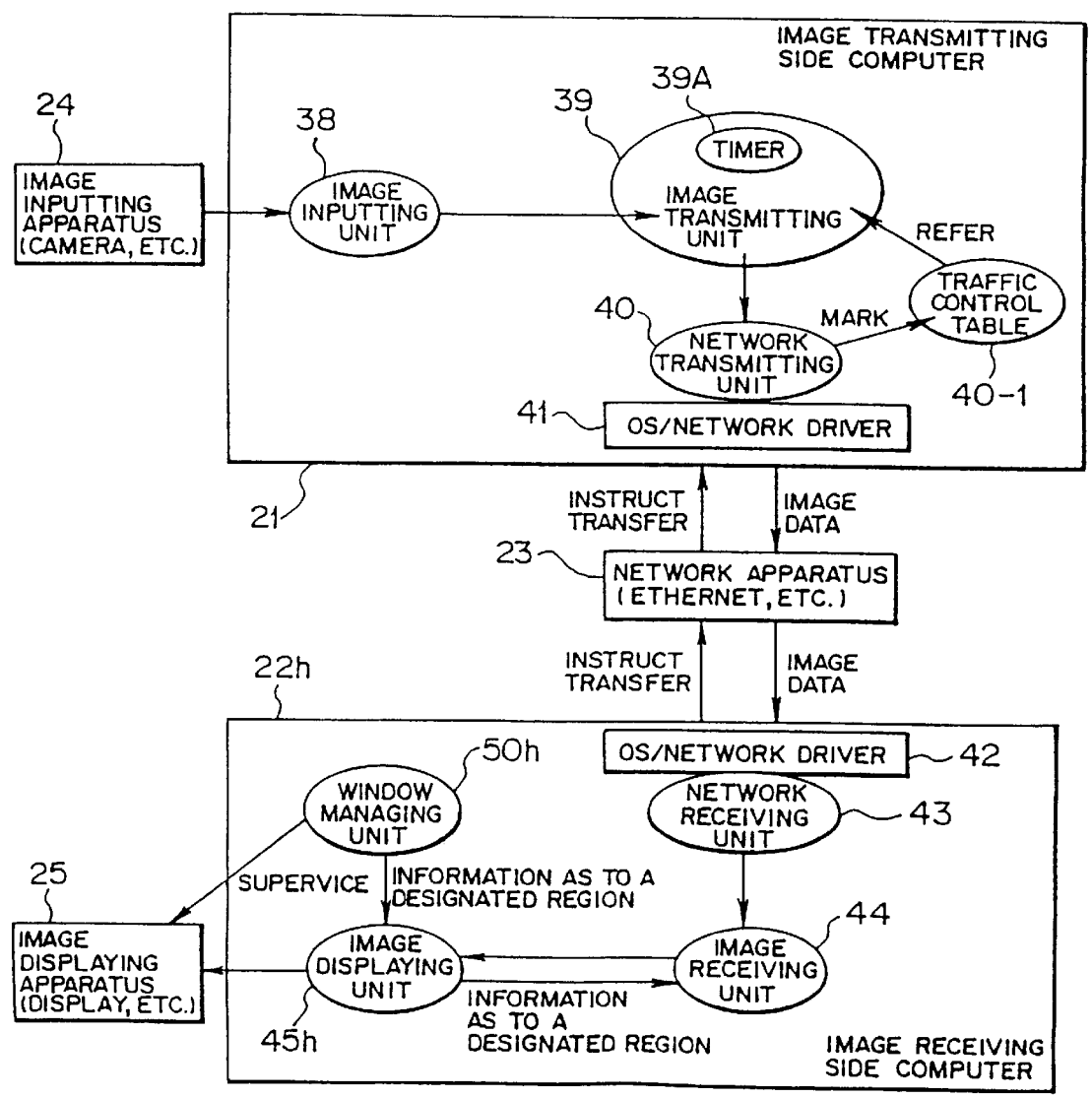
FIG. 37 is a block diagram showing an image data communication system to which an image data communicating apparatus according to a ninth embodiment of this invention is applied.

FIG. 37 is a block diagram showing an image data communication system to which an image data communicating apparatus according to a ninth embodiment of this invention is applied. In the image data communication system shown in FIG. 37, a window system is incorporated in an image receiving side computer 22h similarly to the above seventh and eighth embodiments described above, where received image data (video image data, for example) is displayed in a window by the window system.

In other words, the window system is incorporated in the image receiving side computer 22h so that the user (operator) can see image data in a multi-window environment utilizing the window system on the image displaying apparatus 25. As the above window system, X window system, for example, may be used.

In the image data communication system to which the image data communicating apparatus according to this embodiment is applied, the image receiving side computer 22h requests the image transmitting side computer 21 to transmit image data in a mode different from that according to the seventh and eighth embodiments described above. Other structures of the image communication system remain basically the same.

The image receiving side computer 21 according to this embodiment has a hardware structure similar to the first embodiment described hereinbefore (refer to FIG. 6). On the other hand, the image receiving side computer 22h has a hardware structure similar to that according to the first embodiment described hereinbefore (refer to FIG. 7), as well.

Like reference characters in FIG. 37 designate like or corresponding parts in FIG. 33.

Here, an image displaying unit 45h has a function as a window display control unit for controlling a display on the image displaying apparatus 25 so as to display received image data on the basis of the window system.

In particular, the image displaying unit 45h receives a notification from the image receiving unit 44, and controllably displays image data placed in the main storage 33 (refer to FIG. 7) on the image displaying apparatus 25 by activating the image display connecting apparatus 36.

A window managing unit 50h of the image receiving side computer 22h manages windows of the window system. If X window system is, in particular, used as the window system, the window managing unit 22h is configured with window manager, twm or the like.

In particular, the window managing unit 50h supervises and manages all objects displayed on the image displaying apparatus 25. The window managing unit 50h supervises and controls, for example, a stack showing a position of a window display, size, and an order of displaying windows when a window is generated. In addition, the window managing unit 50h supervises and controls a position of a pointing device such as a mouse cursor or the like, and, in particular, detects mouse drag or the like.

The window managing unit 50h detects drag of an image displaying window performed by the operator as the above object information, and gives notice of the drag to an image displaying unit 45h. In particular, when detecting drag of an image displaying window, the window managing unit 50h judges that image data displayed in a detected dragged region is data that should be preferentially transferred, and so notifies the image displaying unit 45h.

In other words, the operator drags an image region to which the operator pays attention, thereby instructing to transmit the image data in that region in preference to other image data.

Therefore, the above window managing unit 50h has a function as a preferentially transmitted region designating unit for designating an image region that should be preferentially transferred on a screen displayed on the image displaying apparatus 25.

When detecting drag of an image displaying window from the window managing unit 50h, the image displaying unit 45h notifies the image transmitting side computer 21 via the image receiving unit 44 and the network receiving unit 43.

Namely, the image displaying unit 45h, the image receiving unit 44 and the network receiving unit 43 mentioned above have a function as a designated region notifying unit for notifying information as to an image region designated by the window managing unit 50h to the image data transmitting side.

Figure 38:
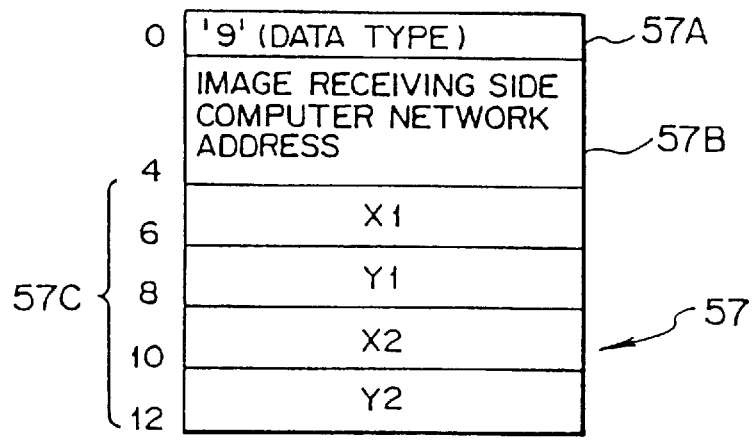
FIG. 38 is a diagram showing a format of a control signal used in the ninth embodiment of this invention.

Incidentally, drag detection information of an image window notified to the above-mentioned image transmitting side computer 21 is notified by transmitting a control signal 57 as shown, for example, in FIG. 38 from the network receiving unit 43 to the image transmitting side computer 21.

In a first octet region 57A of the control signal 57 shown in FIG. 38, data identification information "9" used to identify a type of data (that is, a signal notifying that drag of an image displaying window is detected) is described.

In a second to fifth octet region 57B, a network address unique to the image receiving side computer 22h similar to that of the control signal 51 (refer to FIG. 27) according to the seventh embodiment described hereinbefore is described.

Further, in a sixth to thirteenth octet region 57C, coordinate information of a region in which drag in the image displaying window is detected is described. In particular, in the case where a covered region is a rectangular region, coordinates at the top left-hand vertex are described as (X1, Y1) in a sixth to ninth octet region and coordinates at the bottom right-hand vertex are described as (X2, Y2) in a tenth to thirteenth octet region, thereby designating a region in which drag has been detected.

Figure 39:
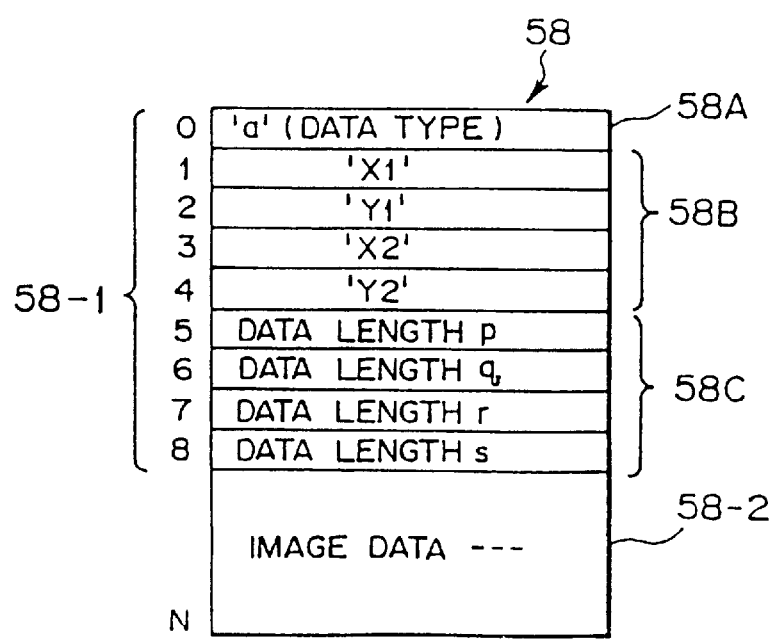
FIG. 39 is a diagram showing image data to which control information according to the ninth embodiment of this invention is added.

When receiving the above control signal 57 from the network receiving unit 43, the image transmitting unit 39 of the image transmitting side computer 21 transmits only image data in a region in which drag has been detected with a signal 58 having a format as shown, for example, in FIG. 39 on the basis of transmitting timings generated by the timer 39A.

In the signal 58 from the image transmitting unit 39 shown in FIG. 39, control information 58-1 is added to a leading portion of image data 58-2.

Namely, in a first octet region 58A in the control information 58-1 of the signal 58, data identification information "a" used to identify a type of data is described (that is, a signal representing that image data is in only a region in which drag has been detected).

In a second to fifth octet region 58B, coordinate information of a region in which drag has been detected in the image displaying window is described. In particular, if a covered region is a rectangular region, coordinates at the top left-hand vertex are described as (X1, Y1) in a second to third octet region and coordinates at the bottom right-hand vertex are described as (X2, Y2) in a fourth to fifth octet region, thereby designating a region in which drag has been detected.

In a sixth to ninth octet region 58C, information as to a data length of the following image data is described. If a data length of the following image data is 1024 bytes, for instance, the above information (from a data length p described at the sixth octet to a data length s described at the ninth octet) is "1", "0", "2" and "4".

In this case, the image transmitting unit 39 of the image transmitting side computer 21 can transmit image data in a region in which drag has been detected and image data of a whole image displaying window at a predetermined proportion on the basis of transmitting timings generated by the timer 39A.

In which case, the network transmitting unit 40 sets the coordinate data of the second to fifth octet region 58B as coordinate information designating the whole image displaying window at a predetermined proportion, and transmits the signal 58 including data of an entire image constituting the image displaying window to the image receiving side computer 22h.

If the number of transmitting frames from the image transmitting unit 39 is set to "5", for example, four frames are assigned to transmit image data of only a drag detected region and the remaining one frame is assigned to transmit image data of the whole image.

Figure 40:
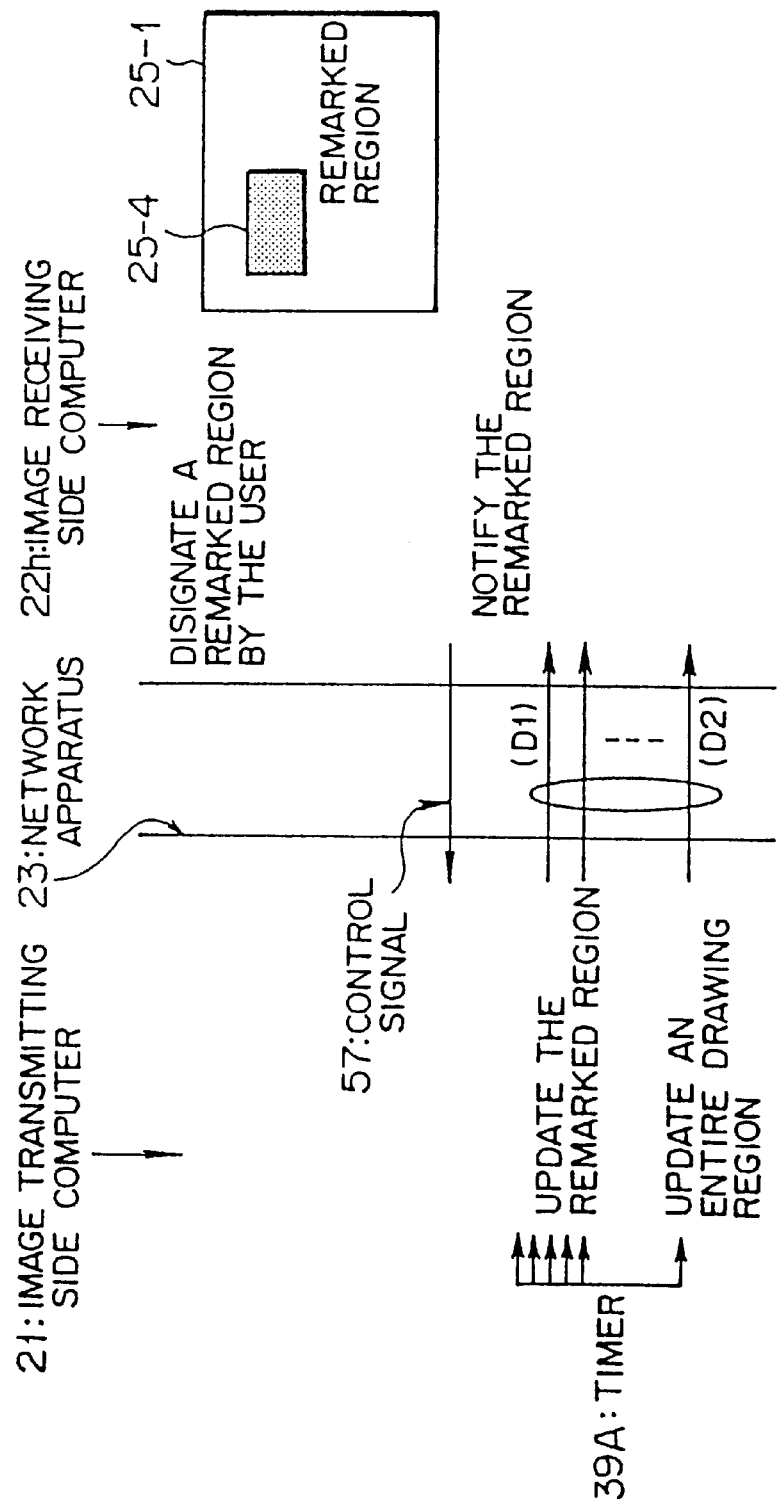
FIG. 40 is a communication sequence diagram for illustrating an operation of the ninth embodiment of this invention.

Next is a description of an operation of the image data communication system to which the image data communicating apparatus according to the ninth embodiment of this invention is applied with reference to a signal sequence diagram shown in FIG. 40.

Namely, the image transmitting computer 21 sets a transmittable number of transferring frames from image data on the basis of traffic of the network apparatus 23 prior to transmission of the image data, thereby automatically adjusting the quantity of data communication similarly to the first embodiment described hereinbefore.

The timer 39A can thereby generate image data transmitting timings so that the image data can be transmitted in frames in the set number. If image data that should be transmitted is inputted, the image transmitting side computer 21 transmits the image data on the basis of the transmitting timings to the image receiving side computer 22h over the network apparatus 23.

Namely, the image transmitting side computer 21 transmits an image in transferring frames in number set prior to image data transmission as an initial value. The image displaying unit 45h of the image receiving side computer 22h controls and displays the image in a window on the image displaying unit 25.

If the operator of the image receiving side computer 22h moves a mouse cursor into the image displaying window 25-1 on the image displaying apparatus 25 and designates a remarked region 25-4 while dragging the mouse cursor, the window managing unit 50 detects the dragging and notifies the image displaying unit 45h.

The image displaying unit 45h notifies information as to the detected drag region 25-4 to the image transmitting side computer 21 via the image receiving unit 44 and the network receiving unit 43. Namely, the image displaying unit 45h transmits the control signal 57 including the information (X1, Y1, X2, Y2) of the region in which drag has been detected to the image transmitting side computer 21 from the network transmitting unit 43.

When receiving data from the image receiving side computer 22g, the network transmitting unit 40 identifies the type of data by referring to the first octet. If the first octet is "9", it means that the data is the control signal 57 notifying of the region 25-4 in which drag has been detected so that the network transmitting unit 40 notifies of the region to the image transmitting unit 39.

The image transmitting unit 39 updates the remarked region 25-4 by marking the information as to the region 25-4 in which drag has been detected. After that, the image transmitting unit 39 transmits only data of the region (X1, Y1, X2, Y2) in which drag has been detected as the image data 58 on the basis of frame transmitting timing signals from the timer 39A to the image receiving side computer 22h via the network transmitting unit 40 (refer to a signal (D1)].

When receiving data from the image receiving side computer 21, the network receiving unit 43 identifies the type of data by referring to the first octet of the data. If the first octet is "a", it means that the following image data is image data of only the region 25-4 in which drag has been detected so that the network receiving unit 43 outputs it to the image receiving unit 44.

The image receiving unit 44 outputs the image data of the region 25-4 (X1, Y1, X2, Y2) in which drag has been detected to the image displaying unit 45h. The image displaying unit 45h controls so as to display the image data of the region 25-4 on the image displaying apparatus 25.

After that, the image transmitting unit 39 transmits the image data of only the drag region for a predetermined time on the basis of frame transmitting timing signals from the timer 39A, after that, transmits image data of a whole image constituting the image displaying window 25-1 [refer to a signal (D2)].

In this case, it is possible to transmit image data of a whole image constituting the image displaying window 25-1 by designating coordinates of the whole image as coordinate information in the second to fifth octet region 58B in the signal 58 (refer to FIG. 39) including image data transmitted from the network transmitting unit 40.

As above, the image data communicating apparatus according to the ninth embodiment of this invention has the window managing unit 50h and the image displaying unit 45h in the image receiving side computer 22h as the image data communicating apparatus on the receiving side. The image transmitting side computer 21 transmits preferentially image data in a region designated by the user within a screen on which the image data is drawn in the image receiving side computer 22h so as to decrease frequency of transfer of data of the remaining parts. As compared with a case where image data of a whole image is continuously transmitted on the basis of frame transmitting timings from the timer 39A, it is possible to transmit image data, not paid attention by the operator, with less frequency, thereby noticeably reducing the quantity of the image data while keeping a degree of visual impression of the image to the operator at a high level.

In this embodiment described above, a region in which the operator drags the mouse cursor is assigned as a remarked region and image data of the remarked region is preferentially transmitted from the image transmitting side computer 21. According to this invention, it is alternatively possible to assign the mouse cursor as a pointing device moved on the image displaying apparatus 25 by the operator or a rectangular region centered at the mouse cursor as the above remarked region, which can also provide the same advantage as this embodiment described above.

Figure 41:
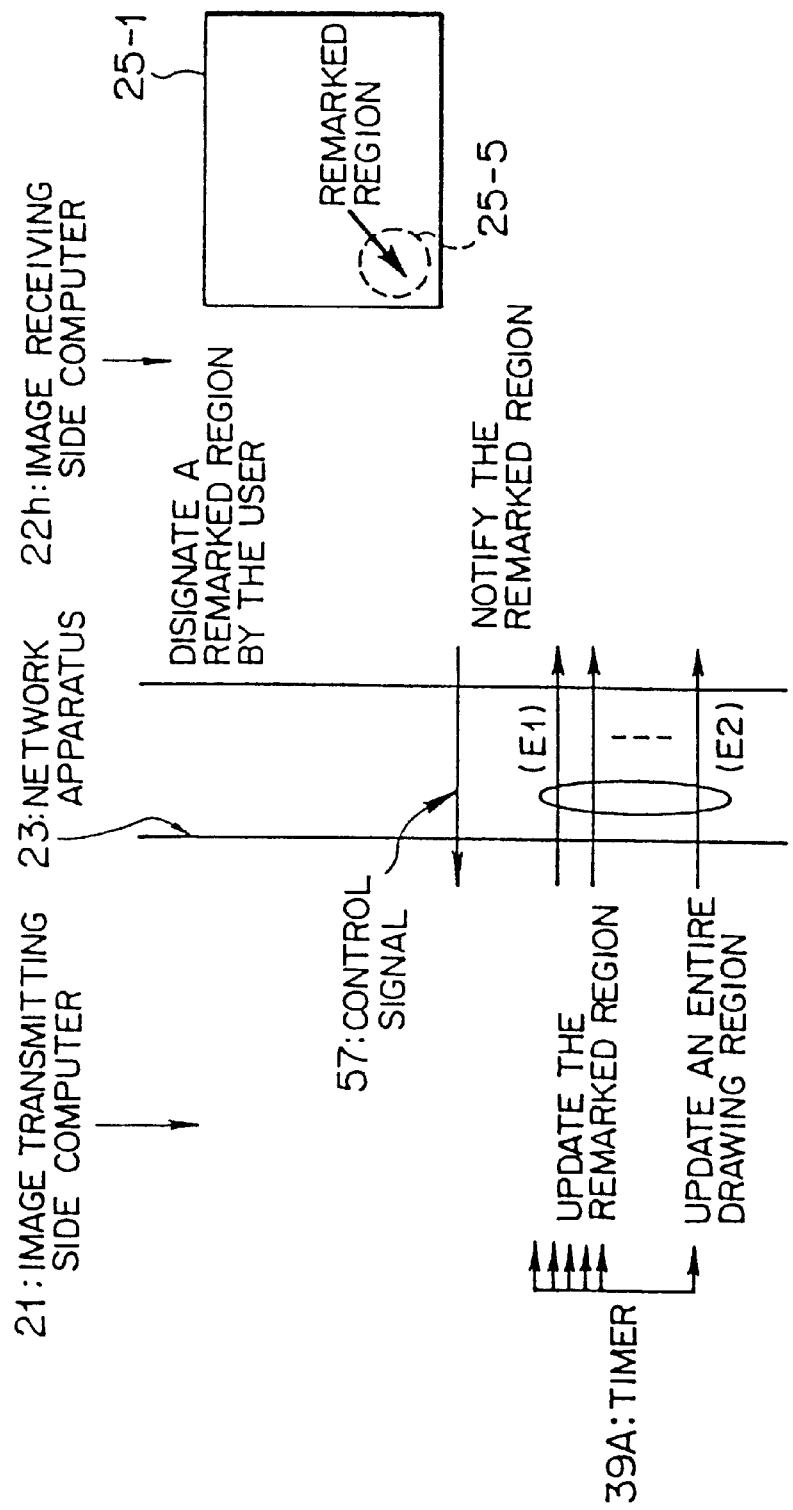
FIG. 41 is a communication sequence diagram for illustrating the operation of the ninth embodiment of this invention.

In which case, the window managing unit 50h detects a position of the mouse cursor besides notifying an image displaying unit 45h that the rectangular region centered at the mouse cursor is a remarked region (a designated region), whereby the image displaying unit 45h notifies the image transmitting side computer 21 via the image receiving unit 44 and the network receiving unit 43, as shown in FIG. 41, for example regarding the information of the remarked region 25-5 notified from the window managing unit 50h. Namely, the image displaying unit 45h transmits the control signal 57 including information of the remarked region 25-6 (X1, Y1, X2, Y2) to the image transmitting side computer 21 from the network receiving unit 43.

Thereafter, the image transmitting unit 39 transmits only data of the remarked region (X1, Y1, X2, Y2) as the image data 58 to the image receiving side computer 22h via the network transmitting unit 40 [refer to a signal (E1)] so as to display it on the image displaying apparatus 25 similarly to this embodiment described above.

Further, the image transmitting unit 39 transmits image data of only a drag region on the basis of frame transmitting timing signals from the timer 39A for a predetermined number of times, after that, transmits image data of the whole image constituting the image displaying window 25-1 [refer to a signal (E2)].

In consequence, image data in a region surrounding the pointing device within a window of image data displayed in the window on the image displaying apparatus 25 connected to the image receiving side computer 22h is preferentially transferred, thereby decreasing frequencies of transfer of image data of the remaining parts.

The above window managing unit 50h has, therefore, a function as a pointing device position managing unit for managing a position of a pointing device in the window system.

The above image displaying unit has a function as a preferentially transferred region designating unit for designating image data in a region surrounding the pointing device as an image region that should be preferentially transferred if a position of the pointing device managed by the window managing unit 50h is on the image data displayed in a window.

Further, the image receiving unit 44 and the network receiving unit 43 have a function as the designated region notifying unit for notifying information to the image data transmitting side as to an image region designated by the image displaying unit 45h.

(j) Tenth Embodiment

Figure 42:
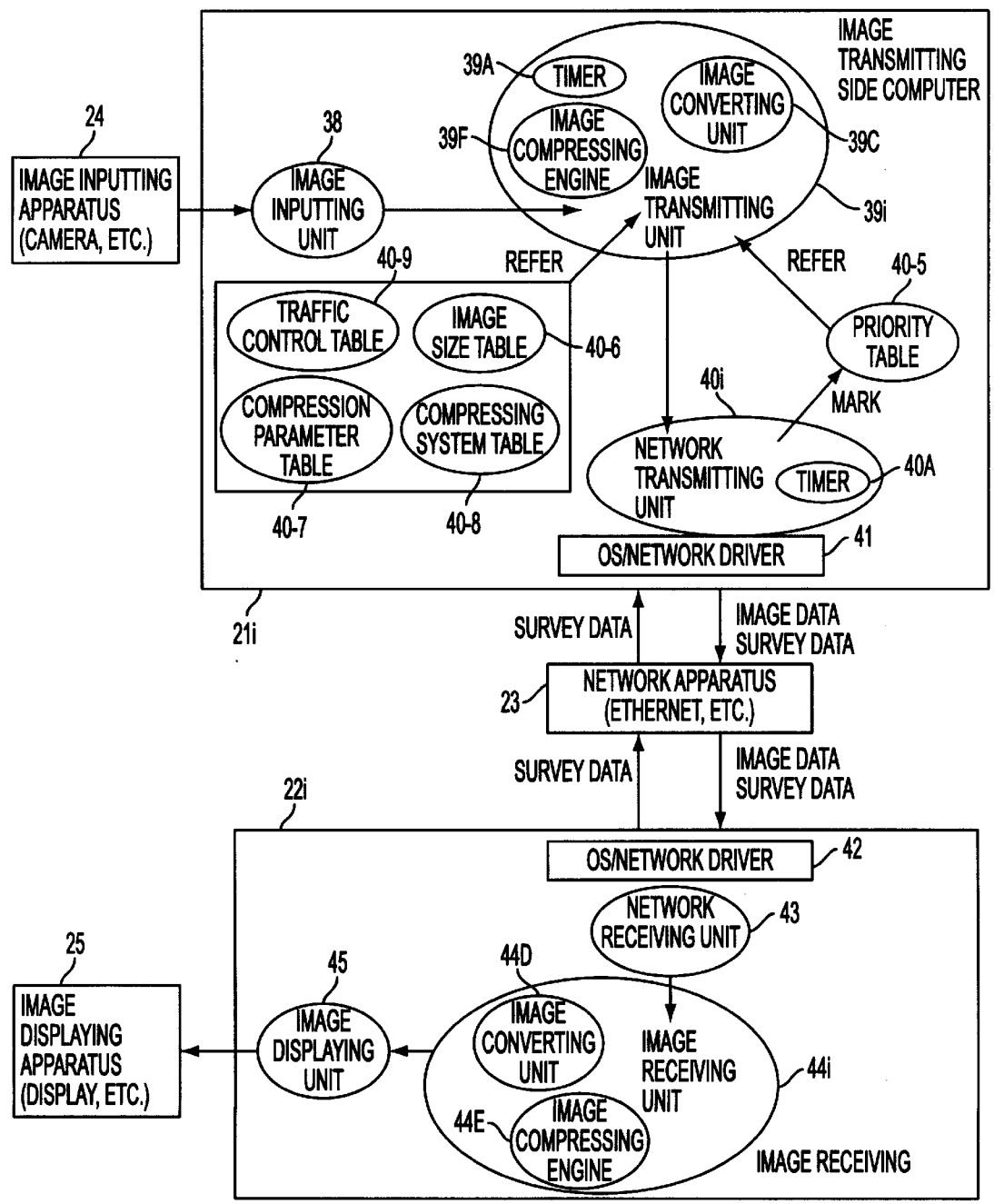
FIG. 42 is a block diagram showing an image data communication system to which an image data communicating apparatus according to a tenth embodiment of this invention is applied.
Figure 48:
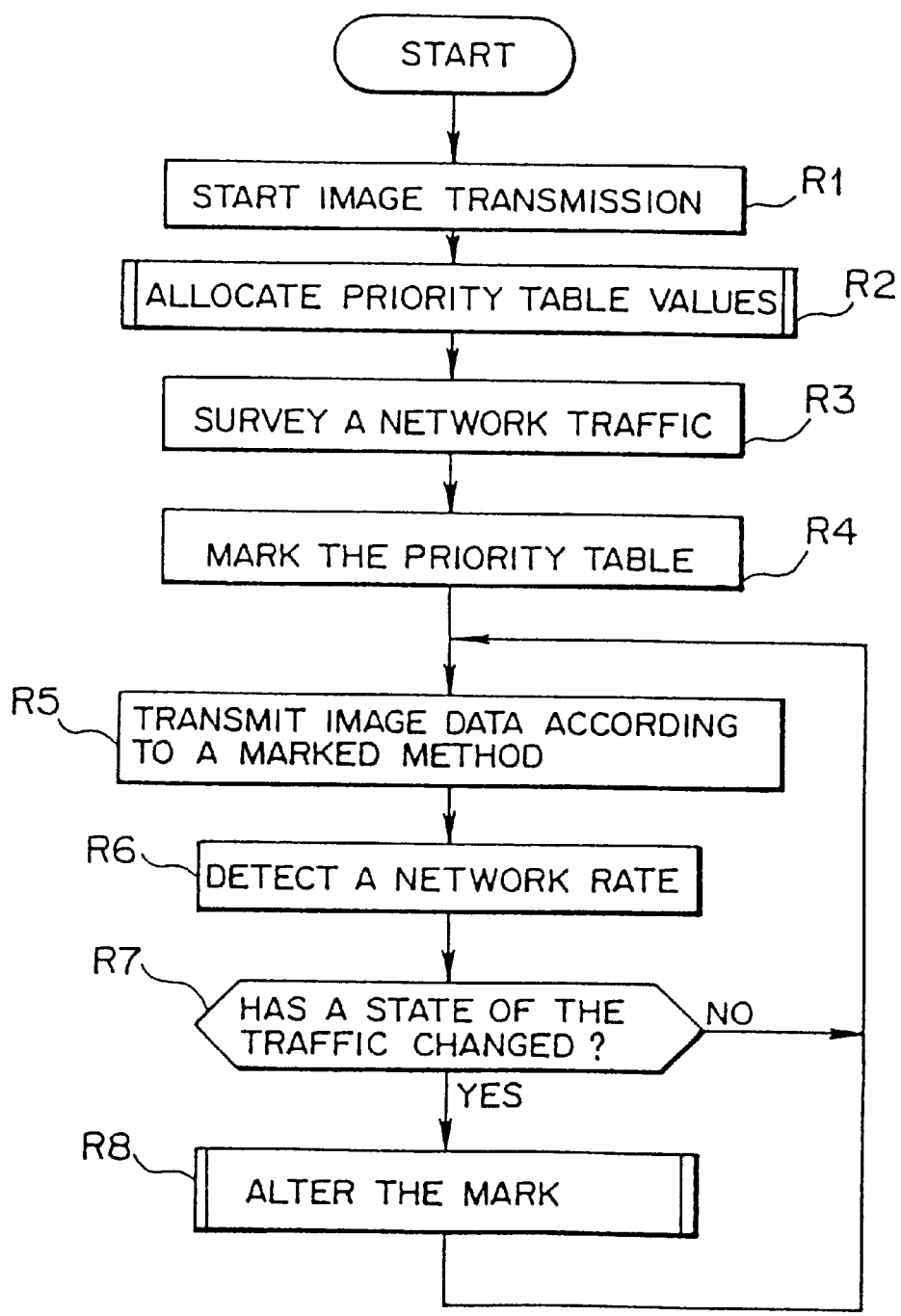
FIG. 48 is a flowchart for illustrating an operation of the tenth embodiment of this invention.
Figure 49:
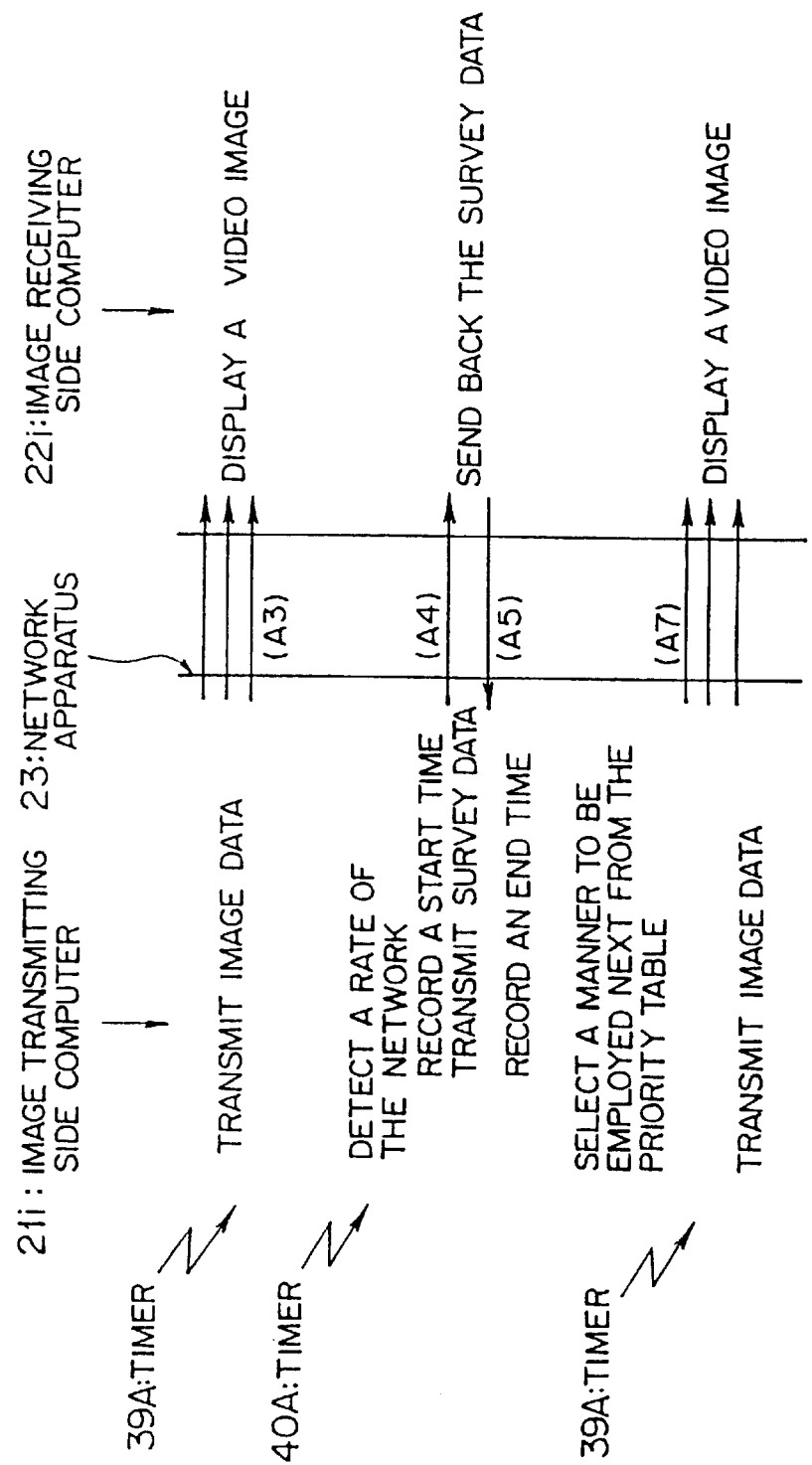
FIG. 49 is a communication sequence diagram for illustrating the operation of the tenth embodiment of this invention.

FIG. 42 is a block diagram showing an image data communication system to which an image data communicating apparatus according to a tenth embodiment of this invention is applied. An image transmitting side computer 21i according to this embodiment has a hardware structure similar to that according to the first embodiment described hereinbefore (refer to FIG. 6). On the other hand, an image receiving side computer 22i has a hardware structure similar to that according to the first embodiment described hereinbefore (refer to FIG. 7), as well.

The same reference characters in FIG. 42 designate like or corresponding parts in FIGS. 5, 11, 13, 16, 19 and 22 described hereinbefore.

The image transmitting side computer 21i according to this embodiment sets the number of transmitting frames according to the traffic of the network apparatus 23 prior to transmission of image data similarly to the first embodiment described hereinbefore (refer to reference numeral 21).

The image transmitting side computer 21i has an image size table 40-6, a compression parameter table 40-7, a compressing system table 40-8, and the traffic control table 40-9 to adjust a quantity of communication data by referring to any one of these tables according to the traffic of the network apparatus 23.

Further, reference numeral 40-5 denotes a priority table. The priority table 40-5 is served to store therein selection data used to select one system among those in which the above four tables 40-6 to 40-9 each are used, as a system for adjusting the quantity of communication data according to the traffic of the network apparatus 23, which has a form as shown in FIG. 43, for example, in the case where an initial data transfer rate is 100 kbps.

Namely, the priority table 40-5 shown in FIG. 43 has stored therein an image size table 40-6 in the case where a data transfer rate as the traffic value calculated during image data communication is 91 to 100 kbps, the compression parameter table 40-7 in the case of 71 to 90 kbps, the compressing system table 40-8 in the case of 51 to 70 kbps, and the traffic control table 40-9 in the case of 0 to 50 kbps as selection data used to adjust a quantity of communication data.

Here, reference numeral 39i denotes an image transmitting unit. The image transmitting unit 39i adjusts the quantity of communication data in the system according to the traffic of the network apparatus 23 by referring to the above priority table 40-5, and notifies a network transmitting unit 40i described later of image data stored in the main storage 33 on the basis of transmitting timings by the timer 39A, which includes the timer 39A, the image converting unit 39C and the image compressing engine 39E.

The timer 39A generates frame transmitting timings so as to transfer image data in frames in the set number by referring to the traffic control table 40-9.

Further, the image converting unit 39C refers to the image size table 40-6 to vary drawing size of image data corresponding to the traffic value. The image converting unit 39c and the image size table 40-6 have a function as a drawing size reducing unit for reducing a drawing size of image data.

An image compressing engine 39F performs a compressing process on image data in a system such as JPEG (Joint Photographic Coding Expert Group), MPEG (Motion Picture Image Coding Expert Group), or the like, at a compression rate set by referring to the compression parameter table 40-7.

The image compressing engine 39F can also implement image compression in an image compressing system selected according to the traffic value by referring to the compressing system table 40-8. In particular, the image compressing engine 39F can support plural compressing systems such as MPEG, JPEG and the like according to the traffic value.

The above image size table 40-6 serves to store therein an enlargement/reduction rate as an image size percentage of image data that should be transferred relative to the traffic value. Namely, the image size table 40-6 has a function as a table for storing therein a percentage of image data that should be transferred relative to the traffic.

The image size table 40-6 can store therein information as shown in FIG. 44, for example, as image sizes relative to traffic values. Namely, if a data transfer rate as a respective traffic value is 91 to 95 kbps, the image size table 40-6 can store "−30%" as an enlargement rate of image data and "−10%" as an enlargement rate if a data transfer rate is 96 to 98 kbps.

The compression parameter table 40-7 has a function as a table for storing therein information as to compression parameters representing image compression rates in relation to respective traffic values used in the image compressing engine 39F, which can have a form as shown in FIG. 45, for example.

Namely, the compression parameter table 40-7 shown in FIG. 45 stores therein "−10" as a compression parameter if the data transfer rate is 71 to 80 kbps and "−5" as a compression parameter in the case of 81 to 85 kbps.

If JPEG is used as a compressing system in the above image compressing engine 39F, it is possible to use, for example, a Q factor to control an image quality as the compression parameter.

The compression system table 40-8 has a function as a table for storing therein compressing systems in relation to changes in traffic, in which compressing systems such as MPEG, JPEG and the like are stored as types of compression systems stored therein.

The above compressing system table 40-8 can have a form according to a data transfer rate as the traffic value as shown in FIG. 46, for example. Namely, the compression parameter table 40-8 shown in FIG. 46 stores therein information representing JPEG as a compressing system if a data transfer rate is 51 to 60 kbps, and information representing MPEG as a compressing system in the case of 61 to 65 kbps.

Further, the traffic control table 40-9 has a function as a table for storing therein a transmittable number of transmitting frames in relation to a data transfer rate as traffic information of the network apparatus 23. In particular, the traffic control table 40-9 has a form as shown in FIG. 47.

Namely, the traffic control table 40-9 shown in FIG. 47 stores therein 0.25 frame as the number of image transferring frames per second if a image transfer rate is 0 to 25 kbps, 0.4 frame as the number of image transferring frames per second in the case of 26 to 40 kbps, and 0.5 frame as the number of image transferring frames per second in the case of 41 to 50 kbps.

The network transmitting unit 40i sets the number of transmitting frames according to the traffic of the network apparatus 23 by referring to the traffic control table 40-9 on the basis of the traffic detected using survey data prior to transmission of image data.

Each of the tables 40-5 through 40-9 shown in FIGS. 43 through 47, respectively, shows an example where a data transfer rate at the beginning of communication is 100 kbps. Each of these tables 40-5 through 40-9 is equivalent to a case where a rate of change in current data transfer rate relative to a data transfer rate at the beginning of communication, is stored instead of the data transfer rate.

The network transmitting unit 40i transmits survey data every predetermined time interval on the basis of timings generated by a timer 40A even during image transfer to detect the traffic. On the basis of the detected traffic, the network transmitting unit 40i refers to each of the tables 40-6 through 40-9 by referring to the above priority table 40-5 to select a manner for adjusting the quantity of communication data.

Namely, the network transmitting unit 40i refers to the traffic control table 40-9 on the basis of the traffic value detected from survey data transmitted every predetermined time interval. If the traffic value marked in the traffic control table 40-9 differs from the traffic value newly detected, the network transmitting unit 40i marks the newly detected traffic value in the priority table 40-5.

In other words, the network transmitting unit 40i judges whether image data can be transmitted in an initial quantity of communication data or not, depending on whether a detected traffic value is larger than the initial traffic value or not.

In this case, if a data transfer rate as a detected traffic value is smaller than the data transfer rate as an initial traffic value, it means that the network apparatus 23 is now more congested than at the beginning. The network transmitting unit 40i therefore judges that it is impossible to transfer image data in the initial quantity of communication data so as to mark the data transfer rate as the newly detected traffic value in the priority table 40-5.

The image transmitting unit 39i refers to the above priority table 40-5 so as to adjust the quantity of communication data according to the traffic value using information marked in the priority table 40-5.

Meanwhile, the network transmitting unit 40i generates selection data of the priority table 40-5 on the basis of the rate of change in current data transfer rate to a transfer rate at the beginning of communication, which was used as the traffic value of the network apparatus 23 and was detected prior to image data transmission.

Figure 50:
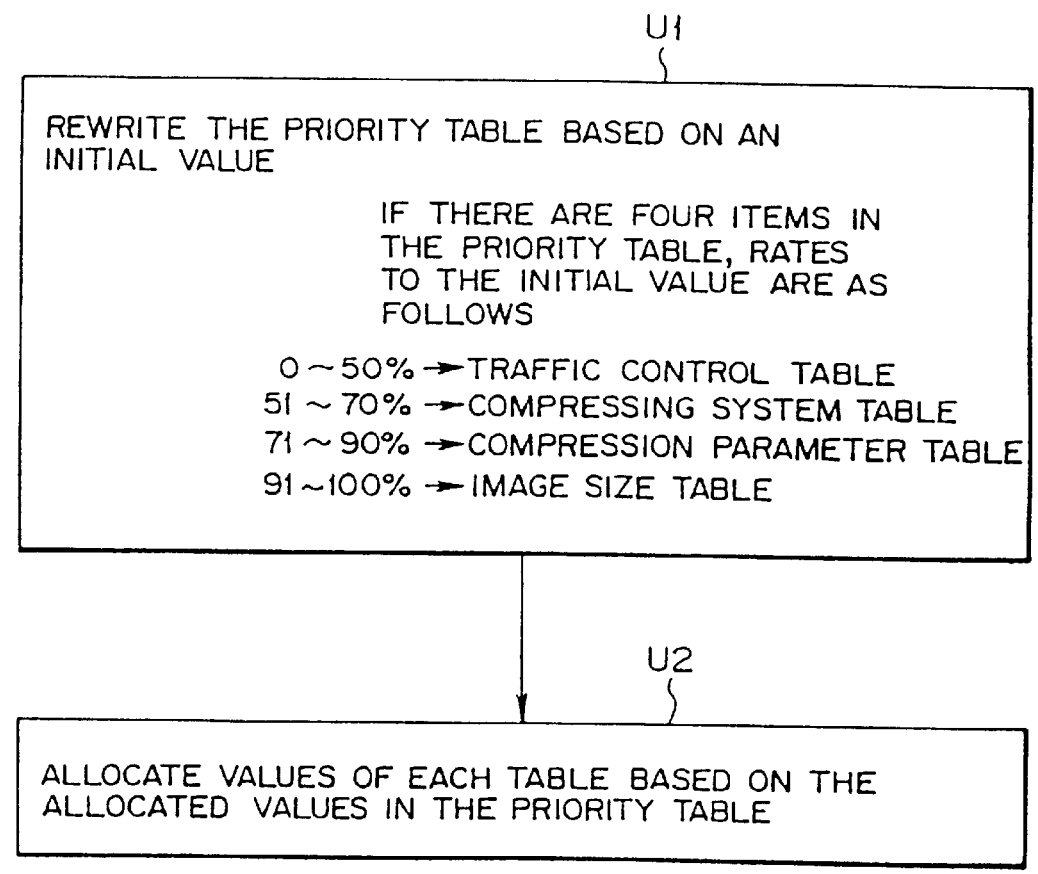
FIG. 50 is a flowchart for illustrating the operation of the tenth embodiment of this invention.

In particular, as shown in a flowchart in FIG. 50, the network transmitting unit 40i generates selection data giving instructions to select the image size table 40-6 if the determined data transfer rate is the rate of change of 91 to 100% of the data transfer rate set at the beginning of communication, selection data instructions to select the compression parameter table 40-7 in the case of a 71 to 91% of the data transfer rate set at the beginning of communication, selection data instructions to select the compressing system table 40-8 in the case of 51 to 71% of the data transfer rate set at the beginning of communication, and selection data instructions to select the traffic control table 40-9 in the case of 0 to 50% of the data transfer rate set at the beginning of communication.

The network transmitting unit 40i can thereby generate the priority table 40-5 using generated selection data as shown in FIG. 43 described above, for example (Step U1).

The network transmitting unit 40i can set each of the tables 40-6 through 40-9 on the basis of a value allocated in the priority table 40-5 based on a data transfer rate detected at the beginning of communication as shown in FIGS. 44 through 47 described above, for example (Step U2).

The network transmitting unit 40i and the priority table 40-5 described above have a function as a selection control unit for selecting at least one method of data processings using the traffic control table 40-9, the compression parameter table 40-7, the image size table 40-6, and the compressing system table 40-8 according to the traffic, besides implementing the selected data processing in the image transmitting unit 39i.

The image receiving side computer 22i has an image receiving unit 44i having a structure different from that according to the second to sixth embodiments described hereinbefore. Structures of other parts remain basically the same.

The image receiving unit 44i has an image converting unit 44D for regenerating image data into an original size if the received data has an image size which had been converted by the image converting unit 39C of the image transmitting side computer 21i. The image receiving unit 44i further has an image compressing engine 44E for elongating (restoring) image data into original image data if the received data has been applied an image compressing process in the image compressing engine 39F of the image transmitting side computer 21i.

The image converting unit 44D regenerates image data to an original size on the basis of the control information 47A at the ninth octet in the leading portion attached to the image data 47 from the image transmitting side computer 21i as shown in FIG. 20, similarly to the fifth embodiment described hereinbefore.

The image converting unit 44D, therefore, has a function as a drawing size regenerating unit for enlarging a drawing size of image data to an original size if the network receiving unit 43 identifies that the drawing size of the image data has been reduced from a result of identification on the type of data.

The image compressing engine 44E elongates (restores) image data into original image data on the basis of the control information 48A at the sixth octet in the leading portion of the image data 47 from the image transmitting side computer 21i as shown in FIG. 23 similarly to the sixth embodiment described hereinbefore.

Next is a description of an operation of the image data communication system to which the image data communicating apparatus according to the tenth embodiment of this invention is applied with reference to FIGS. 48 through 51.

The network transmitting unit 40i sets the number of transferring frames on the basis of the traffic value detected using survey data prior to transmission of image data by marking the traffic control table 40-9, similarly to the first embodiment described hereinbefore. After that, the image transmitting unit 39i transfers image data in frames in the set number [Step R1 in a flowchart in FIG. 48, refer to a signal (A3) in FIG. 49].

Namely, the network transmitting unit 40i marks the traffic value in the traffic control table 40-9. After that, the image transmitting unit 39i refers to the traffic control table 40-9 to read out the number of transmitting frames corresponding to the marked traffic value, then transfers the image data in transmitting frames in the number read out.

The network receiving unit 43 of the image receiving side computer 22i examines, for example, the first octet of the received data. If it is identified that the received data is image data, the image receiving unit 44 receives it, and the image displaying unit 45 controls the image displaying apparatus 25 to display it thereon.

The network transmitting unit 40i allocates values of the priority table 40-5 and values of each of the tables 40-6 through 40-9 used to adjust the quantity of communication data on the basis of the traffic value detected using the survey data prior to transmission of the image data to generate the allocations as shown in the flowchart mentioned above in FIG. 50 (Step R2).

If the data transfer rate as the traffic value at the beginning of communication is 100 kbps, for example, the tables 40-5 through 40-9 may be generated as shown in FIGS. 43 through 47, respectively.

While the image transmitting unit 39i transmits image data, the timer 40A of the network transmitting unit 40i measures a predetermined time interval (one minute, for example). The network transmitting unit 40i performs an interruption process during the image data transmitting process every said predetermined time interval to transmit survey data, thereby examining the traffic of the network apparatus 23 (Step R3).

In particular, when receiving a signal instructing implementation of an interruption process from the timer 40A, the network transmitting unit 40i records the current time, besides transmitting survey data [refer to a signal (A4)].

The network receiving unit 43 of the image receiving side computer 22i examines the first octet of the received data. If the first octet of the received data is "0", the network receiving unit 43 identifies that the received data is the survey data so as to immediately return the survey data to the image transmitting side computer 21i [refer to a signal (A5)].

When receiving the survey data from the image receiving side computer 22, the network transmitting unit 40-1 records the current time so as to measure an elapsed time from when the survey data was transmitted to when the survey data was sent back, thereby detecting a rate of the network.

The network transmitting unit 40a further divides the size of the survey data by the elapsed time (a time from when the survey data was transmitted to when the survey data was sent back) to calculate the data transfer rate as the current traffic value.

Following that, the network transmitting unit 40i refers to the traffic control table 40-9. If an initial value marked differs from the traffic value now calculated, the network transmitting unit 40i marks the new traffic value calculated at this time in the priority table 40-5 as shown in a flowchart in FIG. 51 described later (Step R4).

The image transmitting unit 39i refers to the priority table 40-5 so as to adjust the quantity of communication data in a manner corresponding to the traffic value newly marked.

After that, when the time to transmit image data as new data comes, the image data transmitting unit 39i adjusts the quantity of communication data in a manner according to the traffic value or a rate of change in traffic value, and after that, transmits the image data in frames in the number set by the timer 39A via the network transmitting unit 40i [Step R5, refer to a signal (A7)].

After that, the network transmitting unit 40i examines the traffic of the network apparatus 23 using survey data on the basis of a survey data transmitting timing generated by the timer similarly to Step R3 described before (Step R6).

If the state of traffic is not changed as compared with that detected at Step R3 described before, the image transmitting unit 39i adjusts the quantity of communication data in the same manner as in the above case and transmits the image data (from the NO route at Step R7 to Step R5).

If the state of the traffic is changed, the network transmitting unit 40i cancels the mark in the priority table 40-5, then updates the mark in the priority table 40-5 on the basis of the new traffic value, having changed, or the rate of change in the traffic value similarly to the case at Step R4 described above (from the YES route at Step R7 to Step R8).

If the traffic of the network apparatus 23 deteriorates, the image transmitting unit 39i refers to the priority table 40-5 to employ a communication data adjusting technique having less effect on the network traffic (effective to relieve the congested traffic of the network apparatus 23) so as to transfer the image.

If the traffic of the network improves, the image transmitting unit 39i refers to the priority table 40-5 so as to transfer image data with an accuracy higher than in the case where having less effect on the network traffic was more important.

Meanwhile, when receiving the image data, the image receiving unit 44i of the image receiving side computer 22i controls the image displaying unit 45 to display the image data on the image displaying apparatus 25.

The image receiving unit 44i of the image receiving side computer 22i refers to the data identification information described at the first octet of the received data. If the data identification information of the received data is "1", it means that the received data is the image data 47 whose image size has been converted (refer to FIG. 20) so that the image receiving unit 44i hands it to the image converting unit 44D thereof.

The image converting unit 44D takes out the conversion parameters 47A-2 through 47A-5 and the information 47A-6 through 47A-9 as to data length in the control information 47A, then takes out image data according to the data length designated by the information 47A-6 through 47A-9 as to this data length.

Following that, the image converting unit 44D operates an inverse matrix of a conversion matrix constructed using the conversion parameters 47A-2 through 47A-5, then implements a primary converting operation using the inverse matrix similarly to the image converting unit 39C of the image transmitting side computer 21i described before, to restore the image data into the original image data.

If the data identification information described at the first octet in the received data is "2", it means that the received data is image data having a compressing process applied in a compressing system selected according to a rate of change in traffic value (refer to FIG. 23) so that the data is handed to the image compressing engine 44E of the image receiving unit 44i.

The image compressing engine 44E takes out the information 48A-2 as to a compressing system and the information 48A-3 through 48A-5 as to data length, then takes out image data according to the data length designated by the information 47A-6 through 47A-9 as to this data length.

Following that, the image compressing engine 44E performs a restoring process on the image data in a compressing system corresponding to the information 48A-2 as to a compressing system to regenerate the original image data.

After that, the image data regenerated and restored into the original data by the image compressing engine 44E of the image receiving unit 44i is controlled and displayed on the image displaying apparatus 25 via the image displaying unit 45.

If the received data is image data having been applied a compressing process with a compression parameter selected according to a rate of change in traffic value, the image receiving unit 44i identifies the type of data by referring to the control information, the image compressing engine 44E then regenerates original image data similarly to the above case.

Figure 51:
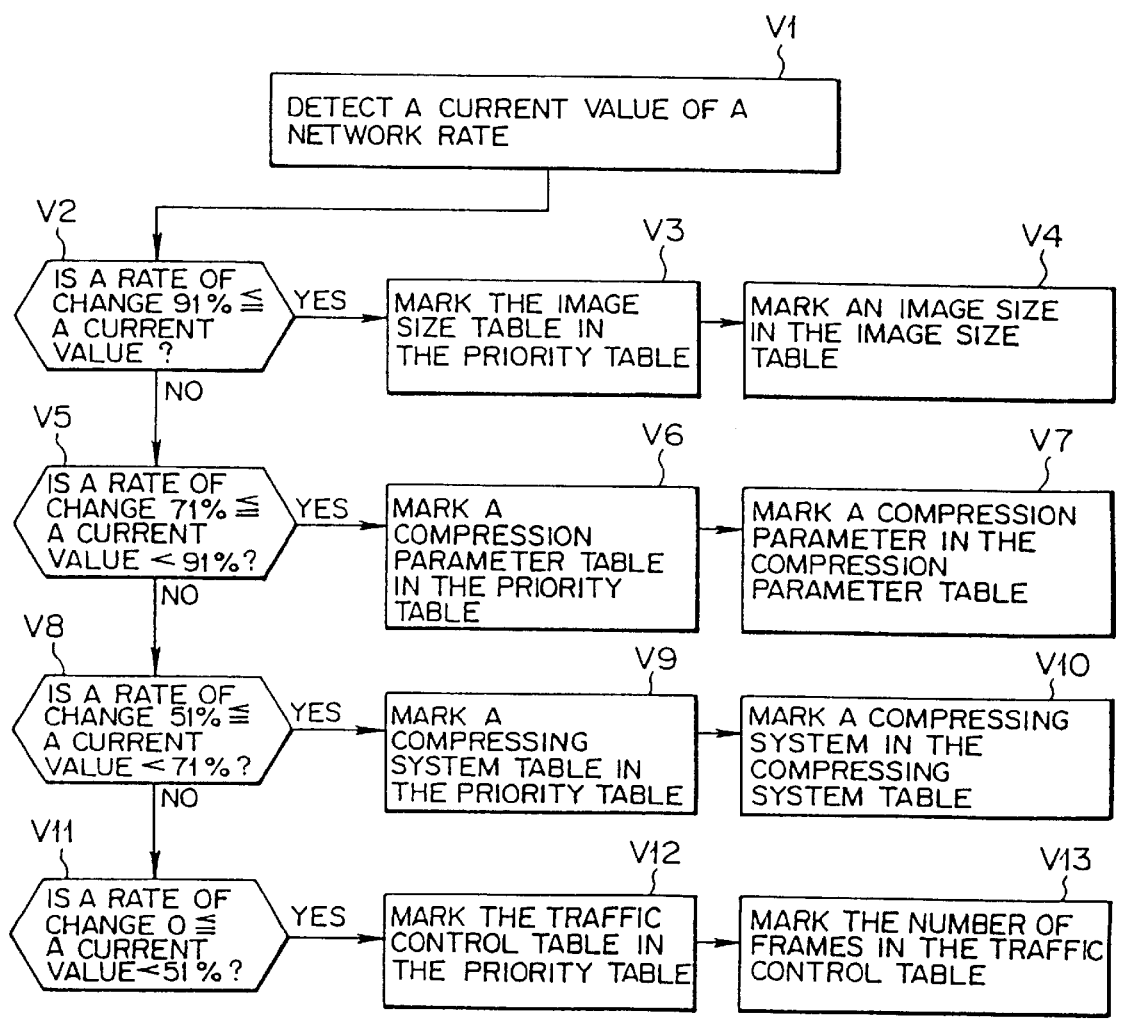
FIG. 51 is a flowchart for illustrating the operation of the tenth embodiment of this invention.

At Step R4 or Step R8 described above, the network transmitting unit 40i marks each of the tables 40-5 through 40-9 according to the traffic value of the network apparatus 23 as shown in the flowchart in FIG. 51.

First, the network transmitting unit 40i detects a data transfer rate as the traffic value of the network apparatus 23 during image data transmission using survey data (Step V1). Following that, the network transmitting unit 40i marks the priority table 40-5 according to a rate of change in the determined data transfer rate relative to the data transfer rate at the beginning of the communication.

Namely, if a current rate of change in the determined data transfer rate relative to the data transfer rate at the beginning of the communication is 91% or higher, the network transmitting unit 40i marks "the image size table 40-6" as selection data in the priority table 40-5 (from YES route at Step V2 to Step V3). Similarly, the network transmitting unit 40i marks an image size corresponding to the determined data transfer rate or a rate of change in data transfer rate in the image size table 40-6 (Step V4).

If a rate of change in the determined data transfer rate relative to the data transfer rate at the beginning of communication is not lower than 71% and not higher than 91%, the network transmitting unit 40i marks "the compression parameter table 40-7" as selection data in the priority table 40-5 (NO route at Step V2, from YES route at Step V5 to Step V6). Similarly, the network transmitting unit 40i marks a compression parameter corresponding to the determined transfer rate or a rate of change in data transfer rate in the compression parameter table 40-7 (Step V7).

If a rate of change in the newly determined data transfer rate relative to the data transfer rate at the beginning of the communication is not lower than 51% but not higher than 71%, the network transmitting unit 40i marks "the compression system table 40-8" as selection data in the priority table 40-5 (NO route at Step V5, from YES route at Step V8 to Step V9). Similarly, the network receiving unit 40i marks a compressing system corresponding to the determined data transfer rate or a rate of change in data transfer rate in the compressing system table 40-8 (Step V10).

If a rate of change in the newly determined data transfer rate relative to a data transfer rate at the beginning of the communication is lower than 51%, the network transmitting unit 40i marks "the traffic control table 40-9" as selection data in the priority table 40-5 (NO route at Step V8, from YES route at Step V11 to Step V12). Similarly, the network transmitting unit 40i marks the number of transferring frames corresponding to the determined data transfer rate or a rate of change in data transfer rate (Step V13).

As above, the image data communicating apparatus according to the tenth embodiment of this invention has the priority table 40-5, in which it is possible to select at least one among data processings techniques using the traffic control table 40-9, the compression parameter table 40-7, the image size table 40-6, and the compressing system table 40-8 according to the traffic. This feature realizes advantages provided in the first to sixth embodiments described hereinbefore. This embodiment also provides advantages such that it is possible to dynamically select an image transfer system convenient to the user while considering an effect on the traffic so as to meet the convenience of the user.

In the above embodiment, the traffic control table 40-1 is used when the number of transmitting frames is re-adjusted during transmission of image data. However, this invention is not limited to this example. It is alternatively possible to provide a function unit which provides a corresponding number of frames when the user designates the traffic, instead of the traffic control table 40-1.

In the above embodiment, there is provided the timer 39A for notifying frame transmitting timings to the image transmitting unit 39. However, this invention is not limited to this example. It is alternatively possible to use the timer 40A of the network transmitting unit 40a instead of the timer 39A as a function unit for notifying frame transmitting timings.

In which case, when the network transmitting unit 40a receives image data from the image transmitting unit 39, the timer 40A examines the current time to examine the difference between the current time and a time at which the image was initially transmitted. If the examined difference is shorter than a difference in frame transmission, the network transmitting unit 40a transmits the image data. If not, the network transmitting unit 40a discards the image data.

(k) Other embodiments

Figure 52:
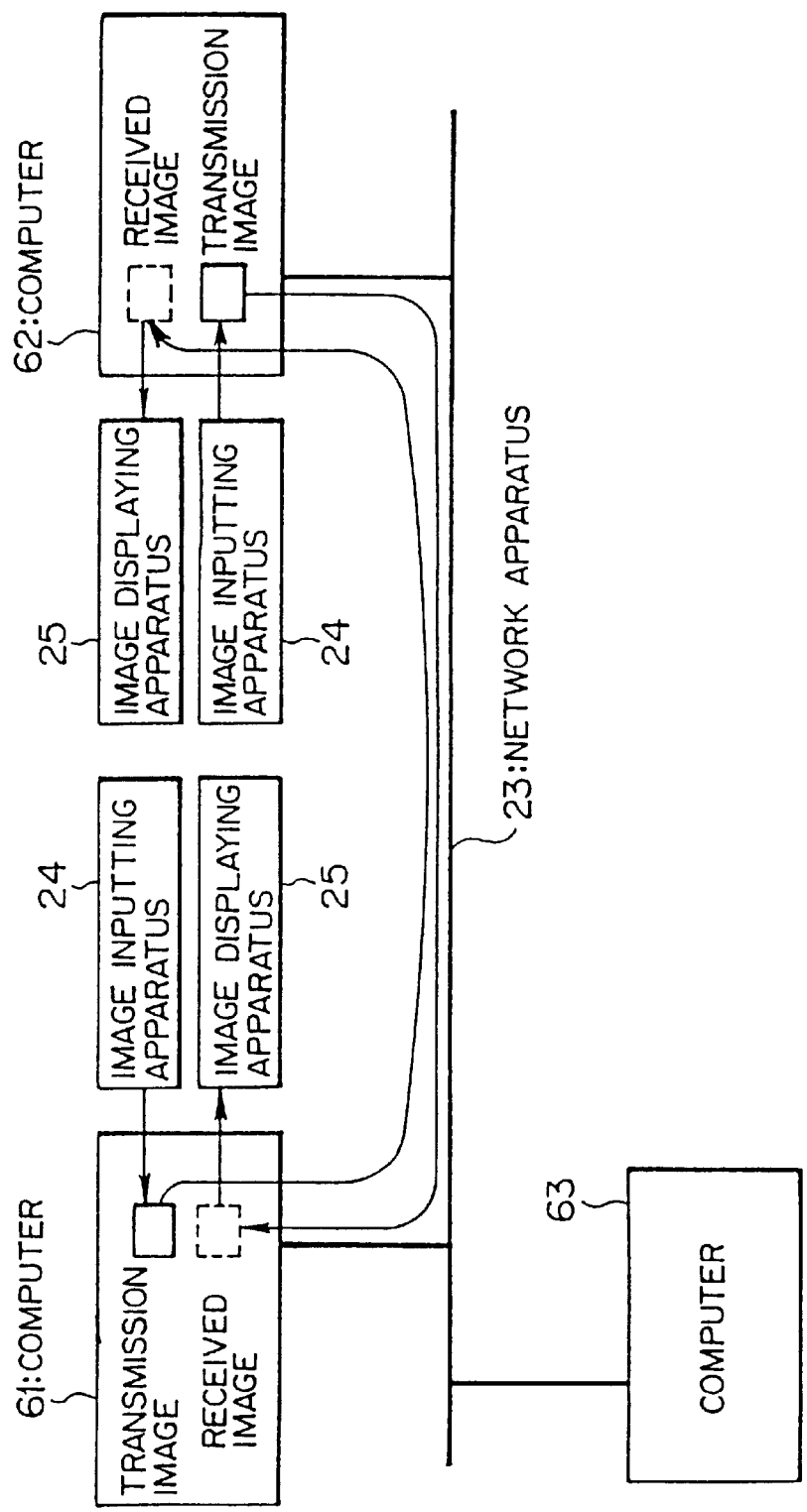
FIG. 52 is a block diagram showing a modification of each embodiment of this invention.
Figure 53:
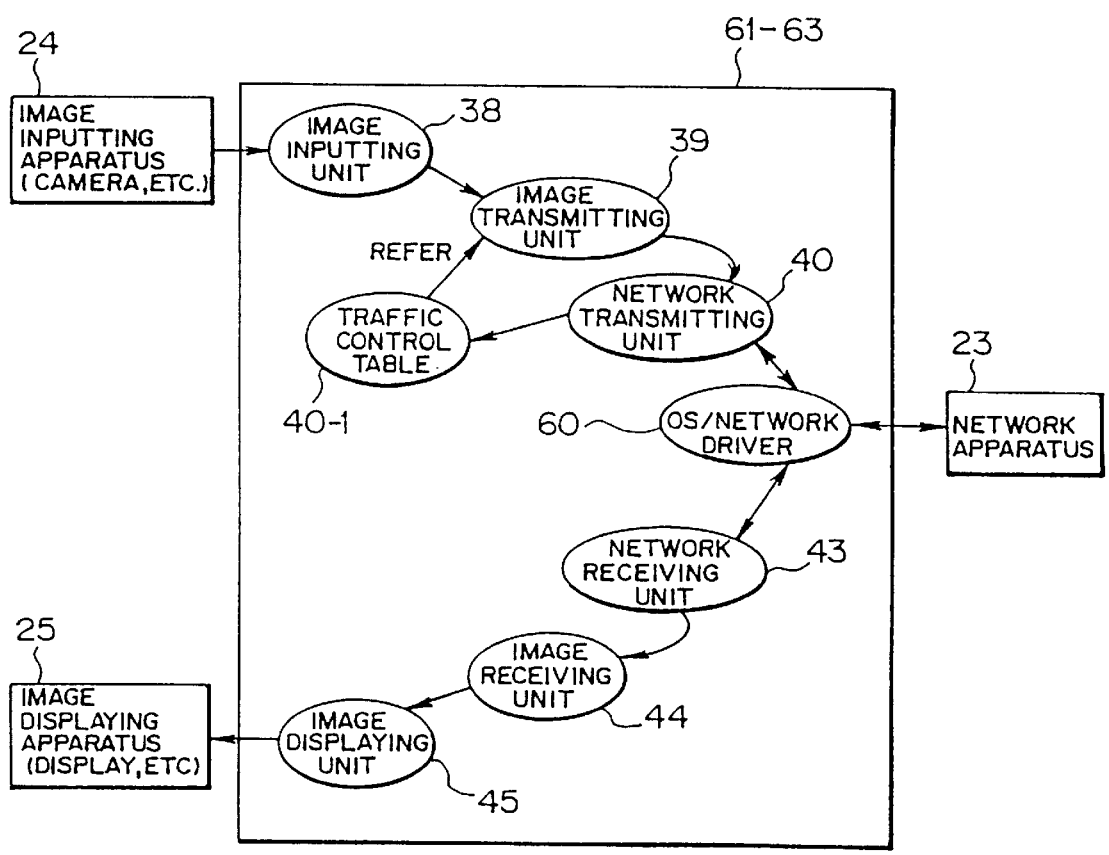
FIG. 53 is a block diagram showing the modification of each embodiment of this invention.
Figure 54:
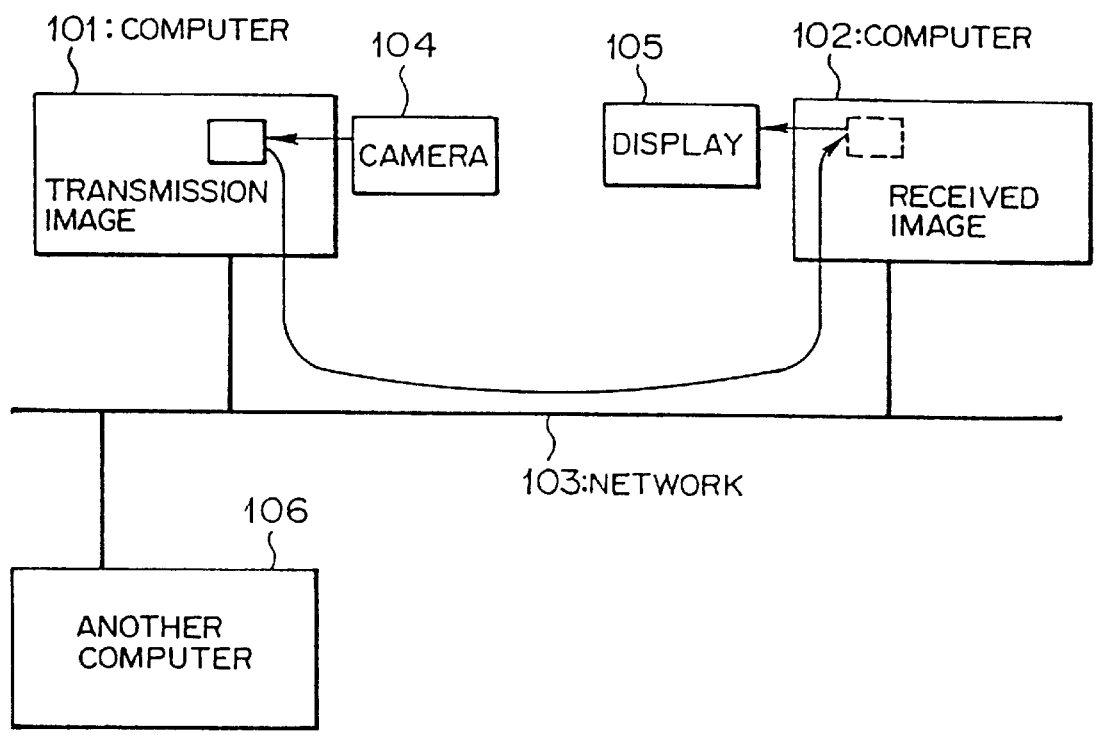
FIG. 54 is a block diagram showing a general image data communication system.

In each of the above embodiments, the image transmitting side computers do not receive images; also the image receiving side computers do not transmit images. However, this invention is not limited to this example. It is however possible that computers 61 through 63 as the image data communicating apparatus are so configured as to have both a transmission function and a receiving function for images as shown in FIG. 52, for example.

In which case, each of the computers 61 through 63, as the above image data communicating apparatus, has the image inputting unit 38, the image transmitting unit 39, the network transmitting unit 40, the traffic control table 40-1, the network receiving unit 43, the image receiving unit 44 and the image displaying unit 45, each of which has a function similar to that according to the first embodiment described hereinbefore, in addition to an OS/network driver 60 having a function similar to the OS/network drivers 42 and 43. For this construction, each of the computers 61 through 63 can have both functions of the image transmitting side computer 21 and the image receiving side computer 22.

In the above case, the image transmitting unit 39, the network transmitting unit 40 and the traffic control table 40-1 of each of the above computers 61 through 63 function as a transmitting unit having a data transmitting unit, the traffic detecting unit and a communication data quantity adjusting unit. At the same time, the network receiving unit 43, the image receiving unit 44 and the image displaying unit 45 function as a receiving unit having a data receiving unit, a data identifying unit and a display control unit.

In this case, if received data is identified as survey data transmitted from a network transmitting unit 40 as a survey data transmitting/receiving unit in either the computer 21 or 22 of its own as a result of identification on a type of data by the network receiving unit 43 as the data identifying unit, the survey data is outputted to the network receiving unit 43 as the survey data transmitting/receiving unit.

If a computer is configured as an image data communicating apparatus having both functions of the image transmitting side computer 21d and the image receiving side computer 22d configuring the image data communication system according to the fifth embodiment described hereinbefore, in particular, the image transmitting unit 39d, the network transmitting unit 40c and the image size table 40-3 function as a transmitting unit having a drawing size reducing unit and a drawing size control unit. At the same time, the network receiving unit 43, the image receiving unit 44, and the image displaying unit 45 function as a receiving unit having a drawing size regenerating unit for enlarging a drawing size into an original size and displaying it if the drawing size of received image data has been reduced.

It is a matter of course that the computer as the image data communicating apparatus according to each of the embodiments described hereinbefore has a transmitting/receiving function for image data, in addition to a transmitting/receiving function for data other than the image data.

In each of the above second to sixth and tenth embodiments, a quantity of communication data to be adjusted is variable according to a current data transfer rate or a rate of change in the current data transfer rate in relation to a data transfer rate at the beginning of communication in each of the tables 40-1 through 40-4, and 40-6 through 40-9. However, this invention is not limited to this example. It is alternatively possible to calculate a rate of change in data transfer rate relative to a data transfer rate calculated on the last occasion during image data transmission to adjust the quantity of communication data using the calculated rate of change.

Whereby, the parameters may be altered minutely according to a change in rate in the image transmitting units 39, 39b through 39e and 39i so that adjustment of quantity of communication data most suitable for the state of traffic becomes possible.

It is also possible to apply a model according to the seventh to ninth embodiments to the image data communication system according to the first to sixth and tenth embodiments described hereinbefore. For instance, it is possible to select a function corresponding to the ninth embodiment from a program menu of the image receiving side computer according to the first to sixth and tenth embodiments to designate a remarked region of a video image.

With this, it is possible to further relieve traffic. If the user of the image receiving side computer according to the first to sixth embodiments and the tenth embodiments applies a model according to the seventh to ninth embodiments so that the state of the traffic improves, it is expected that the user can receive a clearer image than when the traffic is congested since the quantity of image data is increased.

It should be noted that this invention is independent of specific computers, programs or window systems.

SUMMARY

According to the present invention, a transmittable number of image data transmitting frames is set on the basis of traffic of a network prior to transmission of image data, thereby automatically setting a quantity of communication data (rate of data communication) as stated above. This invention therefore enables image data transmission most suitable for a network environment without affecting other services provided by the network.

According to the present invention, it is possible to adjust the quantity of communication data according to the traffic even if the traffic of the network increases during transmission of image data, whereby effective image data transmission most suitable for a network environment becomes feasible without affecting other services provided by the network.

According to the present invention the selection control unit may dynamically select an image transferring system convenient to the user while considering an effect on the traffic, thereby meeting the convenience of the user.

According to the present invention the drawing size regenerating unit may display image data in constant accuracy irrespective of the degree of congestion of the traffic of the network.

According to the present invention it is possible to detect image data unnecessary to be displayed so as to decrease the quantity of the image data from the image data communicating apparatus. Therefore, an effective image data transfer most suitable for a network environment becomes feasible without affecting traffic of the network.

According to the present invention a part to which the user pays attention is displayed in detail and the remaining part is displayed coarsely. It is thereby possible to decrease the quantity of image data from the image data communicating apparatus while keeping the degree of impression of the image data displayed on the displaying unit, thereby realizing an effective image data transfer most suitable for a network environment without affecting traffic of the network.

According to the present invention image data in a region designated by the user within a screen in which the image data is drawn is preferentially transferred in the image data communicating apparatus, thereby decreasing the frequency of transfer of image data of the remaining part so as to decrease the frequency of transmission of image data to which the operator does not pay attention, as compared with a case where image data of a whole image is continuously transmitted on the basis of frame transmitting timings. It is therefore possible to noticeably decrease the quantity of image data while keeping the degree of visual impression of the image for the operator.

What is claimed is:

1. An image data communicating apparatus for transmitting image data in an adjusted quantity to another image data communicating apparatus on a receiving end over a computer network, said image data communicating apparatus on a transmitting end comprising:

an image data transmitting unit for transmitting the image data to the receiving-end image data communicating apparatus;

traffic detecting means for detecting an end-to-end effective traffic of the computer network between said image data communicating apparatus on the transmitting end and that on the receiving end; and a communication data quantity adjusting unit for setting a transmittable number of image frames on the basis of said end-to-end effective traffic detected by said traffic detecting unit and adjusting the quantity of the image data, which is to be transmitted by said data transmitting unit, in accordance with said set transmittable number of image frames.

2. The image data communicating apparatus according to claim 1, wherein said traffic detecting unit includes:

a survey data transmitting/receiving unit for transmitting survey data to said receiving-end image data communicating apparatus prior to transmitting the image data and receiving said survey data sent back from said receiving-end image data communicating apparatus over the computer network; and a time measuring unit for measuring an elapsed time from when said survey data was transmitted at said survey data transmitting/receiving unit to said receiving-end image data communicating apparatus to when said survey data was returned to said survey data transmitting/receiving unit from said receiving-end image data communication apparatus, said end-to-end effective traffic being determined on the basis of said elapsed time measured by said time measuring unit.

3. The image data communicating apparatus according to claim 1, wherein said communication data quantity adjusting unit includes a table in which is stored a transmittable number of image transmitting frames in relation to said end-to-end effective traffic to set the image frame transmitting number by referring to said table on the basis of the traffic detected by said traffic detecting unit.

4. The image data communicating apparatus according to claim 1, wherein said traffic detecting unit detects end-to-end effective traffic of said network at predetermined time intervals to judge whether the image data can be transmitted in an initial quantity of communication data.

5. The image data communicating apparatus according to claim 4, wherein if said traffic detecting unit judges that the image data cannot be transferred in the initial quantity of communication data as the result of detection of said end-to-end effective traffic of said network, said communication data quantity adjusting unit re-adjusts said quantity of communication data.

6. The data communicating apparatus according to claim 4, further comprising:

a first image data compressing unit for compressing image data to be transmitted; and a compression parameter variably controlling unit for variably controlling a compression parameter by said first image data compressing unit so as to bring a current number of frames close to said transmittable number of frames initially set by said communication data quantity adjusting unit, if said traffic detecting unit judges that the image data cannot be transmitted in an initial quantity of communication data as the result of detection of said end-to-end effective traffic.

7. The image data communicating apparatus according to claim 6, wherein said compression parameter variably controlling unit includes a table storing said compression parameter used by said first image data compressing unit in relation to said change in end-to-end effective traffic to variably control said compression parameter by referring to said table on the basis of the change in end-to-end effective traffic detected by said traffic detecting unit.

8. The image data communicating apparatus according to 4, further comprising:

a drawing size reducing unit for reducing a drawing size of image data; and a drawing size control unit for controlling said drawing size reducing unit to reduce the drawing size to bring a current number of frames close to said number of frames initially set by said communication data quantity adjusting unit if said traffic detecting unit judges that the image data cannot be transmitted in the initial quantity of communication data as the result of detection of said end-to-end effective traffic.

9. The image data communicating apparatus according to claim 8, wherein the above drawing size control unit includes a table storing said drawing size in relation to said change in end-to-end effective traffic to control said drawing size by referring to said table on the basis of the change in end-to-end effective traffic detected by said traffic detecting unit.

10. The image data communicating apparatus according to claim 4, further comprising:

a second image data compressing unit for compressing the image data to be transmitted in a desired compressing method selected among plural compressing methods; and a compressing method selecting unit for selecting a compressing method in said second image data compressing unit to bring a current number of frames close to the number of frames initially set by said communication data quantity adjusting unit if said traffic detecting unit judges that the image data cannot be transmitted in the initial quantity of communication data as the result of detection of said end-to-end effective traffic.

11. The image data communicating apparatus according to claim 10, wherein said compressing method selecting unit includes a table storing, said compressing methods in relation to said change in end-to-end effective traffic to select a compressing method by said second image data compressing unit by referring to said table on the basis of the change in end-to-end effective traffic detected by said traffic detecting unit.

12. An image communicating apparatus for transmitting image data in an adjusted quantity to another image data communicating apparatus on the receiving end over a computer network, said image data communicating apparatus on the transmitting end comprising:

an image data transmitting unit for transmitting said image data to the receiving-end image data communicating apparatus;

traffic detecting means for detecting end-to-end effective traffic of said network between said image data communicating apparatus on the transmitting end and that on the receiving end;

a communication data quantity adjusting unit for setting a transmittable number of image frames on the basis of end-to-end effective, traffic detected by said traffic detecting unit adjusting a quantity of the image data, which is to be transmitted by said data transmitting unit, in accordance with said set number of frames;

a first image data compressing unit for compressing image data to be transmitted;

a compression parameter variably controlling unit for variably controlling a compression parameter by said first image data compressing unit to bring a current number of frames close to said number of frames initially set by said communication data quantity adjusting unit on the basis of said end-to-end effective traffic detected by said traffic detecting unit;

a drawing size reducing unit for reducing a drawing size of image data;

a drawing size control unit for controlling to reduce the drawing size in said drawing size reducing unit so as to bring the number of frames close to said number of frames initially set by said communication data quantity adjusting unit on the basis of said end-to-end effective traffic detected by said traffic detecting unit;

a second image data compressing unit for compressing image data to be transmitted in a desired compressing method selected among plural compressing methods;

a compressing method selecting unit for selecting a compressing method by said second image data compressing unit to bring the number of frames close to the number of frames initially set by said communication data quantity adjusting unit on the basis of said end-to-end effective traffic detected by said traffic detecting unit; and a selection controlling unit for selecting at least one data processing method among plural data processing methods by said communication data quantity adjusting unit, said first image data compressing unit, said drawing size reducing unit, and said second image data compressing unit according to said traffic, and for controlling performance of said at least one selected data processing method.

13. An image data communicating apparatus for receiving from another image data communicating apparatus on a transmitting end over a computer network image data whose quantity of communication data has been adjusted on the basis of end-to-end effective traffic on said transmitting-end image data communicating apparatus, comprising:

an image data receiving unit for receiving said image data from said transmitting-end image data communicating apparatus over said network;

an image data identifying unit for identifying a type of said image data received by said image data receiving unit; and a display controlling unit for displaying said received image data on a displaying unit if said received image data is identified as image data as the result of identification on the type of said image data by said image data identifying unit.

14. The image data communicating apparatus on a receiving-end according to claim 13, further comprising:

a survey data controlling unit for sending back survey data to said transmitting-end image data communicating apparatus if said received image data is identified as said survey data transmitted from said transmitting-end image data communicating apparatus as the result of identification on the type of said image data by said image data identifying unit.

15. The image data communicating apparatus on a receiving end according to claim 13, further comprising:

a drawing size regenerating unit for enlarging a drawing size into an original size if said received image data is identified as image data whose drawing size has been reduced as the result of identification on the type of said image data by said image data identifying unit.

16. The image data communicating apparatus on a receiving end according to claim 13, wherein said display control unit is configured with a window display control unit for displaying said received image data in a window on the basis of a window processing system, said receiving-end image data communicating apparatus further comprising:

a window managing unit for managing multiple windows in said window processing system; and a transfer halt requesting unit for requesting an image data transmitting end to halt transfer of image data in a covered region if said window managing unit judges that a window displaying said image data said window managing unit is covered with another window.

17. The image data communicating apparatus on the receiving end according to claim 16, wherein if said window managing unit judges that a window displaying said image data therein is completely covered with another window, said transfer halt requesting unit requests said transmitting-end image data communicating apparatus, to temporarily halt image data transfer.

18. The image data communicating apparatus on a receiving end according to claim 13, wherein said display controlling unit is configured with a window display control unit for displaying said received image data in a window on the basis of a window processing system, said receiving-end image data communicating apparatus further comprising:

a focus state managing unit for managing a state of a focus in a window in said window processing system; and a frame number adjusting signal outputting unit for outputting a signal instructing to adjust the number of transferring frames to an image data transmitting side according to a state of a focus in the window displaying said image data therein managed by said focus state managing unit.

19. The image data communicating apparatus according to claim 13, further comprising:

a priority-transfer region designating unit for designating an image region to be transferred by priority in a screen displayed on said displaying unit; and a designated region notifying unit for notifying said transmitting-end image data communicating apparatus of information as to an image region designated by said preferentially transferred] priority-transfer region designating unit.

20. The image data communicating apparatus on a receiving end according to claim 13, wherein said display control unit is configured with a window display control unit for displaying said received image data in a window on the basis of a window processing system, said receiving-end image data communicating apparatus comprising:

a pointing device position managing unit for managing a position of a pointing device in said window processing system;

a priority-transfer region designating unit for designating image data surrounding said pointing device as an image region to be transferred by priority if a position of said pointing device managed by said pointing device position managing unit is on image data displayed in a window by said window display control unit; and a designated region notifying unit for notifying said transmitting-end image data communicating apparatus of information as to the image region designated by said priority-transfer region designating unit.

21. An image data communicating apparatus for transmitting and receiving image data to and from another image data communicating apparatus over a computer network, comprising:

transmitting means including a data transmitting unit for transmitting said image data to said another image data communicating apparatus over said computer network, a traffic detecting unit for detecting end-to-end effective traffic of said network between said image data communicating apparatus on a transmitting end and that on a receiving end, a communication data quantity adjusting unit for setting a transmittable number of image frames on the basis of said end-to-end effective traffic detected by said traffic detecting unit adjusting the quantity of the image data which is to be transmitted by said transmitting unit, in accordance with said set transmittable number of image frames; and a receiving unit including a data receiving unit for receiving image data from said another image data communicating apparatus on said transmitting end over said network, a data identifying unit for identifying the type of image data received by said data receiving unit, and a display control unit for displaying image data on a displaying unit if said received image data is identified as said image data by said data identifying unit.

22. The image data communicating apparatus according to claim 21, wherein said traffic detecting unit in said transmitting unit comprises a survey data transmitting/receiving unit for transmitting survey data to said another image data communicating apparatus on the receiving end prior to transmission of image data, and receiving said survey data sent back from said another image data communicating apparatus on the receiving end over said computer network, and a time measuring unit for measuring an elapsed time from when said survey data was transmitted at said survey data transmitting/receiving unit to said image data communicating apparatus on the receiving end to when said survey data was returned to said survey data transmitting/receiving unit from said receiving-end image data communication apparatus, said end-to-end effective traffic being determined on the basis of said elapsed time measured by said time measuring unit, said image data communicating apparatus further comprising a survey data control unit for sending back survey data to said another image data communicating apparatus on the transmitting end if said received image data is identified as said survey data sent back from said another image data communicating apparatus as the result of identification on the type of said data by said data identifying unit, and outputting said survey data to said survey data transmitting/receiving unit if said received data is identified as said survey data transmitted from said survey data transmitting/receiving unit as the result of identification on the type of data by said data identifying unit.

23. The image data communicating apparatus according to claim 21, wherein said transmitting unit further comprises a drawing size reducing unit for reducing a drawings size of image data, and a drawing size control unit for controlling to reduce a drawing size in said drawing size reducing unit so as to bring the number of frames close to the number of frames initially set by said communication data quantity adjusting unit if said traffic detecting unit judges that the image data cannot be transferred in the initial quantity of communication data, said receiving unit further including a drawing size regenerating unit for enlarging said drawing size of said received image data into an original size and displaying said image data if the drawing size of said received image data has been reduced.

24. The image data communicating apparatus according to claim 21, wherein said display control unit of said receiving unit is configured with a window display control unit for displaying said received image data in a window on the basis of a window processing system, said display control unit including a window managing unit for managing windows in said window processing system, and a transfer halt requesting unit for requesting said image data communicating apparatus on the transmitting-end to halt transfer of image data in a covered region if said window managing unit judges that a window displaying said image data therein is covered with another window, said data transmitting unit in said transmitting unit being operable to halt transmission of said image data in said covered region if receiving a request to halt transfer of said image data from said image data communicating apparatus on the receiving end.

25. The image data communicating apparatus according to claim 21, wherein said display control unit in said receiving unit is configured with a window display control unit for displaying said received image data in a window on the basis of a window processing system, said display control unit including a focus state managing unit for managing a state of a focus in a window in said window processing system, and a frame number adjusting signal outputting unit for outputting a signal instructing to adjust the number of transferring frames to an image data transmitting side according to a state of a focus in a window displaying said image data therein managed by said focus state managing unit; and wherein if said data transmitting unit of said transmitting unit receives said signal instructing to adjust the number of transferring frames from said image data communicating apparatus on the receiving end, said data transmitting unit adjusts said number of frames on the basis of said signal.

26. The image data communicating apparatus according to claim 21, wherein said receiving unit has a priority-transfer region designating unit for designating an image region to be transferred by priority in a screen displayed on said displaying unit, and a designated region notifying unit for notifying said transmitting-end image data communicating apparatus of information as to said image region designated by said priority-transfer region designating unit, said data transmitting unit of said transmitting means (unit being inputted thereto from the image data receiving side] being operable to input the information as to said designated image region from the image data receiving side so as to transfer said designated image region by priority, (and to decrease] although decreasing a frequency of transfer of image data of the remaining parts that are (not designated] undesignated.

27. The image data communicating apparatus according to claim 21, wherein said display control unit of said receiving unit is configured with a window display control unit for displaying said received image data in a window on the basis of a window processing system, said display control unit including a pointing device position managing unit for managing the position of a pointing device in said window processing system, a priority-transfer region designating unit for designating image data surrounding said pointing device as an image region (that should] to be transferred by priority if the position of said pointing device managed by said pointing device position managing unit is on image data displayed in a window by said window display control unit, and a designated region notifying unit for notifying said transmitting-end image data communicating apparatus of information (to the image data transmitting side] as to said designated image region by said priority-transfer region designating unit, said data transmitting unit of said transmitting means being operable to input the information as to said designated image region from the image data receiving side so as to transfer said designated image region by priority, although decreasing a frequency of transfer of image data of the remaining parts that are (not designated] undesignated.

28. A communication data quantity adjusting method used in an image data communication system having plural image data communicating apparatuses for transmitting image data in an adjusted quantity to another image data communicating apparatus on a receiving end over a computer network said communication data quantity adjusting method comprising the steps of:

setting a transmittable number of image data transferring frames on a basis of traffic of said network in the image data communicating apparatus on the transmitting side and automatically adjusting a quantity of communication data transmitted on a basis of current end-to-end effective traffic of said network.

29. The communication data quantity adjusting method according to claim 28, further comprising the steps of examining a state of the end-to-end effective traffic at predetermined time intervals in said image data communicating apparatus on the transmitting side to judge whether or not the image data can be transferred in an initial quantity of communication data.

30. The communication data quantity adjusting method according to claim 29, wherein when it is judged that said image data cannot be transferred in frames in the initial number, resetting a transmittable number of image data transferring frames for said image data on the basis of the traffic of said network to re-adjust the quantity of communication data.

31. The communication data quantity adjusting method according to claim 29, wherein when it is judged that said image data cannot be transferred in frames in the initial number, compressing said image data on the basis of a compression parameter set on the basis of the traffic of said network and transmitting said compressed image data said compression controlling to bring a currently transferable number of frames for said image data close to the initial number of frames.

32. The communication data quantity adjusting method according to claim 29, wherein when it is judged that said image data cannot be transferred in frames in the initial number, altering image size of said image data on the basis of the current traffic of said network to transmit said image data, said altering controlling to bring a currently transferable number of frames for said image data close to the initial number of frames.

33. The communication data quantity adjusting method according to claim 32, wherein when said image data communicating apparatus on the receiving side receives image data whose image size has been altered, restoring said received image data to an original size and displaying said image data.

34. The communication data quantity adjusting method according to claim 29, wherein when it is judged that said image data cannot be transferred in frames in the initial number, compressing said image data using a desired compressing system on the basis of the traffic of said network to transmit said image data, said desired compressing system controlling to bring a currently transferable number of frames for said image data close to the initial number of frames.

35. The communication data quantity adjusting method according to claim 28, preferentially transferring image data in a region designated by a user within a screen in which said image data is drawn in said image data communicating apparatus on a receiving side by said image data communicating apparatus on the transmitting side and decreasing a frequency of transfer of image data of another region.

36. A communication data quantity adjusting method used in an image data communication system having plural image data communicating apparatuses for transmitting image data in an adjusted quantity to another image data communicating apparatus on a receiving end over a computer network each of said image data communicating apparatuses displaying said received image data in a window by a window system, said communication data quantity adjusting method comprising the steps of:

setting a transmittable number of image data transferring frames on a basis of end-to-end effective traffic of said network in the image data communicating apparatus on a transmitting side, and automatically adjusting a quantity of communication data transmitted on a basis of current end-to-end effective traffic of said network.

37. The communication data quantity adjusting method according to claim 36, wherein when said image data displayed in the window is covered with another window, comprising a further step of requesting a halt to transfer of image data in said covered region, said requesting being made of an image data transmitting side by image data transmitting apparatus on a receiving side.

38. The communication data quantity adjusting method according to claim 37, wherein when the image data communicating apparatus on the transmitting side receives the request from said image data communicating apparatus on the receiving side to halt transfer of said image data, comprising the further step of halting transmission of image data in said covered region.

39. The communication data quantity adjusting method according to claim 36, further comprising the step of varying the number of transferring frames that should be transmitted from the image data communicating apparatus on the receiving side on the basis of a state of focus in a window displaying image data therein in the image data communicating apparatus on the receiving side.

40. The communication data quantity adjusting method according to claim 36, wherein image data surrounding a pointing device within a window displaying the image data therein in the image data communicating apparatus on the receiving side is preferentially transferred from the image data communicating apparatus on the transmitting side and a frequency of transfer of image data of another part, not surrounding said pointing device, is decreased.

41. A communication data quantity adjusting method used in an image data communication system having plural image data communicating apparatuses for transmitting image data in an adjusted quantity to another image data communicating apparatus on a receiving end over a computer network said communication data quantity adjusting method comprising the steps of:

transmitting over said network survey data used to detect end-to-end effective traffic of said network along with said image data from the image data communicating apparatus on a transmitting side to the image data communicating apparatus on a receiving side;

identifying said image data and said survey data from said image data communicating apparatus on the transmitting side in the image data communicating apparatus on the receiving side, sending back said survey data to said image data communicating apparatus on the transmitting side, while displaying said image data on a displaying unit;

detecting said traffic of said network on the basis of the survey data from said image data communicating apparatus on the receiving side in said image data communicating apparatus on the transmitting side, setting a transmittable number of image data transferring frames on the basis of said detected traffic of said network, a quantity of communication data being automatically controlled.

* * * * *